(12) United States Patent
Sekine et al.

(10) Patent No.: US 6,246,452 B1
(45) Date of Patent: Jun. 12, 2001

(54) LIQUID CRYSTAL, LIQUID CRYSTAL MIXTURE HAVING TAU-V MIN MODE DRIVING WITH NEGATIVE OR ZERO TEMPERATURE DEPENDENCY

(75) Inventors: Chizu Sekine; Kyoko Yamamoto; Koichi Fujisawa, all of Ibaraki; Yukari Fujimoto; Tsutomu Matsumoto, both of Osaka; Masayoshi Minai, Shiga, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/545,198

(22) Filed: Oct. 19, 1995

(30) Foreign Application Priority Data

Oct. 19, 1994 (JP) .................................. 6-281259
Nov. 28, 1994 (JP) .................................. 6-293289

(51) Int. Cl.$^7$ ..................... G02F 1/133; G02F 1/141; C09K 19/02
(52) U.S. Cl. ..................... 349/37; 345/97; 349/184; 349/172
(58) Field of Search ..................... 349/37, 172, 184; 345/97

(56) References Cited

U.S. PATENT DOCUMENTS 5,010,328  4/1991  Morris et al. .

(List continued on next page.)

FOREIGN PATENT DOCUMENTS 0440134  1/1991  (EP) .

(List continued on next page.)

OTHER PUBLICATIONS

PWH Surguy et al., The "Joers/Alvey" Ferroelectric Multiplexing Scheme, Ferroelectrics, 1991, vol. 122, pp. 63–79.

(List continued on next page.)

*Primary Examiner*—Kenneth Parker
(74) *Attorney, Agent, or Firm*—Birch, Stewart, Kolasch & Birch, LLP

(57) ABSTRACT

A ferroelectric chiral smectic liquid crystal mixture comprising at least one compound of the formula (I):

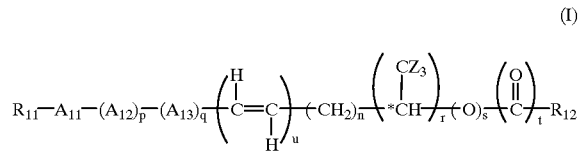

wherein $R_{11}$ and $R_{12}$ represent, independently each other, a $C_1$–$C_{20}$ alkyl, alkoxy or alkoxyalkyl group which may be substituted by at least one halogen atom and may have an unsaturated bond; $A_{11}$, $A_{12}$ and $A_{13}$ represent, independently each other, a phenylene group which may be substituted by a fluorine atom, or the like; * indicates an asymmetric carbon atom; Z is a hydrogen atom or a fluorine atom; n is an integer of 0 to 10; r, s, t and u are each 0 or 1, provided that when u is 1, the compound (I) is a trans-olefin, and at least one compound of the formula (II):

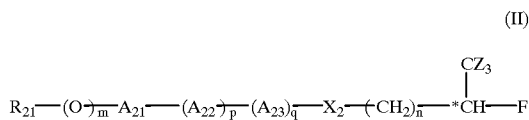

wherein $R_{21}$ is a saturated or unsaturated $C_3$–$C_{20}$ alkyl group or a saturated or unsaturated $C_3$–$C_{20}$ alkoxyalkyl group; $A_{21}$, $A_{22}$ and $A_{23}$ represent, independently each other, a phenylene group which may be substituted by a fluorine atom or the like; $X_2$ is —C≡C— or the like; Z is a hydrogen atom or a fluorine atom; n is an integer of 1 to 10; m is 0 or 1; and * indicates an asymmetric carbon atom, which liquid crystal mixture has a high response speed and a small dependency of $\tau$-$V_{min}$ characteristic on temperature and a wide temperature driving margin.

20 Claims, 10 Drawing Sheets

U.S. PATENT DOCUMENTS

| | | |
|---|---|---|
| 5,047,757 | 9/1991 | Bone et al. . |
| 5,111,319 | 5/1992 | Morris . |
| 5,611,957 * | 3/1997 | McDonnell et al. ............ 252/299.01 |

FOREIGN PATENT DOCUMENTS

| | | |
|---|---|---|
| 0435632 | 7/1991 | (EP) . |
| 611119 | 8/1994 | (EP) . |
| 0636673 | 2/1995 | (EP) . |
| 0643119 | 3/1995 | (EP) . |
| 0667384 | 8/1995 | (EP) . |
| 64-48042 | 2/1989 | (JP) . |
| 3-20715 | 1/1991 | (JP) . |
| 6234749 | 8/1994 | (JP) . |

OTHER PUBLICATIONS

J.C. Jones et al., The Importance Of Dielectric Biaxiality For Ferroelectric Liquid Crystal Devices, Ferroelectrics, 1991, vol. 121, pp. 91–102.

M. Koden et al., Ferroelectric Liquid Crystal Device Using The $\tau$–$V_{MIN}$ Mode, Ferroelectrics, 1993, vol. 149, pp. 183–192.

"FLC mixtures, containing lateraly fluorinated acetylene derivatives for the $\tau$–Vain mode" by K. Tamai et al., Pre-published Texts for The 19$^{th}$ Liquid Crystal Conference (1993), pp. 248–251. (in Japanese).

* cited by examiner

Non-switching pulse

Switching pulse

The pulse which has a leading part of the opposite polarity

The pulse which has a leading part of the same polarity

- ■ Monopolar pulse (25°C)
- □ Monopolar pulse (40°C)
- ● Pulse (a) of Figure7 (40°C)
- ○ Pulse (b) of Figure7 (40°C)

- ● Pulse (a) of Figure7 (25°C)
- ○ Pulse (b) of Figure7 (25°C)
- ▲ Pulse (a) of Figure7 (40°C)
- △ Pulse (b) of Figure7 (40°C)

- Monopolar pulse (25°C)
- Monopolar pulse (40°C)
- Pulse (a) of Figure7 (40°C)
- Pulse (b) of Figure7 (40°C)

- Pulse (a) of Figure7 (25°C)
- Pulse (b) of Figure7 (25°C)
- ▲ Pulse (a) of Figure7 (40°C)
- △ Pulse (b) of Figure7 (40°C)

LIQUID CRYSTAL, LIQUID CRYSTAL MIXTURE HAVING TAU-V MIN MODE DRIVING WITH NEGATIVE OR ZERO TEMPERATURE DEPENDENCY

BACKGROUND OF THE INVENTION

1. Field of the Invention

The present invention relates to a novel ferroelectric liquid crystal, a ferroelectric chiral smectic liquid crystal mixture, and a liquid crystal device constituting such a liquid crystal or liquid crystal mixture. More particularly, the present invention relates to a novel ferroelectric liquid crystal mixture having an improved response speed, and a liquid crystal device constituting such mixture which can be used as an optical shutter or a display device.

Further, the present invention relates to a ferroelectric liquid crystal for a $\tau$-Vmin mode having a wide driving temperature margin, and a liquid crystal device comprising the same.

2. Description of the Related Art

With the recent progress in the exchange of information in society, importance of a display device as one of interfaces between man and machine has been greatly increased. Among such display devices, a flat panel display device such as a liquid crystal display (LCD) has quickly spread since it has various advantages such as a thin thickness, a light weight, a low driving voltage, a low power demand, and the like. Among the liquid crystal devices represented by the liquid crystal display, a matrix-addressed liquid crystal device having a large capacity of information includes two types of driving systems, namely an active-matrix-addressed system and a passive-matrix-addressed system.

In the active-matrix-addressed system, a thin film transistor or diode made of polysilicon or amorphous silicon is connected to each picture element as a non-linear element. However, the active-matrix-addressed system may have some problems in assembling a large area display, lowering the production cost or increasing density because of complicated production steps and low yield. In view of the cost and productivity, the passive-matrix-addressed system is advantageous.

As liquid crystal devices of the passive-matrix-addressed LC display which are currently practically used, TN liquid crystal and STN liquid crystal devices are mainly used. However, their optical response utilizes an average orientation of a molecule axis of the liquid crystal in a specific direction based on anisotropy of a dielectric constant of the liquid crystal molecule, which is induced by the application of an electric field. The, a limit of an optical response speed of such devices is on the order of a millisecond, and such response speed is insufficient in view of the increase of the amount of information. When the number of scanning lines is increased to increase the capacity of information, the decrease of the contrast ratio or cross-talk cannot be avoided inevitably. Those are the essential problems since the TN or STN liquid crystal device has no memory property (bistability). To solve such problems, various driving methods such as a dual frequency driving method, a voltage averaging method, a multimatrix method, and the like have been proposed. But, they cannot provide the fundamental solution of the problems. By such methods, it is difficult to increase the capacity or the density. Further, the TN or STN liquid crystal device has serious problems such as limitation of a viewing angle or quality of display.

To solve the essential problem of the above liquid crystal devices, in 1980, N. A. Clark and S. T. Lagerwall proposed a liquid crystal element utilizing a liquid crystal having bistability (see U.S. Pat. No. 4,367,924 and Japanese Patent KOKAI Publication No. 107216/1981). As the liquid crystal having the bistability, there is used a ferroelectric liquid crystal which has a chiral smectic C phase.

One of the advantages achieved by the use of the ferroelectric liquid crystal is that it has. Bistability is a property such that, when a ferroelectric liquid crystal is held between a pair of glass plates each carrying a transparent electrode, the ferroelectric liquid crystal has two different optically stable states depending on directions of the applied electric field, and the two optically stable states are maintained after the removal of the electric fields. Because of such a property, a liquid crystal device utilizing the ferroelectric liquid crystal is expected not to suffer from the decrease of a contrast ratio or cross-talk even when the number of scanning lines is increased.

Another characteristic of the ferroelectric liquid crystal resides in a high response speed. That is, the optical response of the ferroelectric liquid crystal is about 1000 times faster than that of the TN or STN liquid crystal, since the former utilizes a change of the orientation of the liquid crystal molecules caused by the direct interaction between spontaneous polarization of the ferroelectric liquid crystal and the electric field.

Accordingly, the ferroelectric liquid crystal has the following essential characteristics:

(1) It has two optically stable states, and those optically stable states are maintained after the removal of the electric field (bistability), and (2) The above two optically stable states can be switched on an order of a microsecond (high response speed).

In addition, in the ferroelectric liquid crystal device, the liquid crystal molecules respond to the electric field in parallel with the substrate and a cell thickness is made thin, so that dependency of the display on the viewing angle is small (large viewing angle).

Consequently, the ferroelectric liquid crystal device does not require the expensive non-linear element as in the case of the active-matrix-addressed system, and is expected to provide a high quality large display which can achieve the large information capacity and high quality display of the passive-matrix-addressed system.

Recently, Matthew Francis Born proposes an addressing method of a matrix-array liquid crystal cell comprising a liquid crystal material which is adjusted to show the minimum response time at a specific voltage ($\tau$-$V_{min}$ mode) (Japanese Patent KOKAI Publication No. 20715/1991). In this addressing method, the liquid crystal device is driven by a positive slope portion of a dependency of the response time on the voltage using the property of the liquid crystal that it shows the minimum response time at the specific voltage. When such a driving method is used, it is expected that a good quality image without flickering can be set up.

A liquid crystal material which is suitable for the $\tau$-$V_{min}$ mode should have a negative anisotropy of a dielectric constant at least in a frequency range between 1 kHz and 40 kHz in addition to properties which are required for the ferroelectric liquid crystal materials such as a phase sequence necessary for achieving a good orientation state, that is, a phase sequence in which, on slow cooling, an isotropic phase is changed to a chiral smectic C phase through a cholesteric phase and then a smectic A phase, a low viscosity and a high response speed.

Hitherto, several liquid crystal materials for the $\tau$-$V_{min}$ mode are reported in scientific literatures or presentations in scientific meetings. However, there are still some problems to be solved. One of such problems is to develop a liquid crystal material which has a chiral smectic C phase in a sufficiently wide temperature range and a minimum response at a specific voltage. For example, mixtures described in The Prepublished Texts for The 19th Liquid Crystal Conference (1993), pages 249 and 251 are excellent as liquid crystal materials for the $\tau$-$V_{min}$ mode. However, the highest temperatures of the chiral smectic C thereof are not satisfactory from the practical view point.

Then, hitherto, a large number of researches on the liquid crystal materials having the ferroelectricity have been made and reported. Before putting a ferroelectric liquid crystal device to practical use, still some problems are present. In particular, it is desired to provide a liquid crystal which has a high response speed and a small temperature dependency of properties relating to driving conditions.

SUMMARY OF THE INVENTION

One object of the present to provide a ferroelectric liquid crystal mixture which has a high response speed and a small temperature dependency of a $\tau$-$V_{min}$ characteristic in the case of a liquid crystal material for the $\tau$-$V_{min}$ mode, and a liquid crystal device comprising such mixture.

Another object of the present invention is to provide a liquid crystal or liquid crystal mixture for the $\tau$-$V_{min}$ mode, which can be driven in a wide temperature range (hereinafter sometimes referred to as "driving temperature margin"), and a liquid crystal device comprising such material or mixture.

According to a first aspect of the present invention, there is provided a ferroelectric chiral smectic liquid crystal mixture comprising at least one compound of the formula (I):

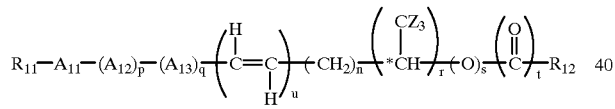

wherein $R_{11}$ and $R_{12}$ represent, independently each other, a $C_1$–$C_{20}$ alkyl, alkoxy or alkoxyalkyl group which may be substituted by at least one halogen atom and may have an unsaturated bond; $A_{11}$, $A_{12}$ and $A_{13}$ represent, independently each other, a condensed ring or monocyclic group of the formula:

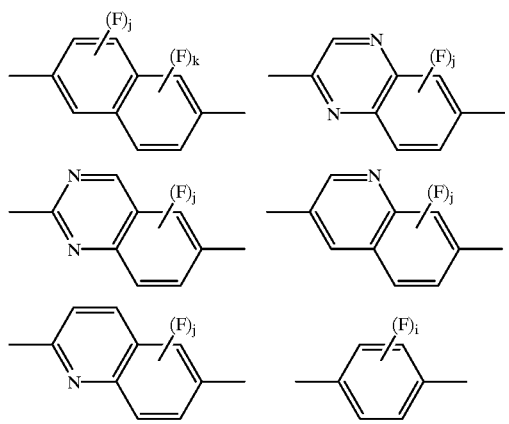

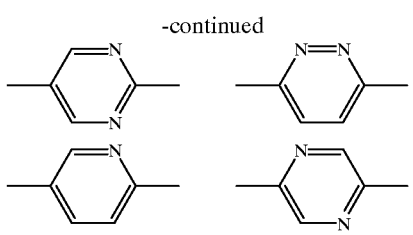

in which i is an integer of 0 to 4 and j and k are each an integer of 0 to 3; p and q are each 0 or 1, provided that when $A_{11}$ is a condensed ring group, a sum of p and q is 0 or 1 and $A_{12}$ and $A_{13}$ are monocyclic groups, or when $A_{11}$ is a monocyclic group, a sum of p and q is 1 or 2, with the proviso that when the sum of p and q is 2, $A_{12}$ and $A_{13}$ are both monocyclic groups; * indicates an asymmetric carbon atom; Z is a hydrogen atom or a fluorine atom; n is an integer of 0 to 10; r, s, t and u are each 0 or 1, provided that when u is 1, the compound (I) is a trans-olefin, and at least one compound of the formula (II):

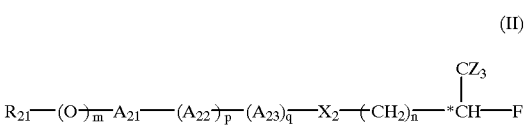

wherein $R_{21}$ is a saturated or unsaturated $C_3$–$C_{20}$ alkyl group or a saturated or unsaturated $C_3$–$C_{20}$ alkoxyalkyl group; $A_{21}$, $A_{22}$ and $A_{23}$ represent, independently each other, a group of the formula:

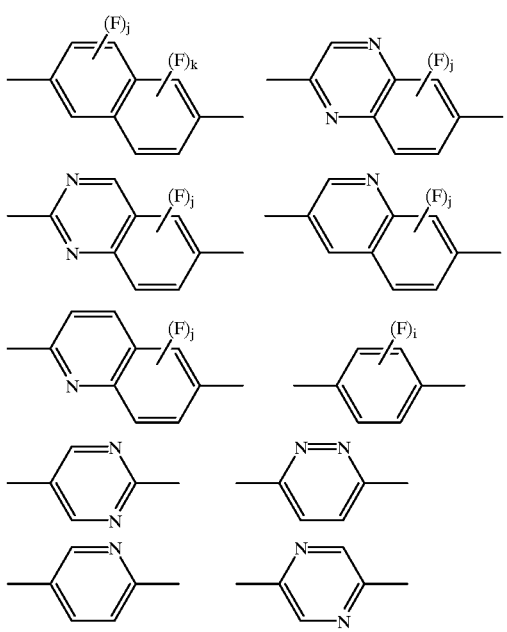

in which i, j and k are the same as defined above; p and q are each 0 or 1, provided that when $A_{21}$ is a condensed ring group, a sum of p and q is 0 or 1 and $A_{21}$ and $A_{23}$ are monocyclic groups, or when $A_{21}$ is a monocyclic group, the sum of p and q is 1 or 2, with the proviso that when the sum of p and q is 2, $A_{22}$ and $A_{23}$ are both monocyclic groups; $X_2$ is —C≡C—, —HC=CH— or —CH$_2$—CH$_2$—; Z is a hydrogen atom or a fluorine atom; n is an integer of 1 to 10; m is 0 or 1; and * indicates an asymmetric carbon atom.

According to a second aspect of the present invention, there is provided a ferroelectric chiral liquid crystal mixture comprising

- at least one compound of the formula (I),
- at least one compound of the formula (II), and
- at least one compound selected from the group consisting of a compound of the formula (V):

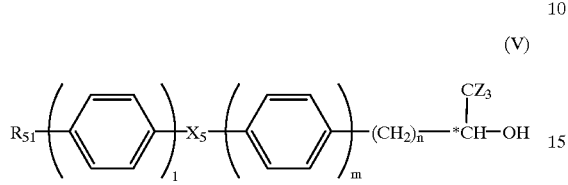

(V)

wherein $R_{51}$ is a $C_2$–$C_{20}$ alkyl or alkoxy group; $X_5$ is —COO— or —CH$_2$O— which may be bonded to a benzene ring at an arbitrary position; l and m are each 1 or 2; n is an integer of 0 to 5; Z is a hydrogen atom or a fluorine atom; and * indicates an asymmetric carbon atom, a compound of the formula (VI):

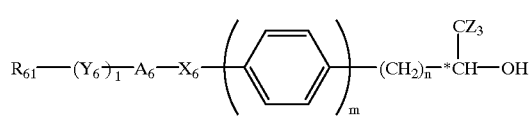

(VI)

wherein $R_{61}$ is a $C_1$–$C_{20}$ alkyl group; $X_6$ is —COO— or —CH$_2$O— which may be bonded to a benzene ring at an arbitrary position; $Y_6$ is —O— or —COO— which may be bonded to a ring of $A_6$ at an arbitrary position; $A_6$ is a group of the formula:

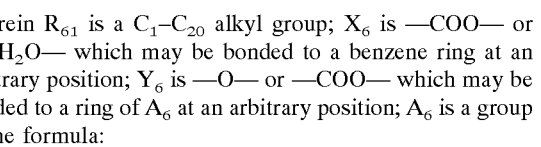

n is an integer of 0 to 5; m is 0 or 1; Z is a hydrogen atom or a fluorine atom; and * indicates an asymmetric carbon atom, a compound of the formula (VII):

(VII)

$$R_{71}-(O)_l-A_{71}-(A_{72})_p-(A_{73})_q-(Y_7)_m-(CH_2)_n-\overset{*}{C}H-OH \;|\; CZ_3$$

wherein $R_{71}$ a saturated or unsaturated $C_1$–$C_{20}$ alkyl group or a saturated or unsaturated $C_2$–$C_{20}$ alkoxyalkyl group; l, m, p and q are each 0 or 1; n is an integer of 0 to 8; $Y_7$ is —C≡C—, —HC=CH— or —CH$_2$—CH$_2$—; and $A_{71}$, $A_{72}$ and $A_{73}$ represent, independently each other,

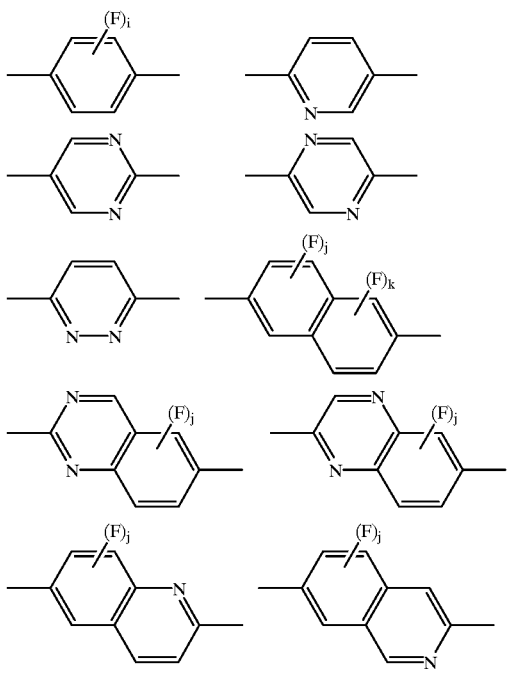

in which i is an integer of 0 to 4 and j and k are each an integer of 0 to 3; p and q are each 0 or 1, provided that when $A_{71}$ is a condensed ring group, a sum of p and q is 0 or 1 and $A_{72}$ and $A_{73}$ are monocyclic groups, or when $A_{71}$ is a monocyclic group, a sum of p and q is 1 or 2, with the proviso that when the sum of p and q is 2, $A_{72}$ and $A_{73}$ are both monocyclic groups; and * indicates an asymmetric carbon atom, and a compound of the formula (VIII):

(VIII)

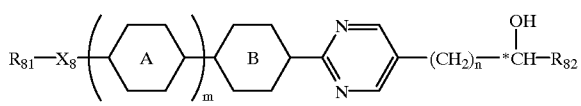

wherein $R_{81}$ and $R_{82}$ are each a $C_1$–$C_{18}$ alkyl group; $X_8$ is a single bond or —O—; m is 0 or 1; a ring A is a phenylene or cyclohexyl group which may be substituted by at least one fluorine atom; a ring B is a phenylene group which may be substituted by at least one fluorine atom; n is an integer of 0 to 5; and * indicates an asymmetric carbon atom, provided that the compound of the formula (VIII) is not the same as the compound of the formula (V), (VI) or (VII).

According to a third aspect of the present invention, there is provided a ferroelectric chiral smectic liquid crystal composition comprising

- at least one compound of the formula (I),
- at least one compound of the formula (III):

(III)

wherein $A_{31}$ and $A_{32}$ are each a group of the formula:

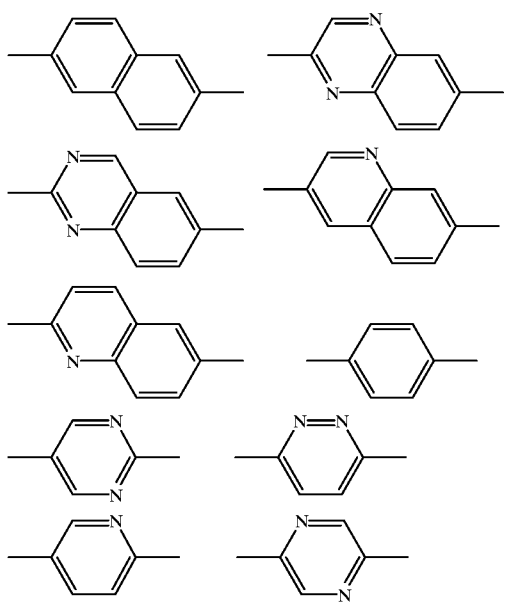

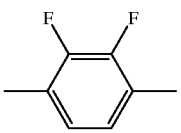

m and n are each 0 or 1, provided that when $A_{31}$ or $A_{32}$ is a condensed ring group, a sum of m and n is 1, or when $A_{31}$ or $A_{32}$ is a monocyclic group, the sum of m and n is 1 or 2; $R_{31}$ and $R_{32}$ are each a $C_3$–$C_{15}$ alkyl, alkoxy or alkoxyalkyl group which may be substituted by at least one halogen atom, and at least one compound of the formula (IV):

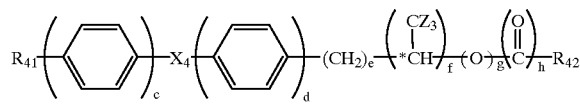

(IV)

wherein c and d are each 1 or 2 provided that a sum of c and d is 3; e is an integer of 0 to 10; f is 0 or 1; g and h are each 0 or 1; $X_4$ is —COO— or —OCO—; at least one of hydrogen atoms of benzene rings is substituted by a fluorine atom; $R_{41}$ is a $C_5$–$C_{15}$ alkyl, alkoxy or alkoxyalkyl group; $R_{42}$ is a $C_1$–$C_{10}$ alkyl or alkoxy group which may be substituted by at least one fluorine atom or a $C_2$–$C_{10}$ alkoxyalkyl group which may be substituted by at least one fluorine atom; continuing methylene groups in $R_{41}$ and $R_{42}$ may be replaced by a double or triple bond; Z is a hydrogen atom or a fluorine atom; and * indicates an asymmetric carbon atom.

According to a fourth aspect of the present invention, there is provided a ferroelectric chiral smectic liquid crystal composition comprising at least one compound of the formula (I) in which u is 1 (one), at least one compound of the formula (II), and at least one compound of the formula (IV).

Preferably, in the liquid crystal mixtures of the first, second and fourth aspects of the present invention, a trans olefin compound of the formula (I) in which at least one of $A_{11}$, $A_{12}$ and $A_{13}$ is a group of the formula:

and $R_{11}$, $R_{12}$, n, p, q, r, s and t are the same as defined in the formula (I), more preferably, r, s and t are 0 (zero), is used as the compound (I).

In the liquid crystal mixture of the first aspect of the present invention, a molar ratio of the compound of the formula (I) to the compound of the formula (II) is preferably (98–50):(2–50).

In the liquid crystal mixture of the third aspect of the present invention, a molar ratio of the compound of the formula (III) to the compound of the formula (IV) to the compound of the formula (II) is preferably (10–90):(87–7):(3–50).

In the liquid crystal mixture of the fourth aspect of the present invention, a molar ratio of the compound of the formula (I) to the compound of the formula (IV) to the compound of the formula (II) is preferably (87–7):(3–50):(10–90).

According to a fifth aspect of the present invention, there is provided a ferroelectric chiral smectic liquid crystal composition comprising one of the ferroelectric chiral smectic liquid crystal composition of the first, third or fourth aspect of the present invention, and at least one compound selected from the group consisting of the compounds of the formulas (V), (VI), (VII) and (VIII). In this composition, a content of at least one compound selected from the group consisting of the compounds of the formulas (V), (VI), (VII) and (VIII) is from 1 to 20 mole %.

According to a sixth aspect of the present invention, there is provided a liquid crystal device comprising a pair of electrode substrates, and a layer of thp liquid crystal mixture according to the present invention present between said pair of the electrode substrates.

DETAILED DESCRIPTION OF THE INVENTION

Figure 1A:
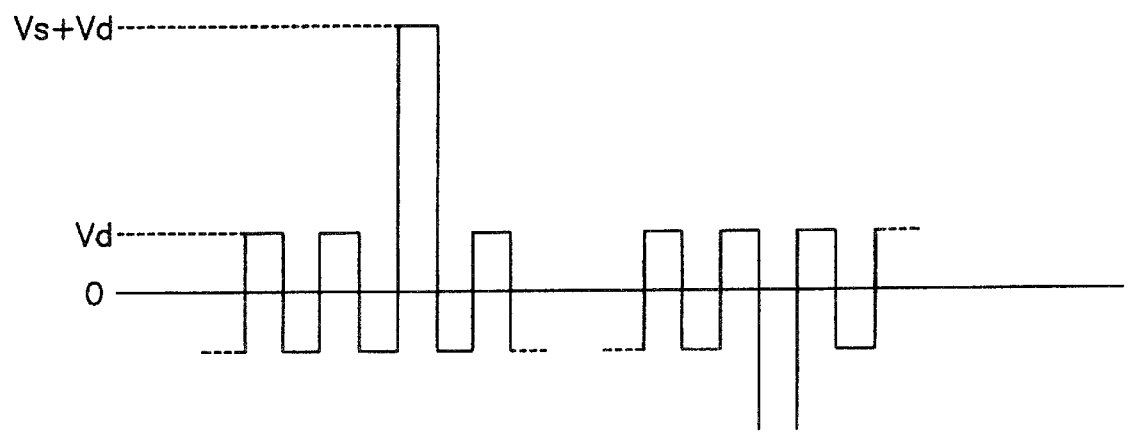
FIGS. 1(a) and 1(b) shows examples of a driving wave form for a liquid crystal for the $\tau$-$V_{min}$ mode.

Examples of the compound of the formula (I) are listed below. In the compounds (I-1) to (I-30), $R_{11}$ and $R_{12}$ represent, independently each other, a $C_1$–$C_{20}$ alkyl, alkoxy or alkoxyalkyl group which may be substituted by at least one halogen atom, preferably, fluorine atom, and which may have at least one unsaturated group. In the compounds (I-1a) to (I-9as), the double bond is a trans bond. G represents a group of the formula:

$$C_iH_{2i+1}\!-\! \text{ or } C_iH_{2i+1}\!-\!O\!-\!$$

wherein i is an integer from 1 to 20.

E is a hydrogen atom, or a group of the formula:

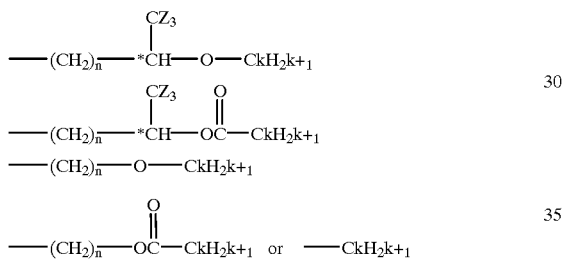

wherein n and Z are the same as defined above, * indicates an asymmetric carbon atom, and k is an integer of 1 to 20.

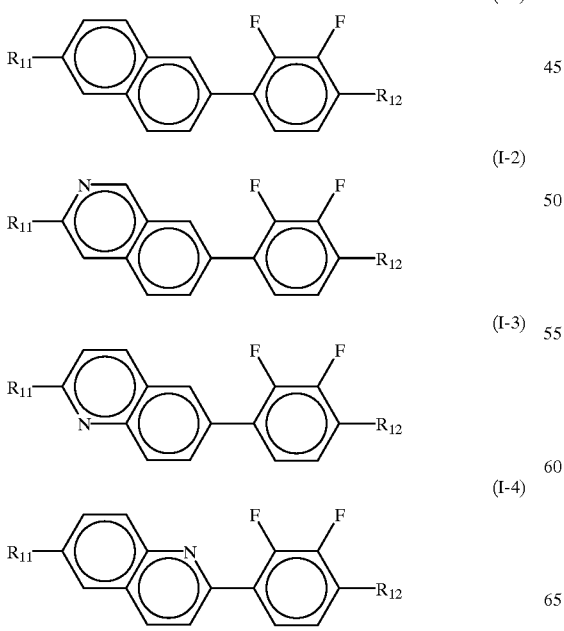

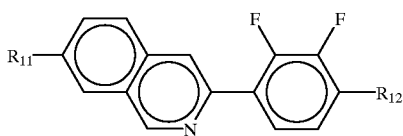

(I-5)

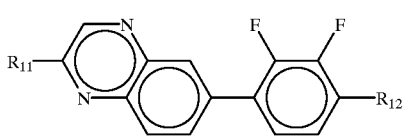

(I-6)

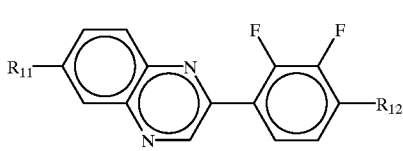

(I-7)

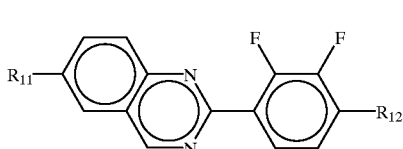

(I-8)

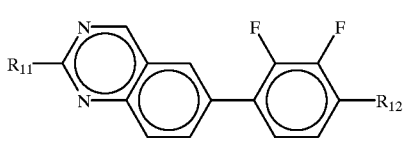

(I-9)

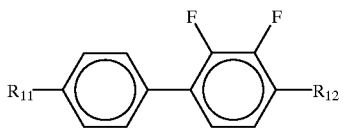

(I-10)

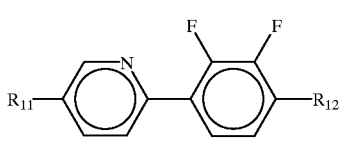

(I-11)

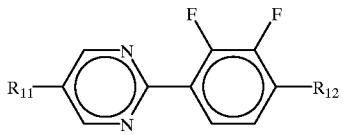

(I-12)

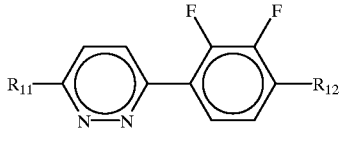

(I-13)

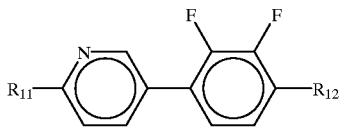

(I-14)

(I-15), (I-16), (I-17), (I-18), (I-19), (I-20), (I-21), (I-22), (I-23), (I-24), (I-25), (I-26), (I-27), (I-28), (I-29), (I-30), (I-1a), (I-2a), (I-3a), (I-4a), (I-5a), (I-6a)

-continued
(I-7a)
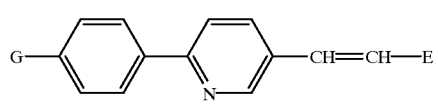
(I-8a)
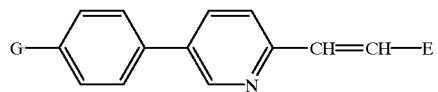
(I-9a)
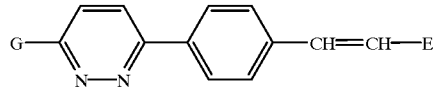
(I-10a)
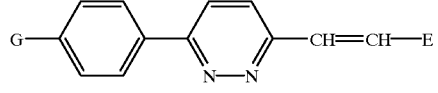
(I-11a)
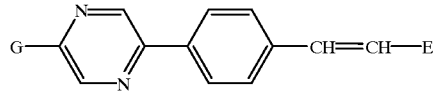
(I-12a)
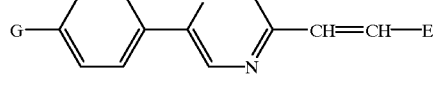
(I-1b)
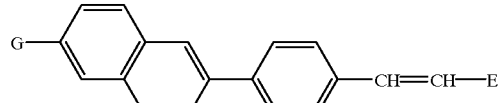
(I-2b)
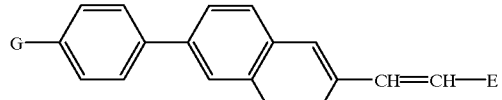
(I-3b)
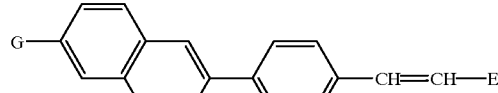
(I-4b)
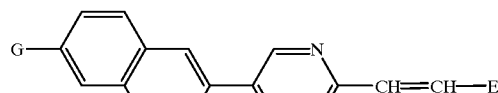
(I-5b)
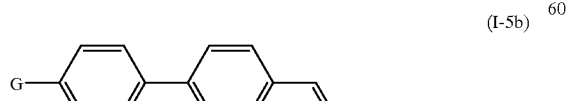
-continued
(I-6b)
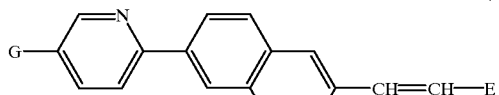
(I-7b)
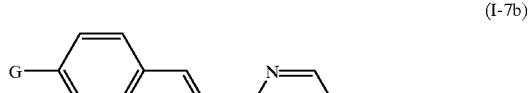
(I-8b)
(I-9b)
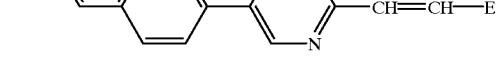
(I-10b)
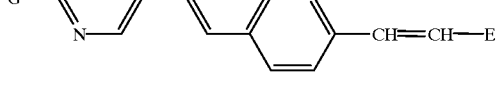
(I-11b)
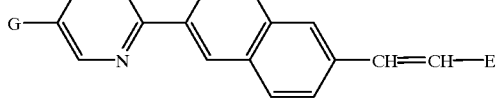
(I-12b)
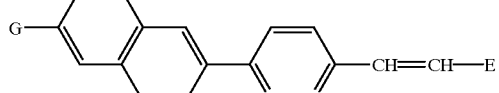
(I-13b)
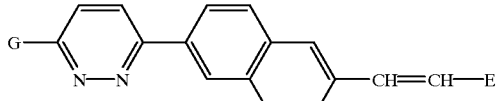
(I-14b)
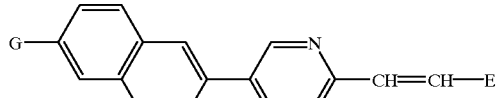
(I-1c)
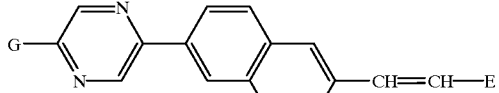

-continued
(I-2c)
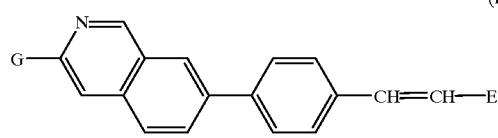
(I-3c)
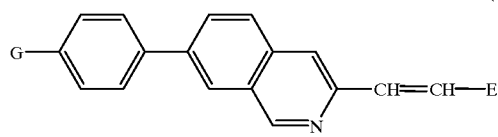
(I-4c)
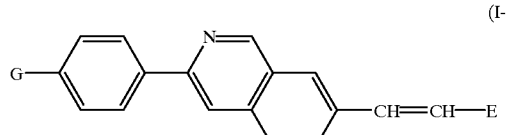
(I-5c)
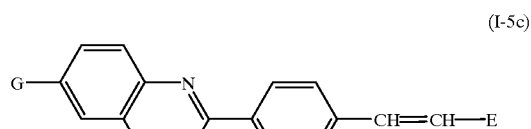
(I-6c)
(I-7c)
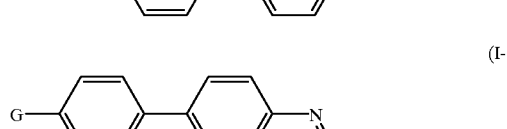
(I-8c)
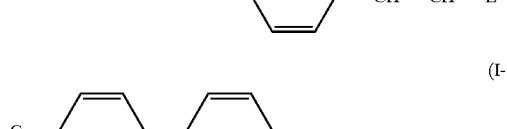
(I-9c)
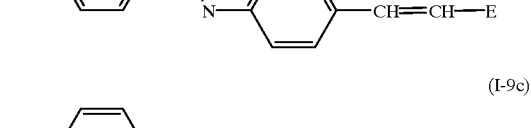
(I-10c)
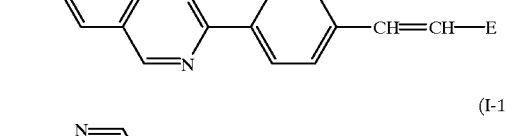
(I-11c)
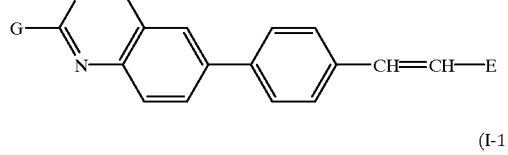
-continued
(I-12c)
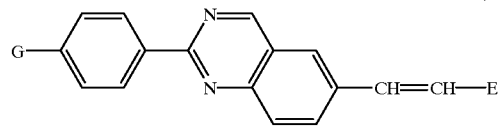
(I-13c)
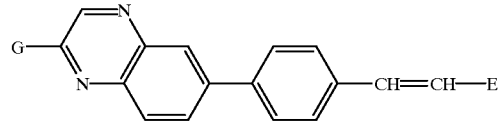
(I-14c)
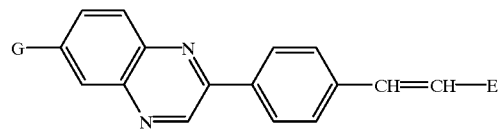
(I-15c)
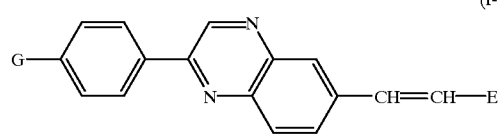
(I-16c)
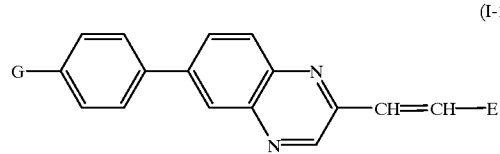
(I-1d)
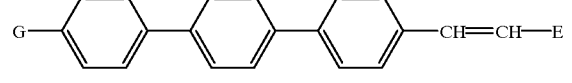
(I-2d)
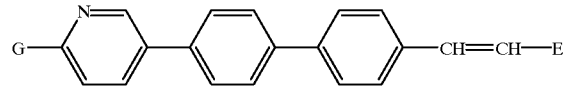
(I-3d)
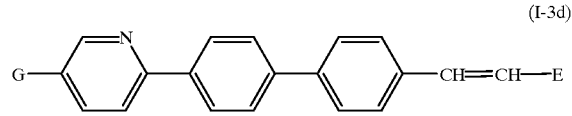
(I-4d)
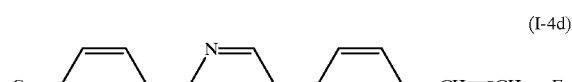
(I-5d)
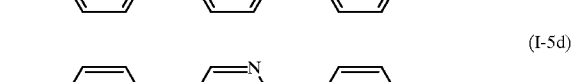
(I-6d)
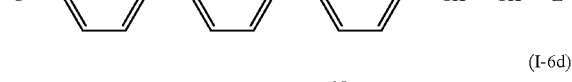
(I-7d)
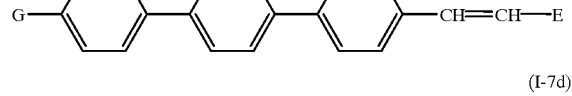

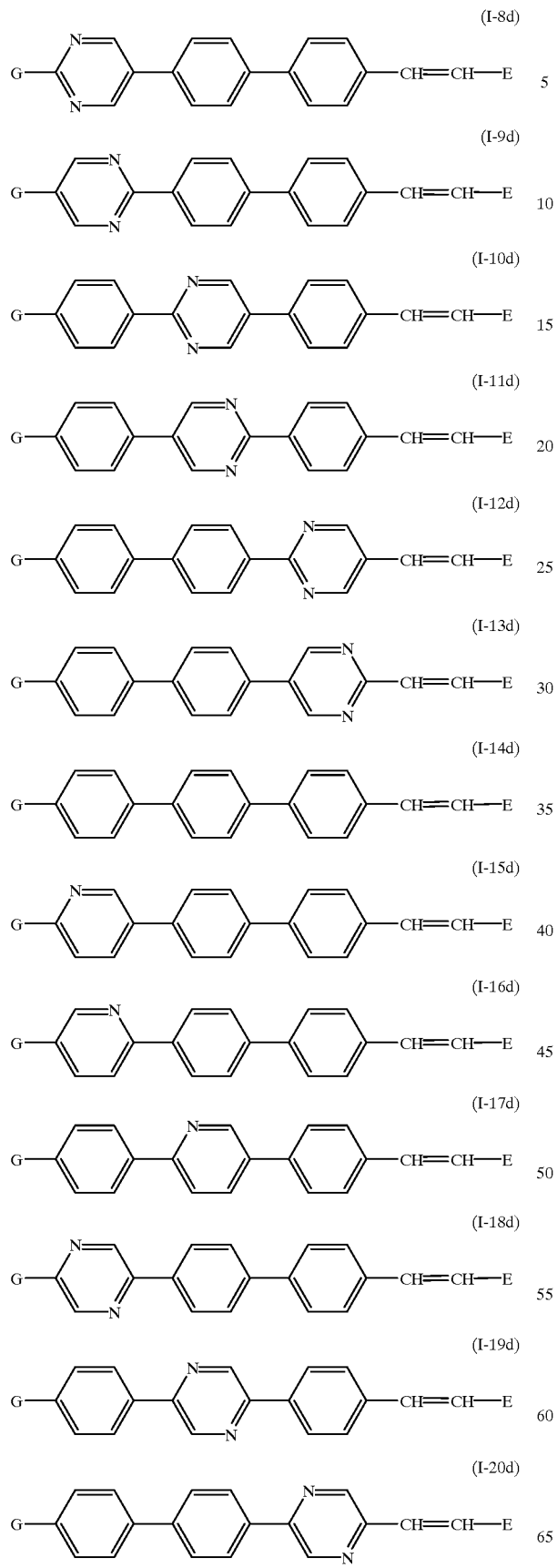
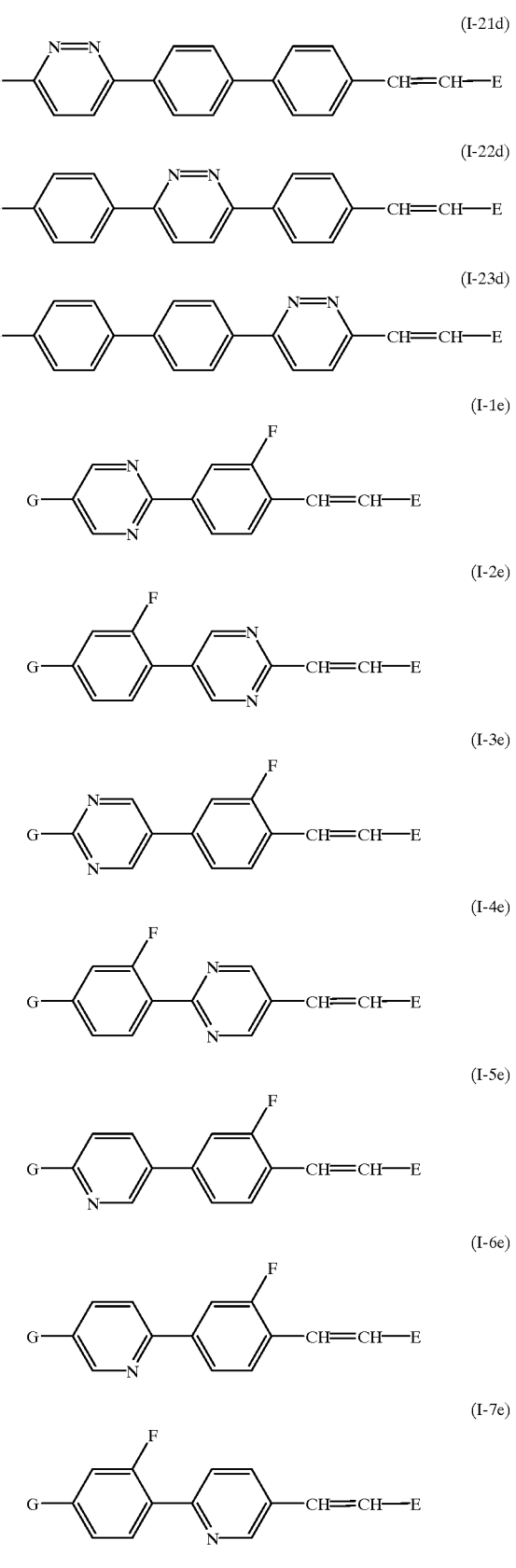

(I-12h)
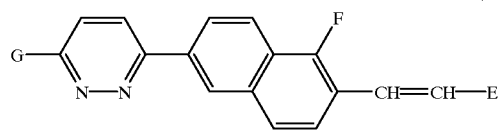
(I-13h)
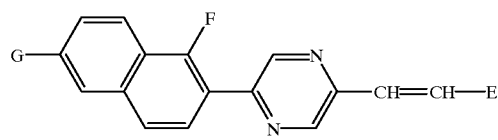
(I-14h)
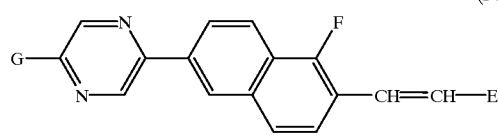
(I-1i)
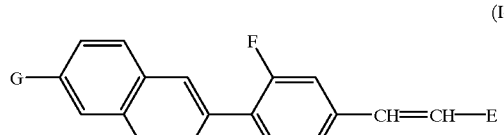
(I-2i)
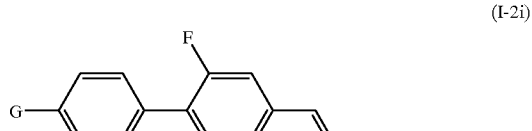
(I-3i)
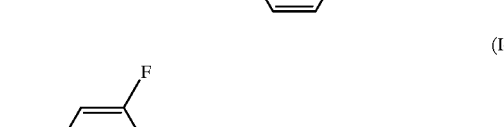
(I-4i)
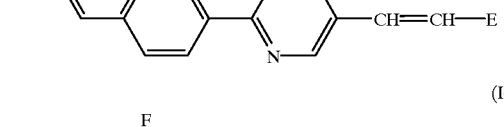
(I-5i)
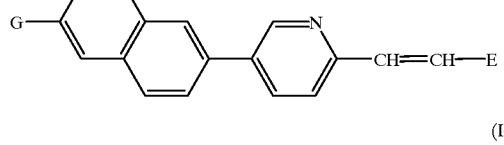
(I-6i)
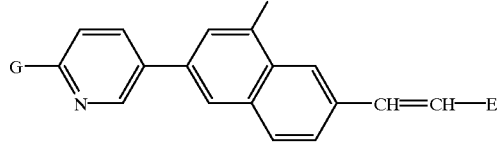
(I-7i)
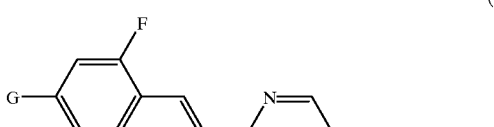
(I-8i)
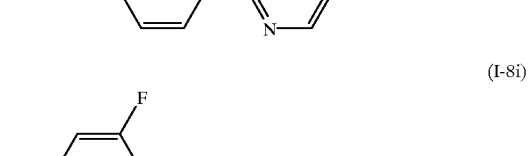
(I-9i)
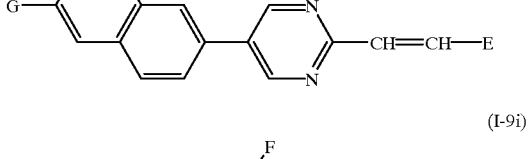
(I-10i)
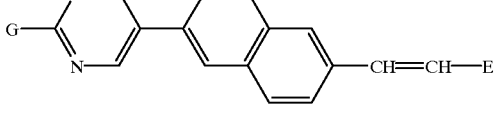
(I-11i)
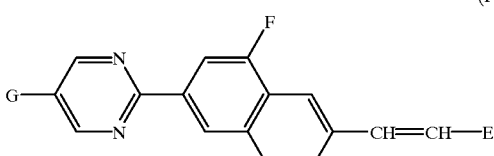
(I-12i)
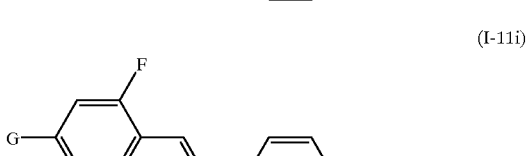
(I-13i)
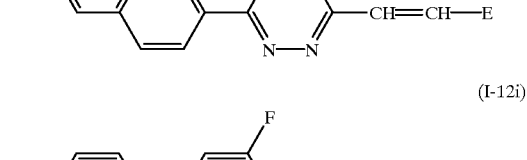
(I-14i)
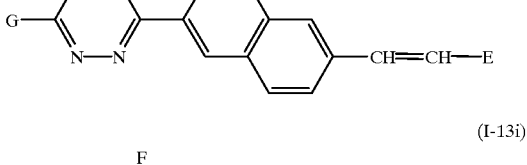

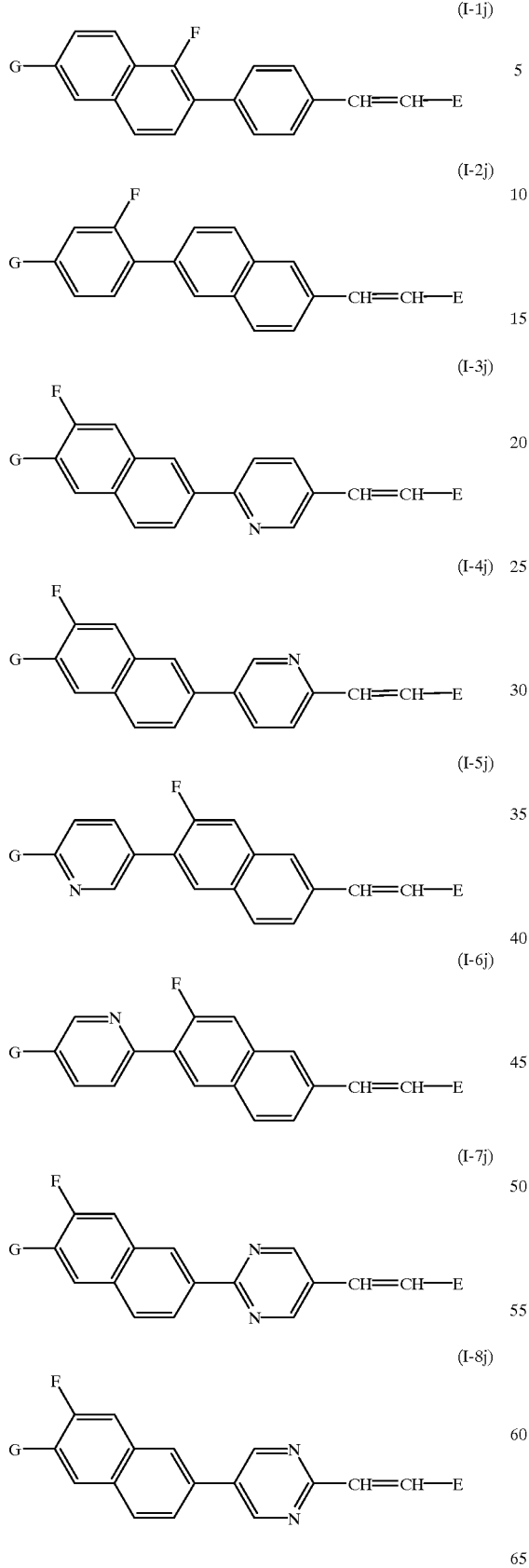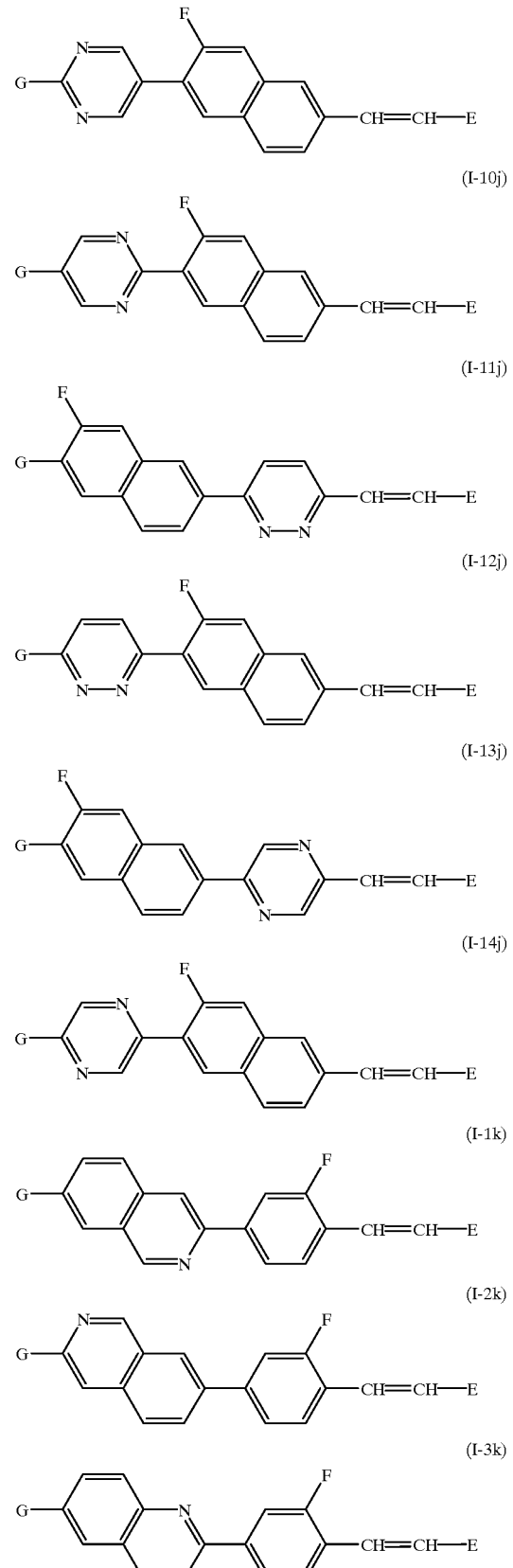

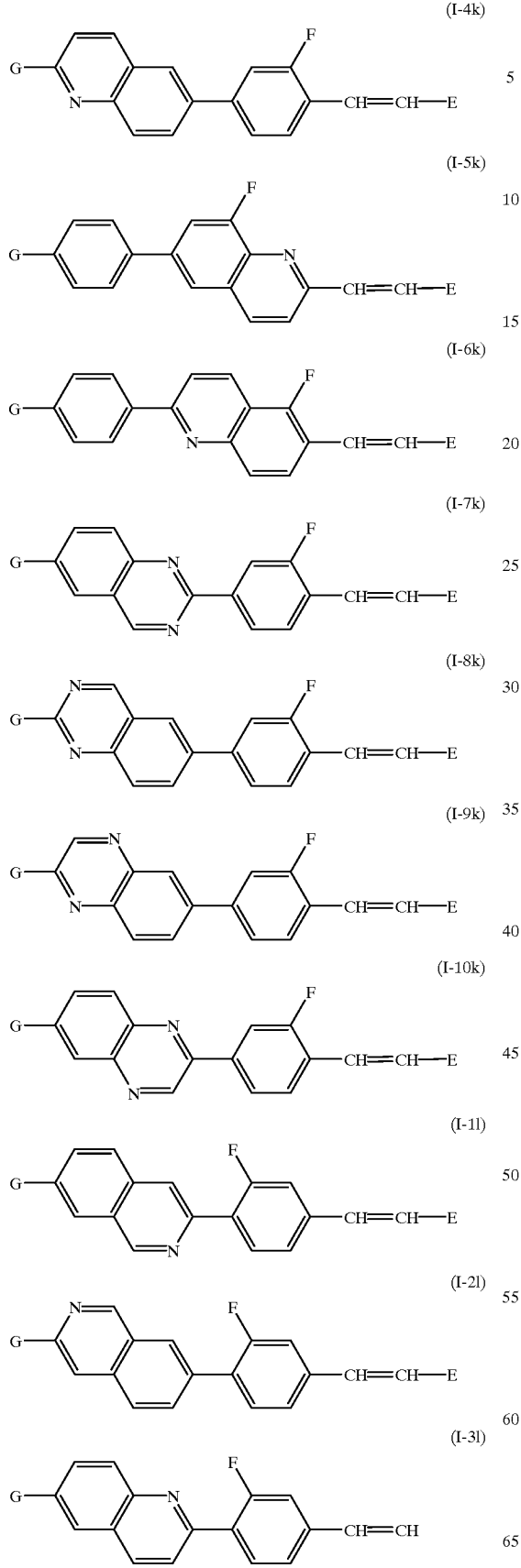
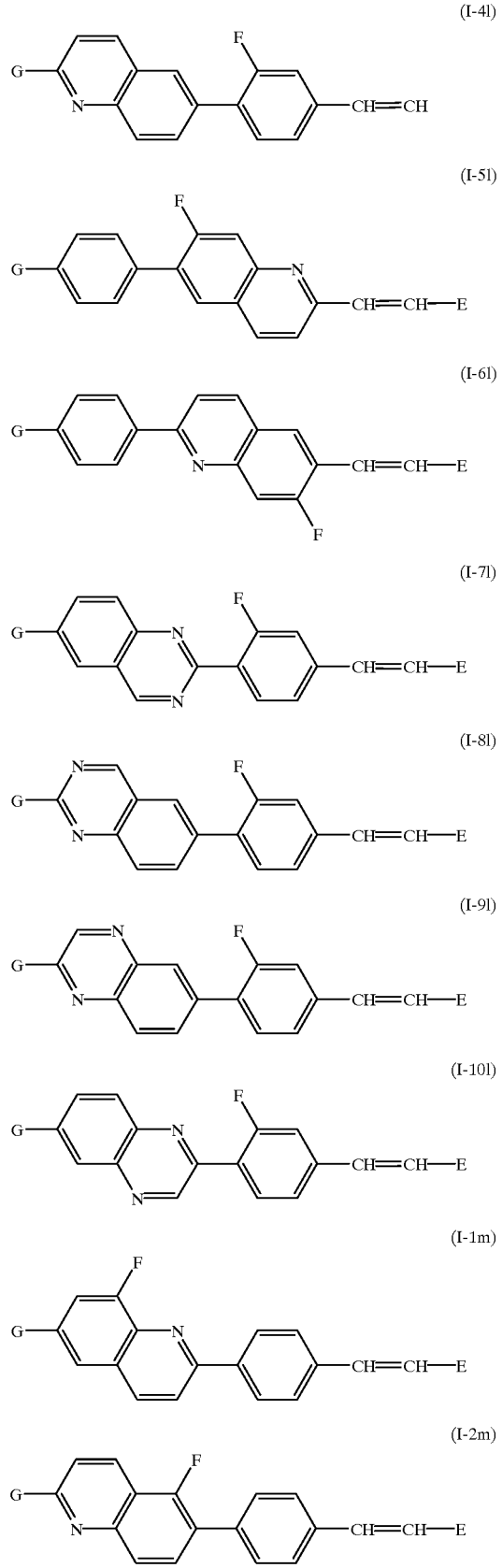

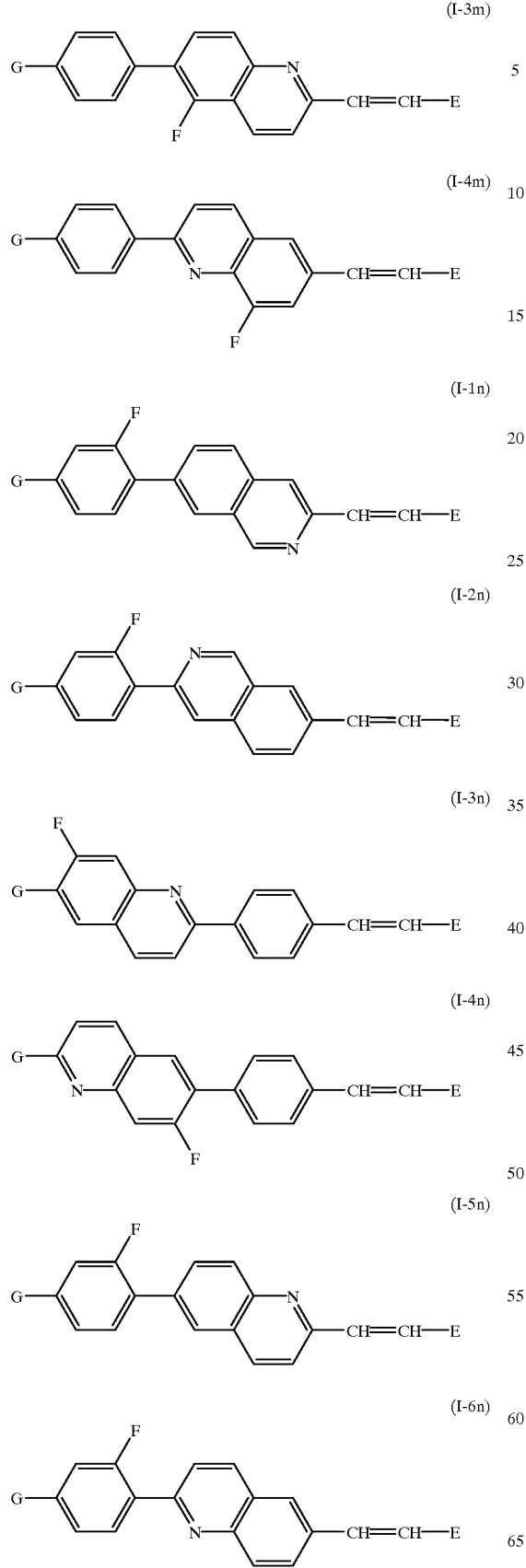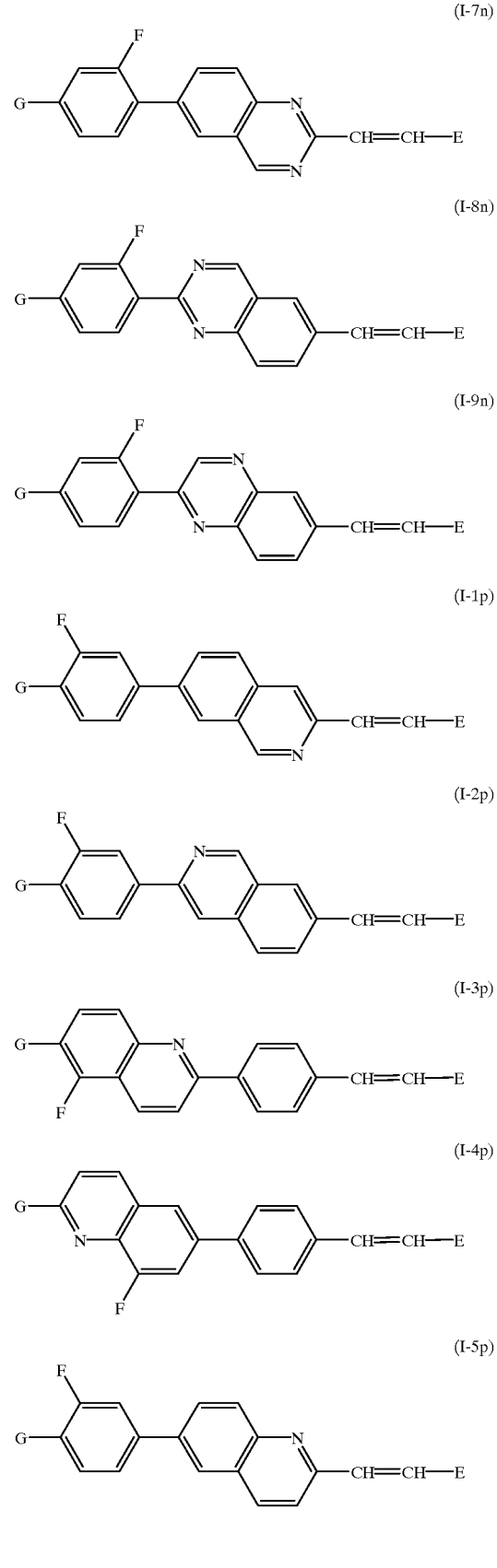

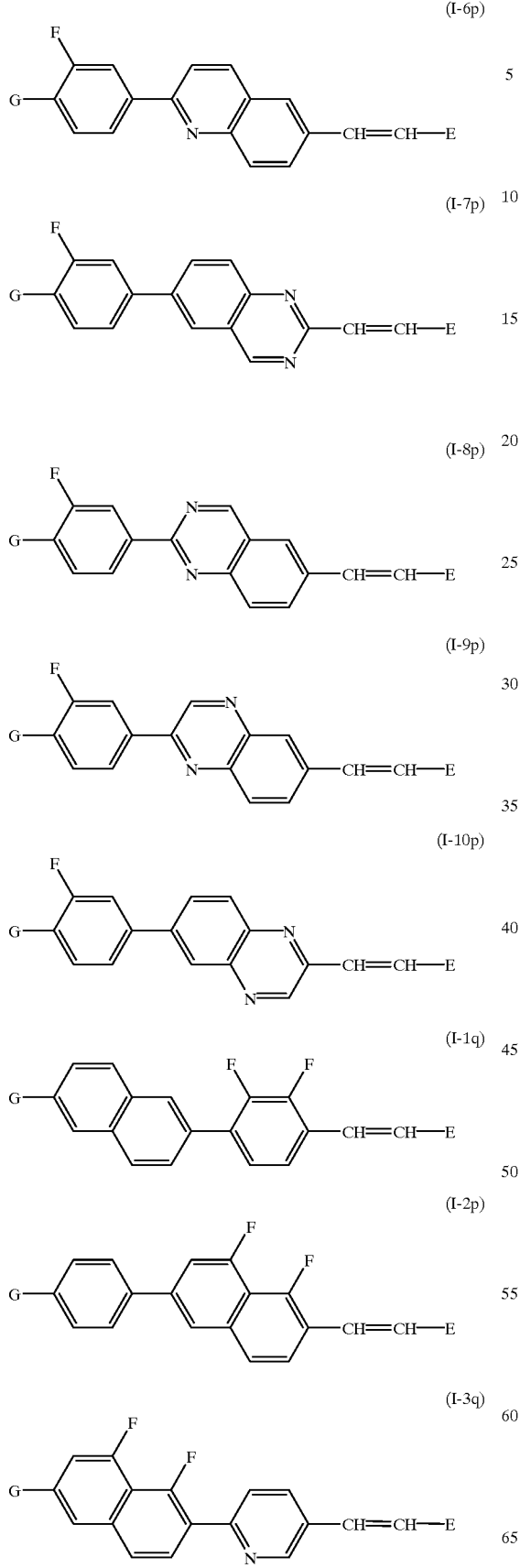
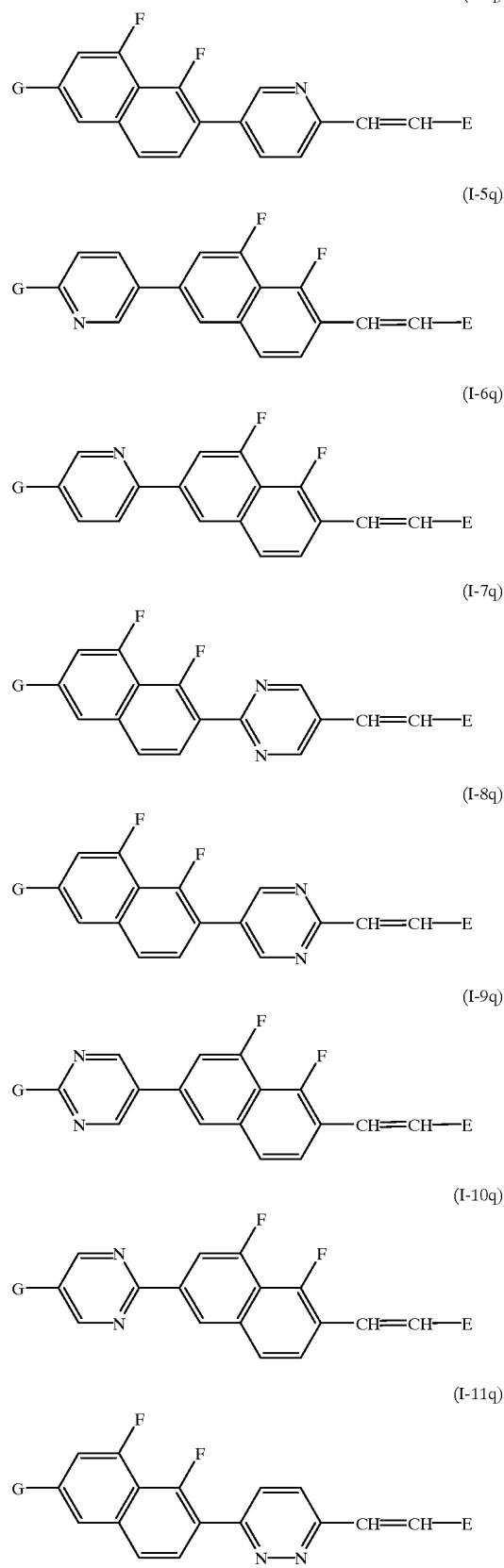

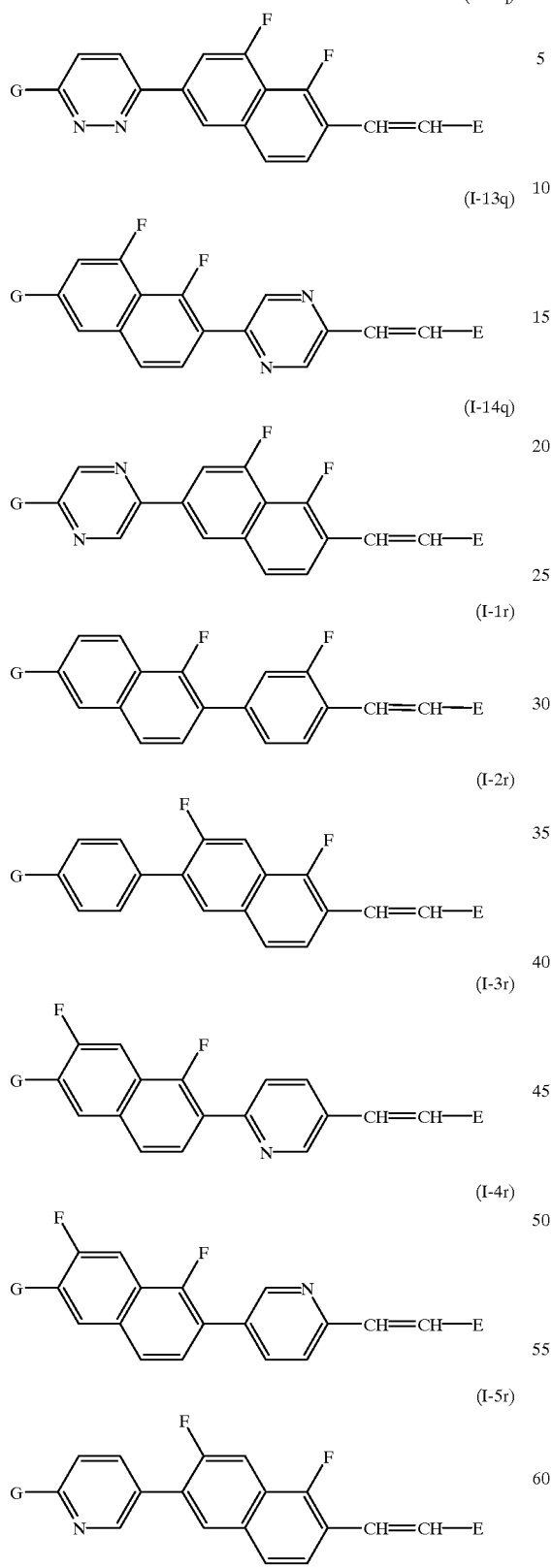
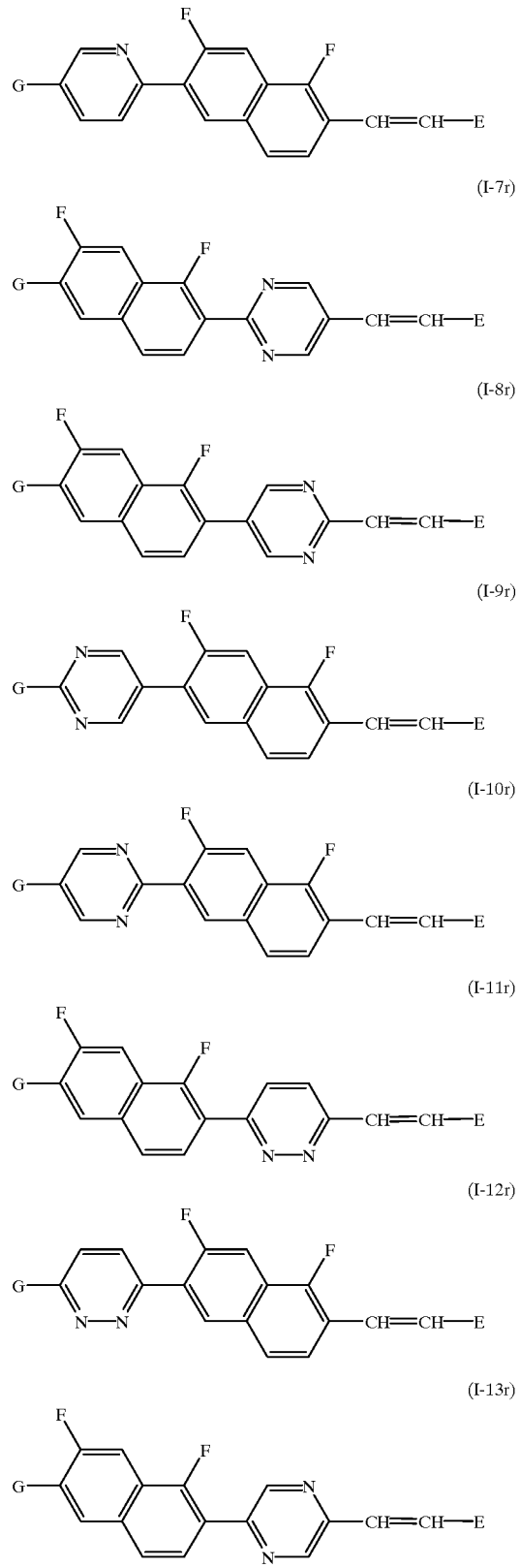

(I-14r)
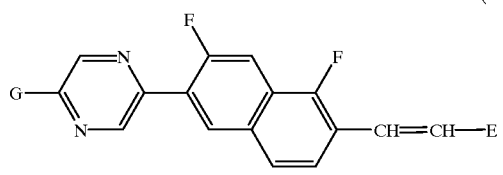
(I-1s)
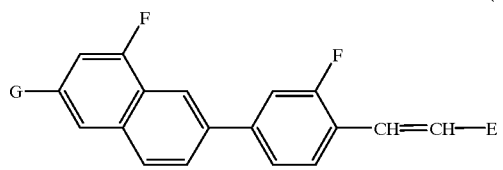
(I-2s)
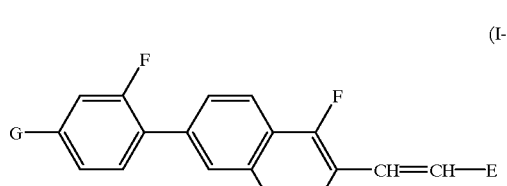
(I-3s)
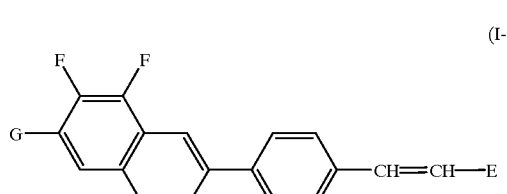
(I-4s)
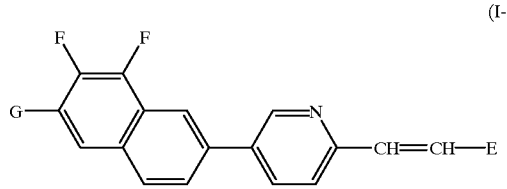
(I-5s)
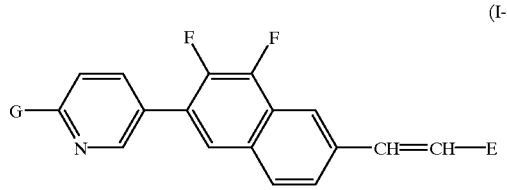
(I-6s)
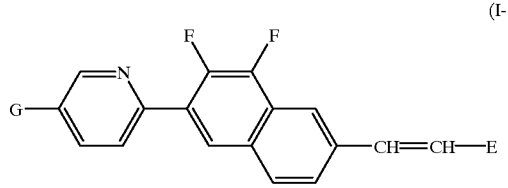
(I-7s)
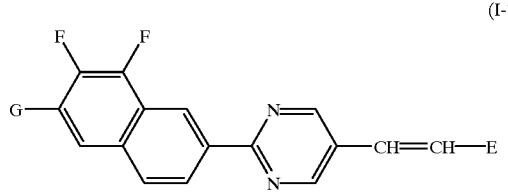
(I-8s)
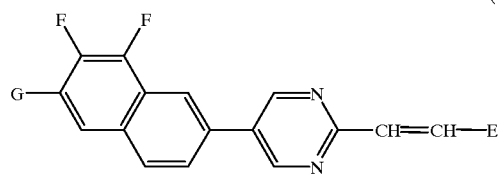
(I-9s)
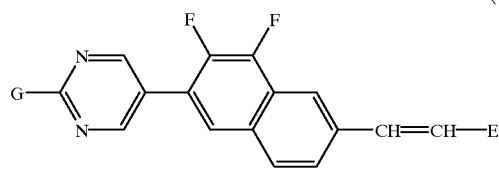
(I-10s)
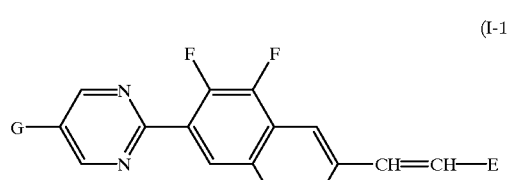
(I-11s)
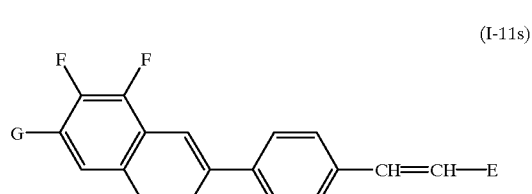
(I-12s)
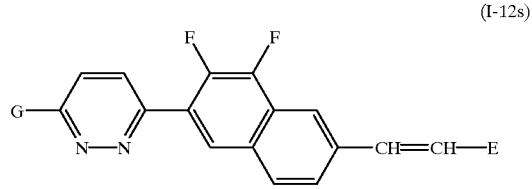
(I-13s)
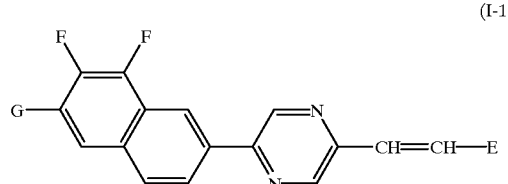
(I-14s)
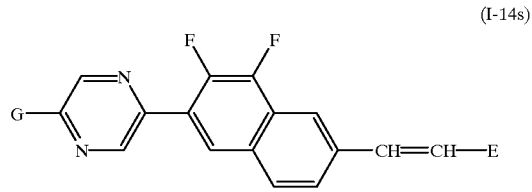
(I-15s)
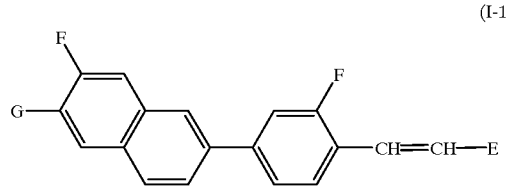

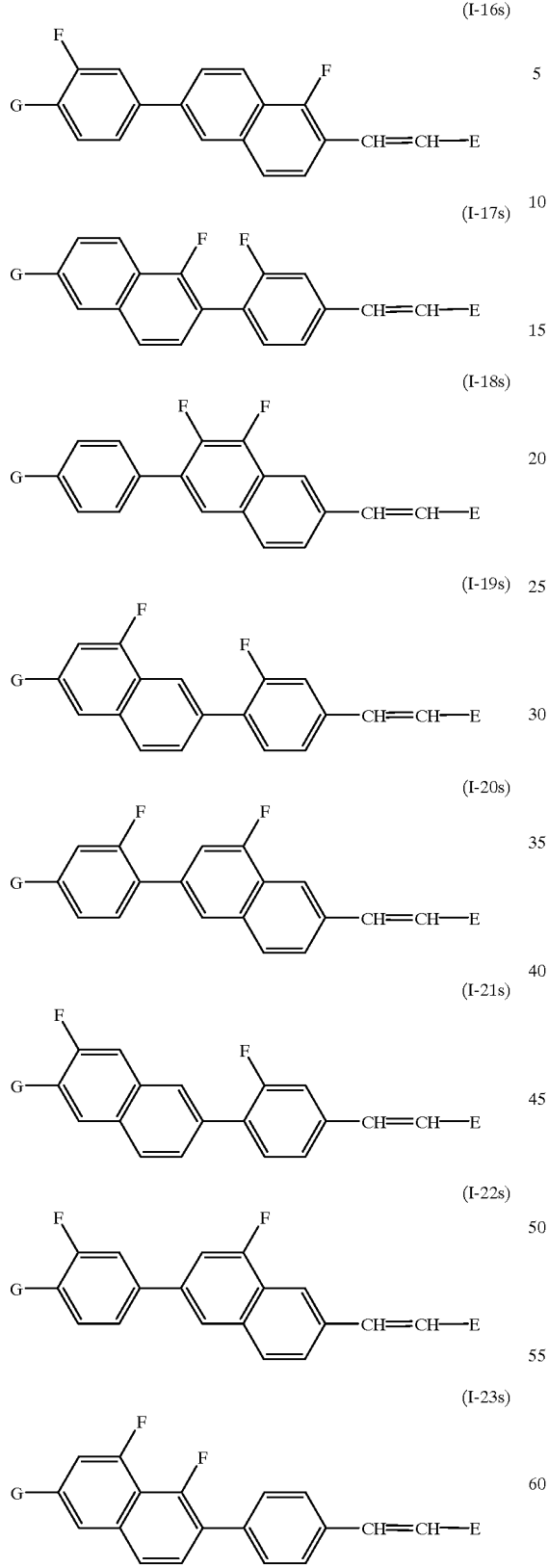
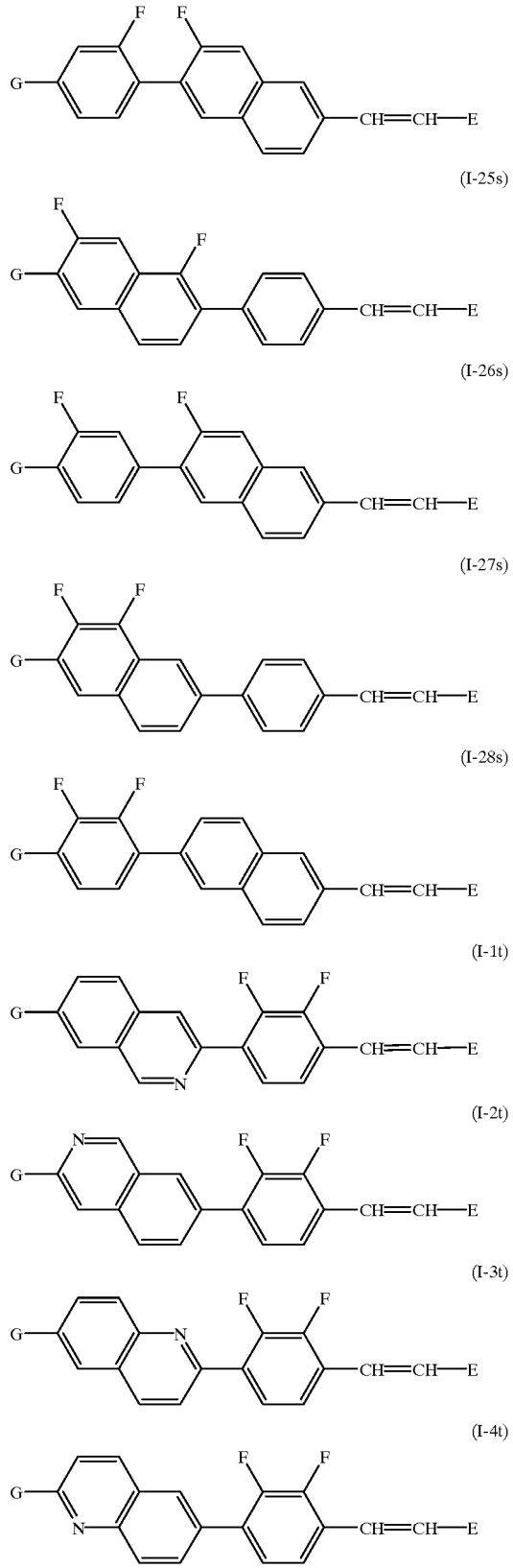

(I-5t)
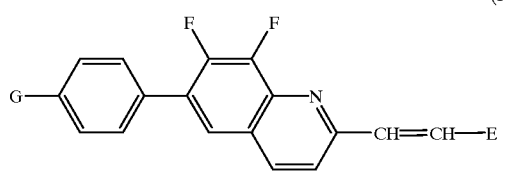
(I-6t)
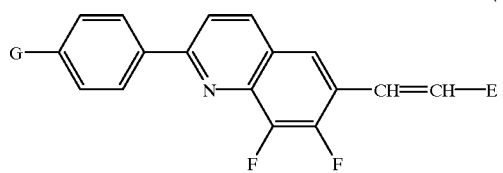
(I-7t)
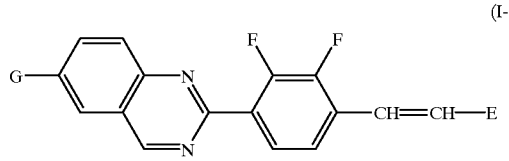
(I-8t)
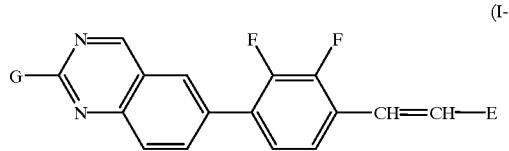
(I-9t)
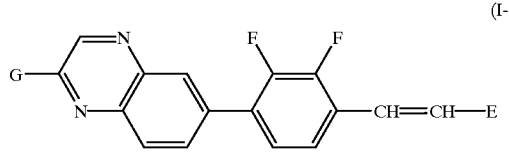
(I-10t)
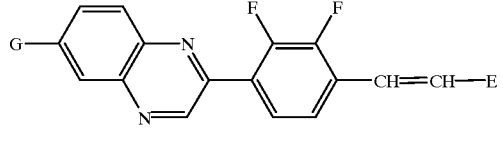
(I-1u)
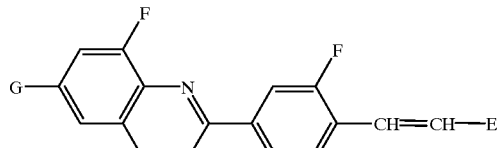
(I-2u)
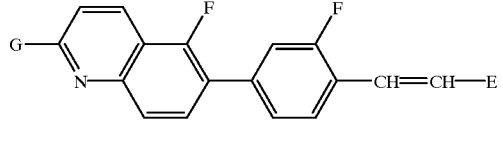
(I-3u)
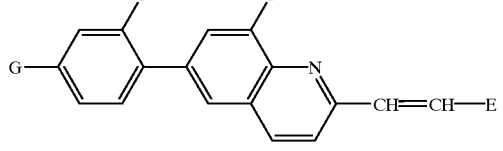
(I-4u)
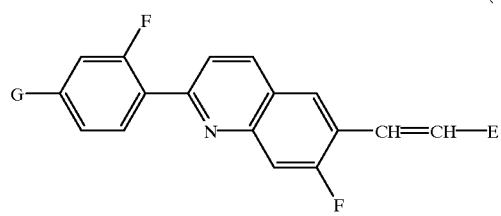
(I-1v)
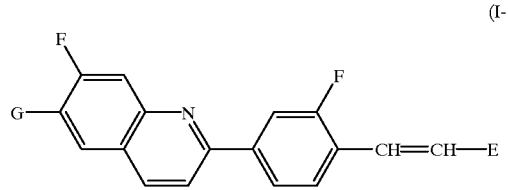
(I-2v)
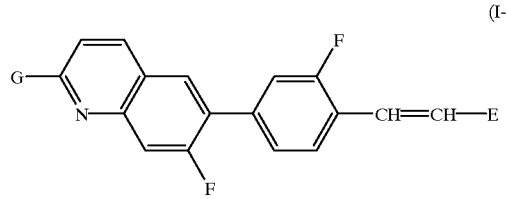
(I-3v)
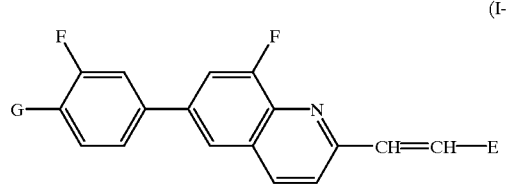
(I-4v)
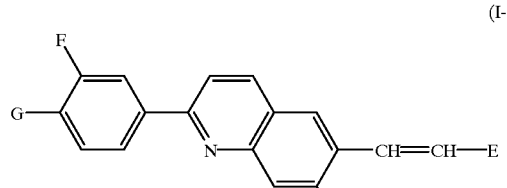
(I-1w)
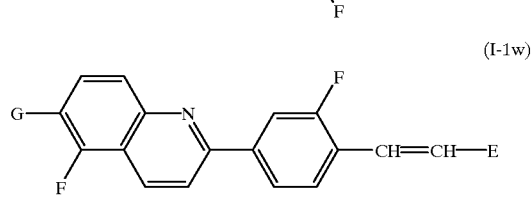
(I-2w)
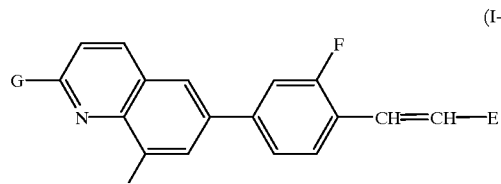
(I-3w)
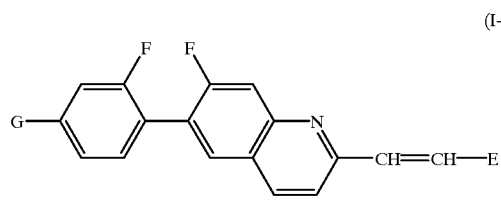

(I-4w)
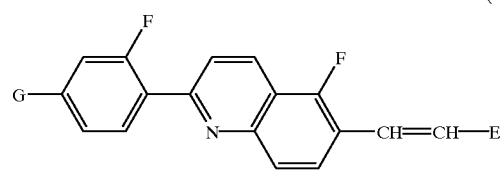
(I-1x)
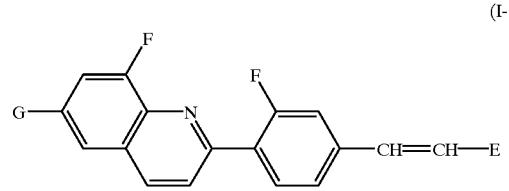
(I-2x)
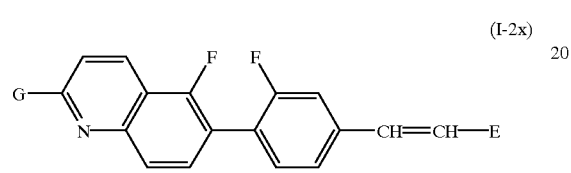
(I-3x)
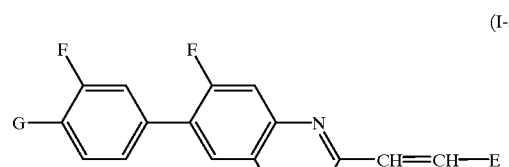
(I-4x)
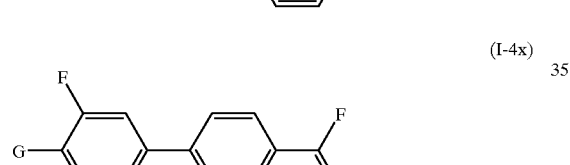
(I-1z)
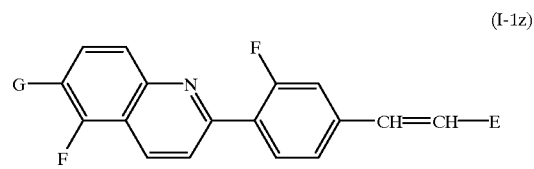
(I-2z)
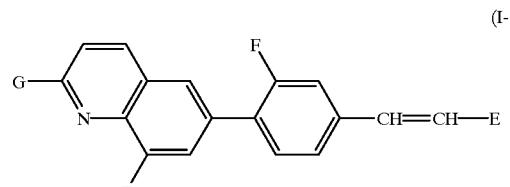
(I-3z)
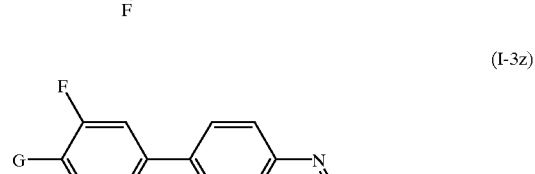
(I-4z)
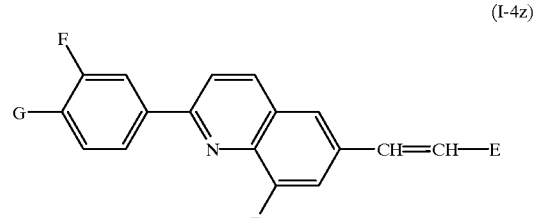
(I-1y)
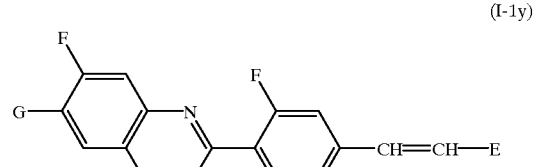
(I-2y)
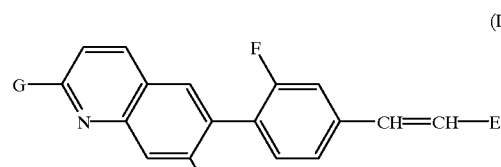
(I-3y)
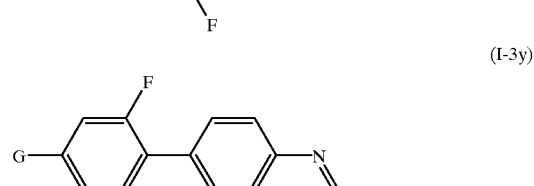
(I-4y)
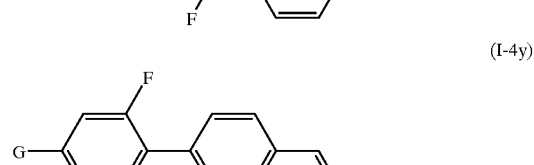
(I-1aa)
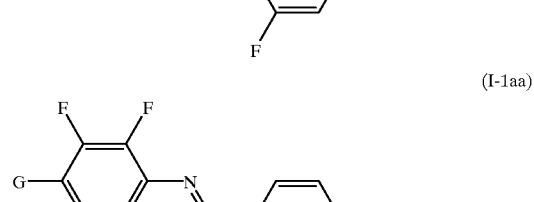
(I-2aa)
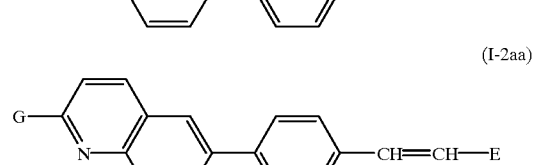
(I-3aa)
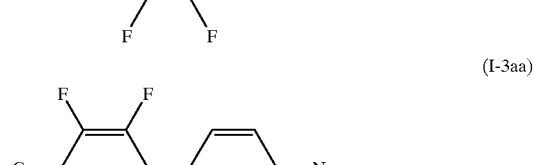

(I-15ab)
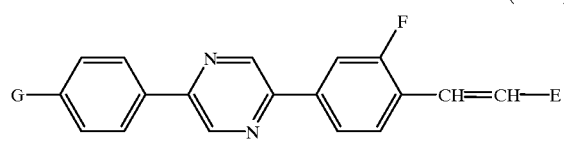
(I-16ab)
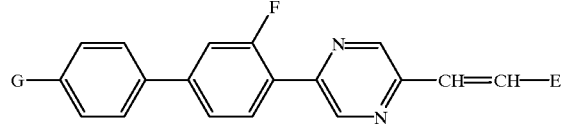
(I-17ab)
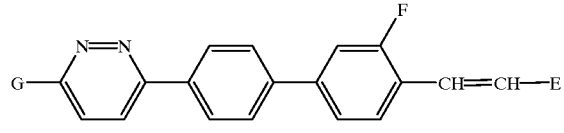
(I-18ab)
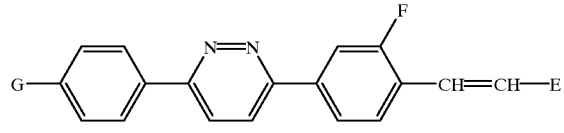
(I-19ab)
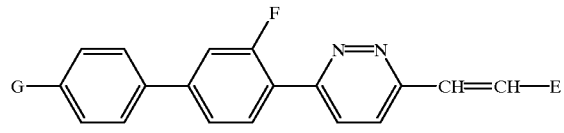
(I-1ac)
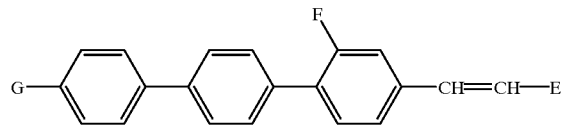
(I-2ac)
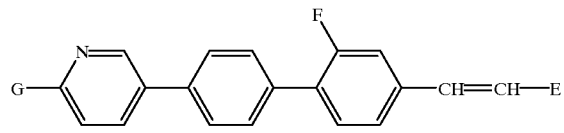
(I-3ac)
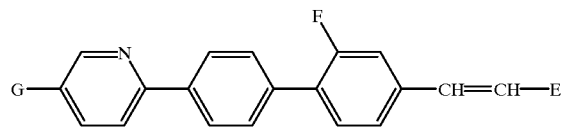
(I-4ac)
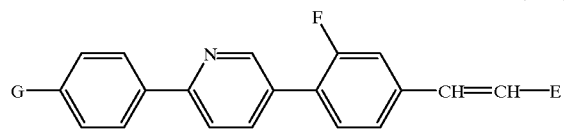
(I-5ac)
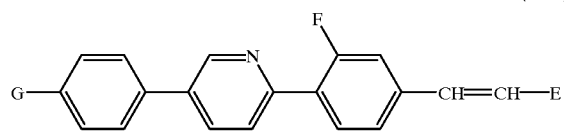
(I-6ac)
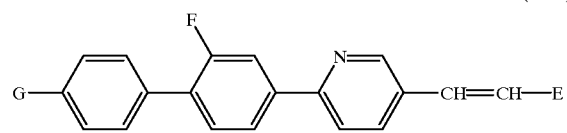
(I-7ac)
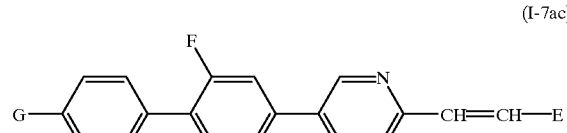
(I-8ac)
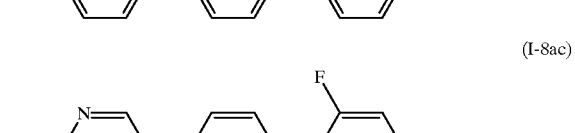
(I-9ac)
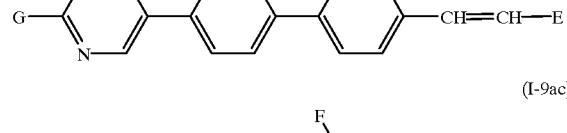
(I-10ac)
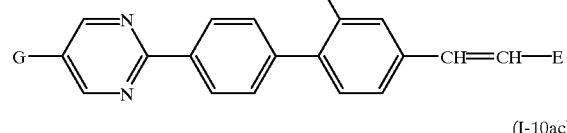
(I-11ac)
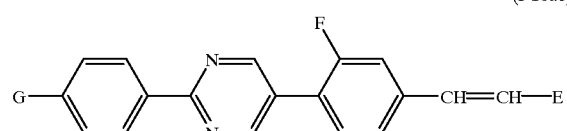
(I-12ac)
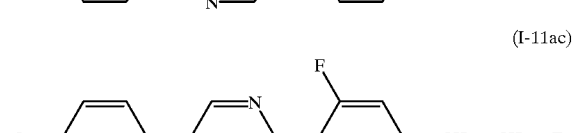
(I-13ac)
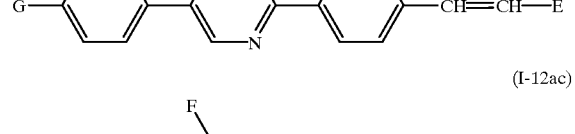
(I-14ac)
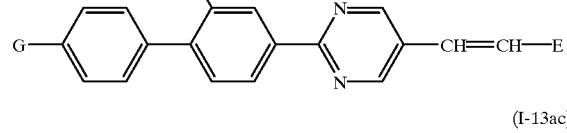
(I-15ac)

(I-16ac)
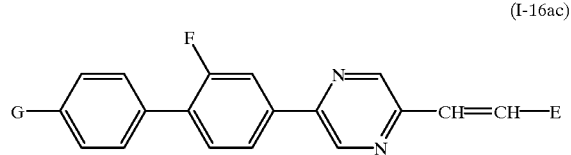
(I-17ac)
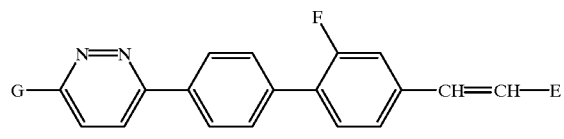
(I-18ac)
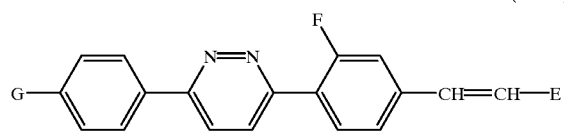
(I-19ac)
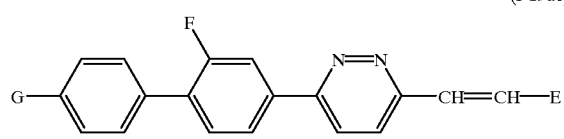
(I-1ad)
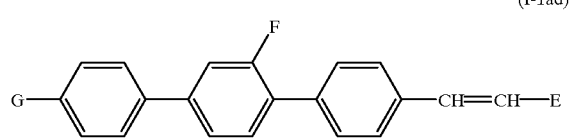
(I-2ad)
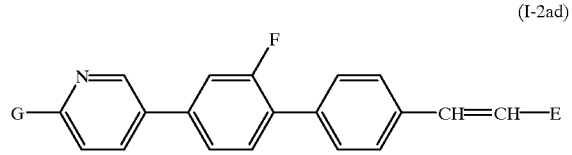
(I-3ad)
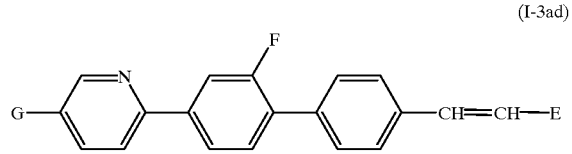
(I-4ad)
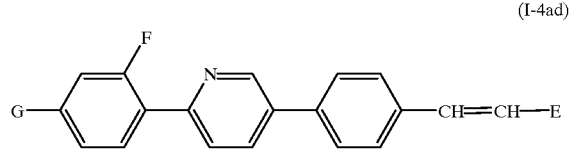
(I-5ad)
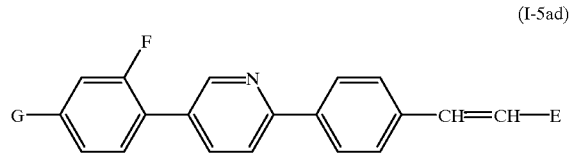
(I-6ad)
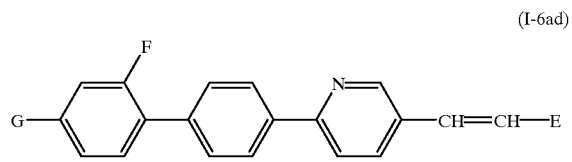
(I-7ad)
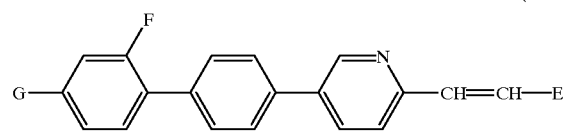
(I-8ad)
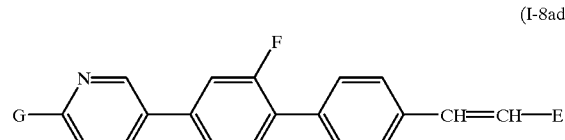
(I-9ad)
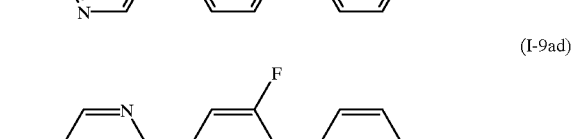
(I-10ad)
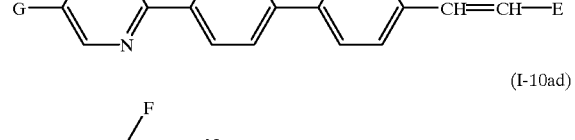
(I-11ad)
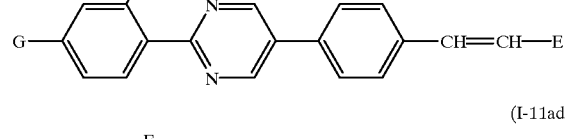
(I-12ad)
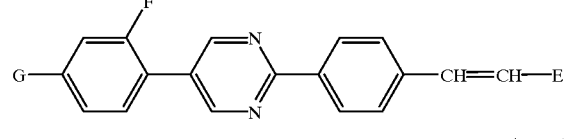
(I-13ad)
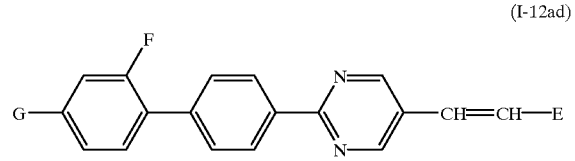
(I-14ad)
(I-15ad)
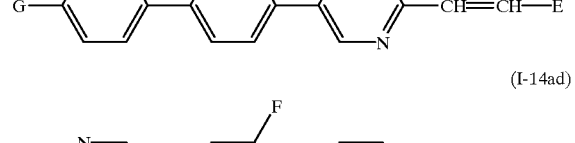
(I-16ad)
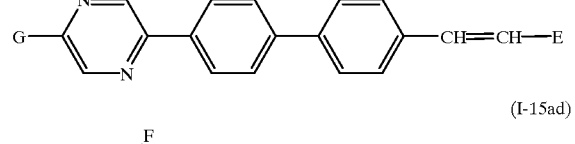
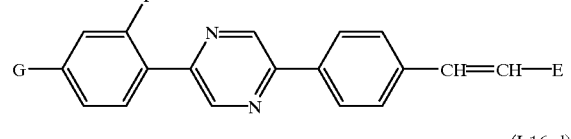
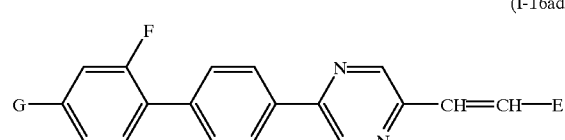

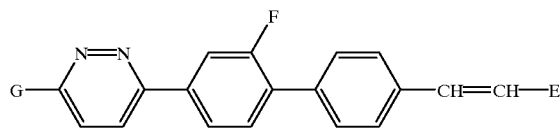
(I-17ad)
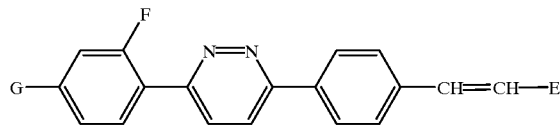
(I-18ad)
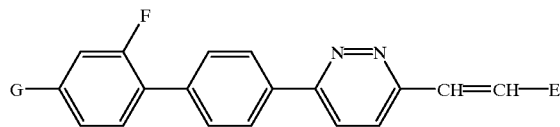
(I-19ad)
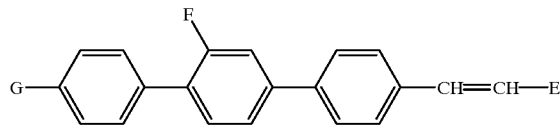
(I-1ae)
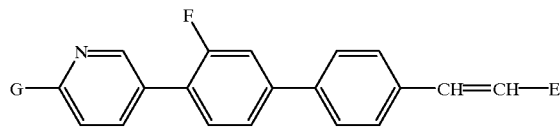
(I-2ae)
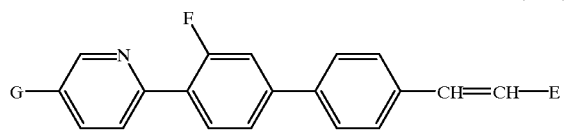
(I-3ae)
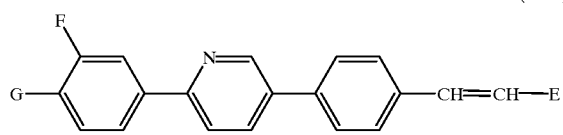
(I-4ae)
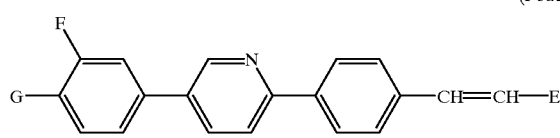
(I-5ae)
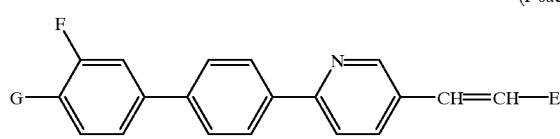
(I-6ae)
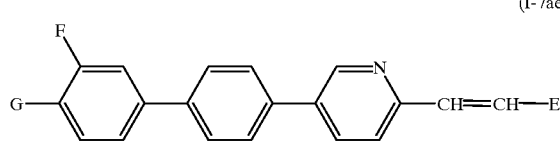
(I-7ae)
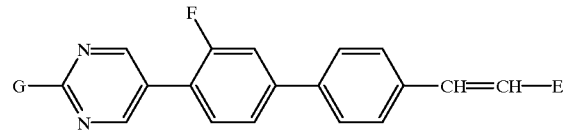
(I-8ae)
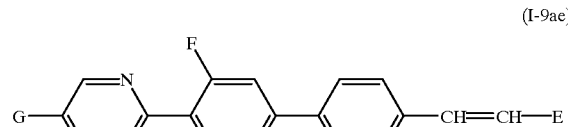
(I-9ae)
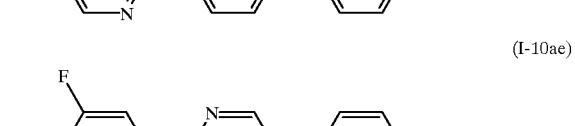
(I-10ae)
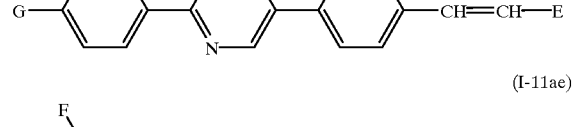
(I-11ae)
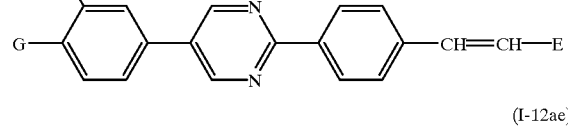
(I-12ae)
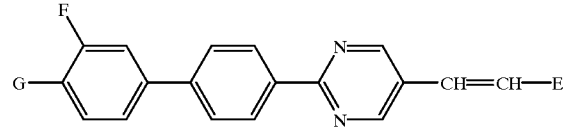
(I-13ae)
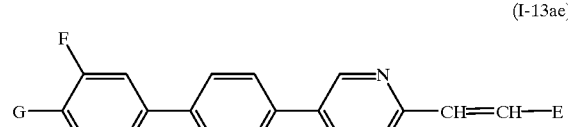
(I-14ae)
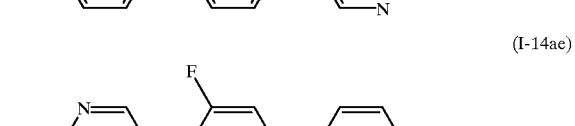
(I-15ae)
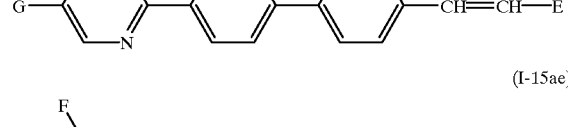
(I-16ae)
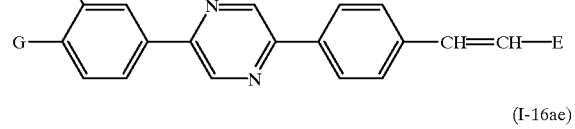
(I-17ae)

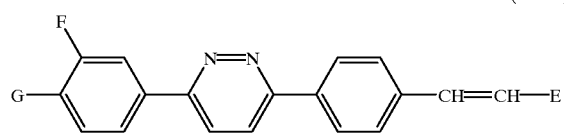
(I-18ae)
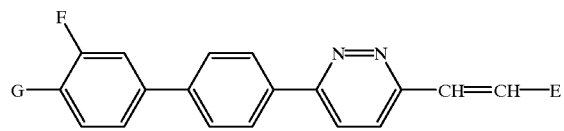
(I-19ae)
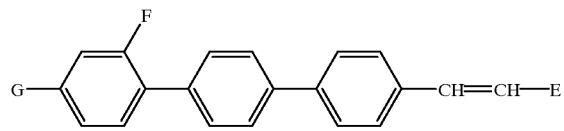
(I-20ae)
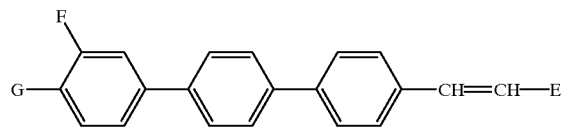
(I-21ae)
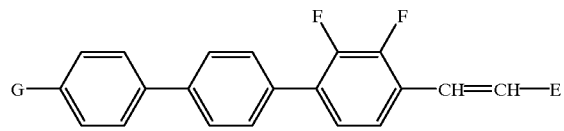
(I-1af)
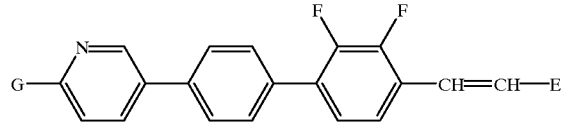
(I-2af)
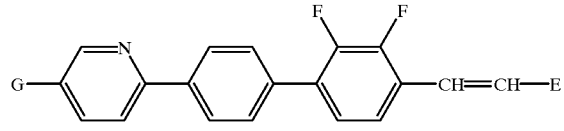
(I-3af)
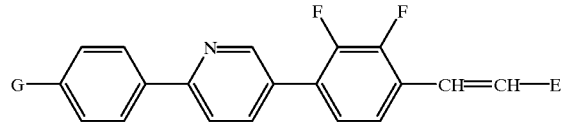
(I-4af)
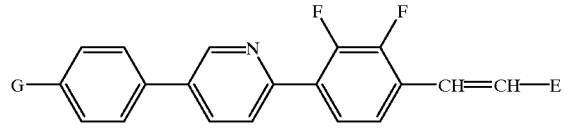
(I-5af)
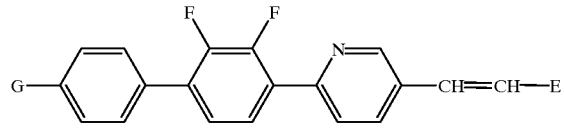
(I-6af)
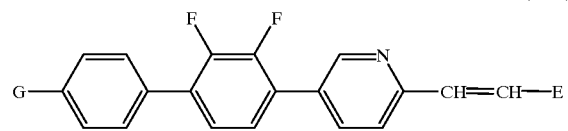
(I-7af)
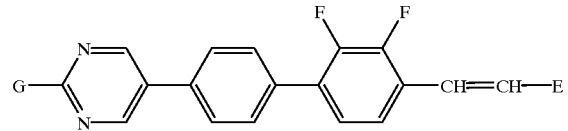
(I-8af)
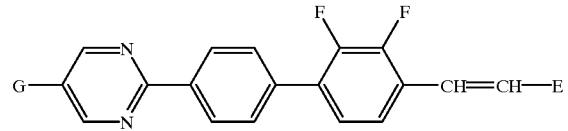
(I-9af)
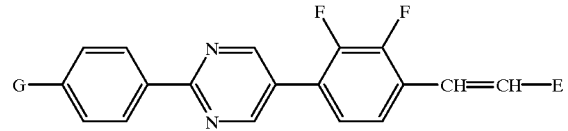
(I-10af)
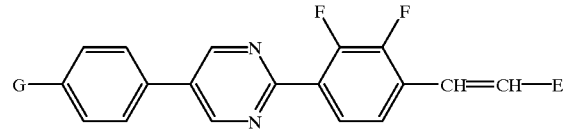
(I-11af)
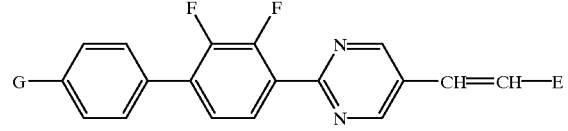
(I-12af)
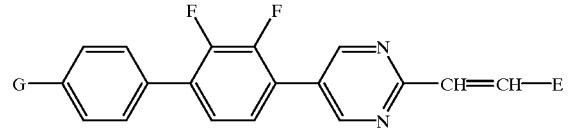
(I-13af)
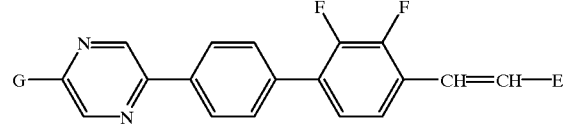
(I-14af)
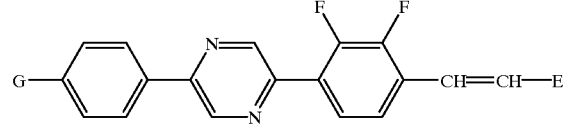
(I-15af)
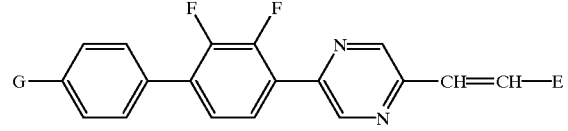
(I-16af)

(I-17af)
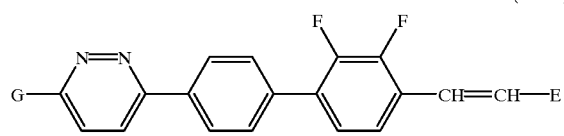
(I-18af)
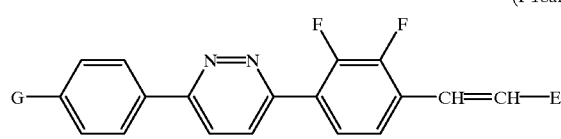
(I-19af)
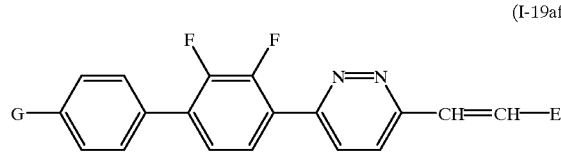
(I-1ag)
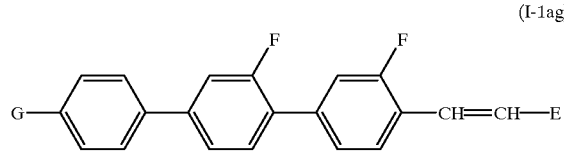
(I-2ag)
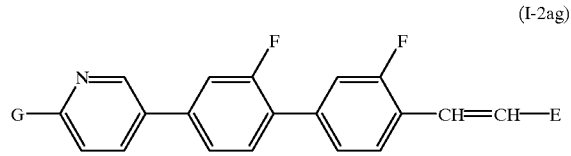
(I-3ag)
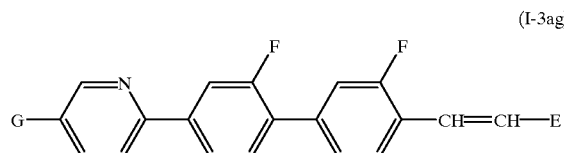
(I-4ag)
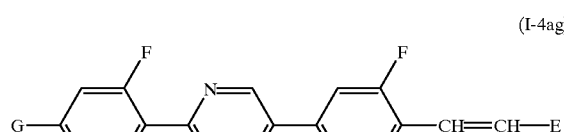
(I-5ag)
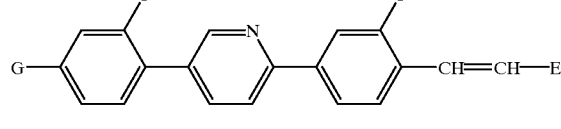
(I-6ag)
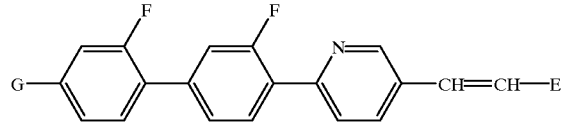
(I-7ag)
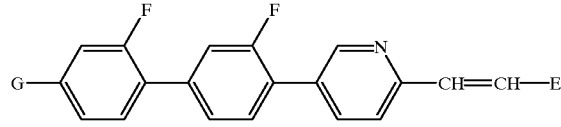
(I-8ag)
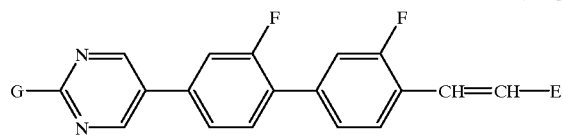
(I-9ag)
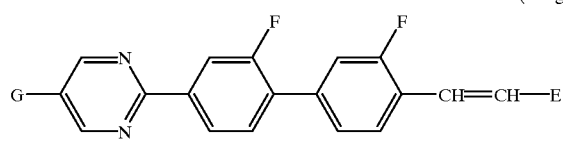
(I-10ag)
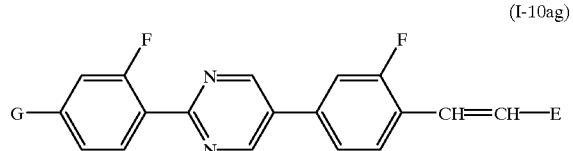
(I-11ag)
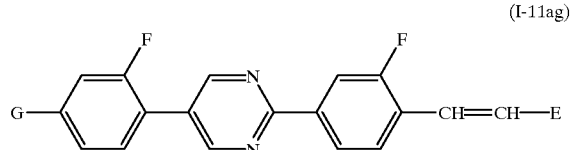
(I-12ag)
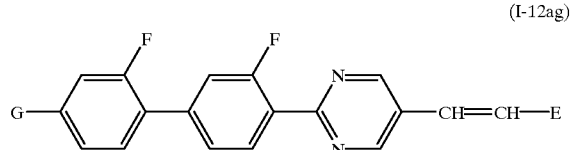
(I-13ag)
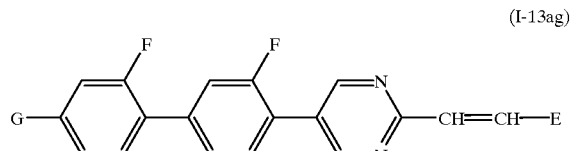
(I-14ag)
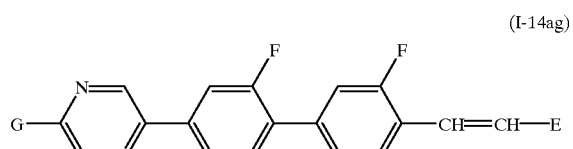
(I-15ag)
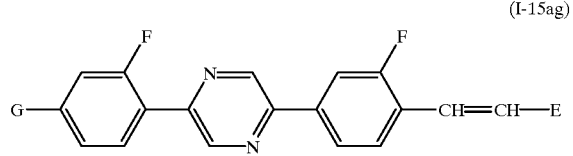
(I-16ag)
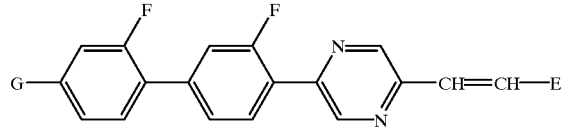
(I-17ag)
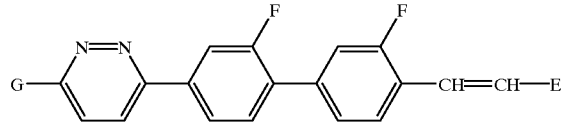

-continued
(I-18ag)
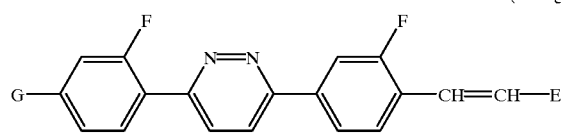
(I-19ag)
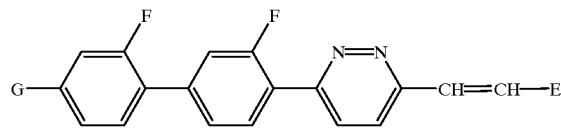
(I-1ah)
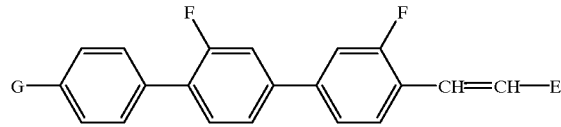
(I-2ah)
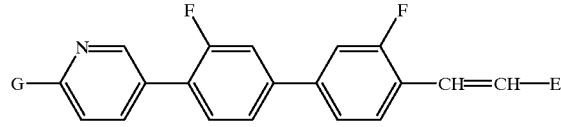
(I-3ah)
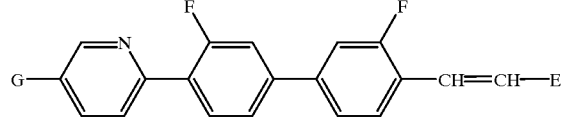
(I-4ah)
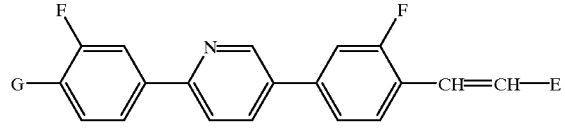
(I-5ah)
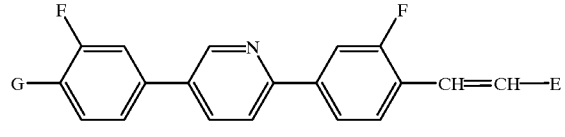
(I-6ah)
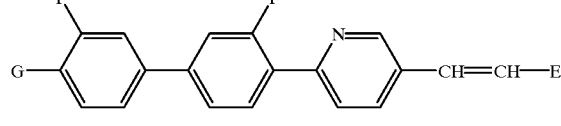
(I-7ah)
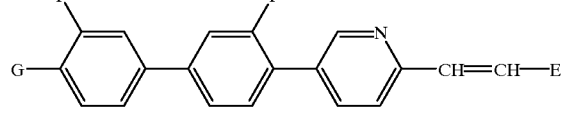
(I-8ah)
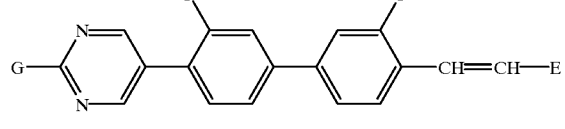
-continued
(I-9ah)
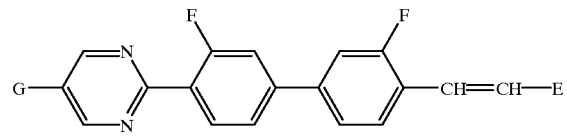
(I-10ah)
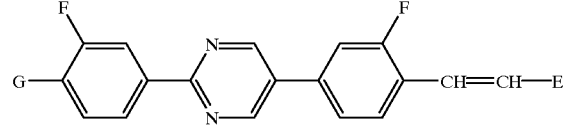
(I-11ah)
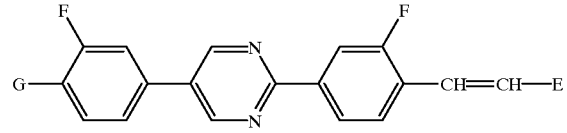
(I-12ah)
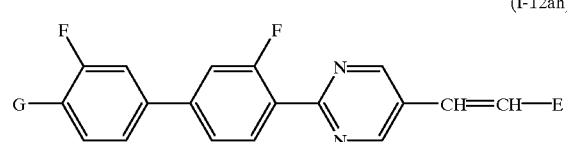
(I-13ah)
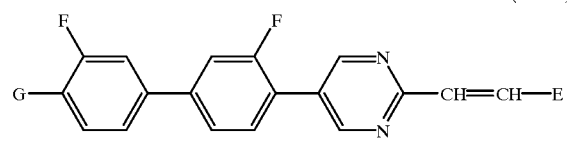
(I-14ah)
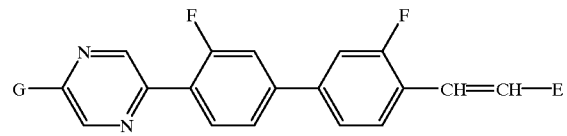
(I-15ah)
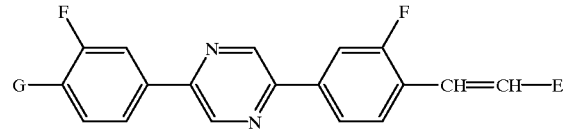
(I-16ah)
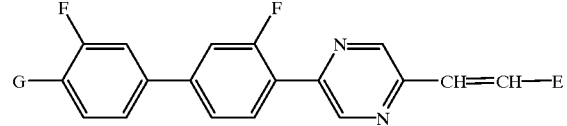
(I-17ah)
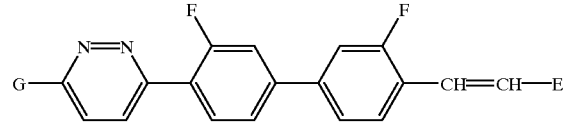
(I-18ah)
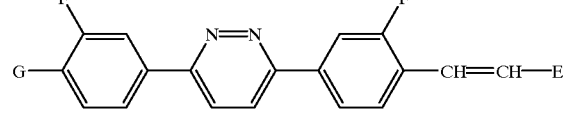

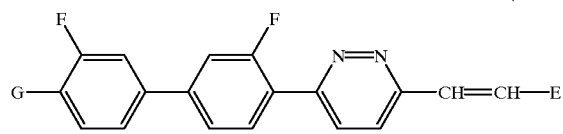
(I-19ah)
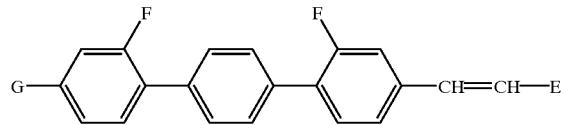
(I-1ai)
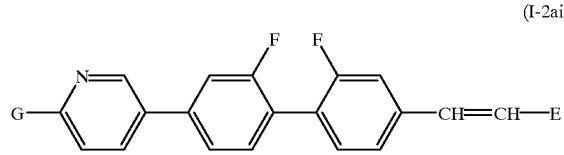
(I-2ai)
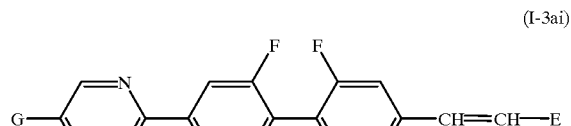
(I-3ai)
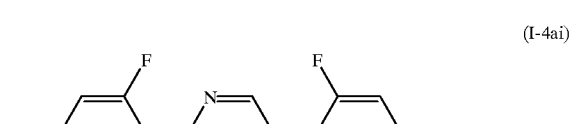
(I-4ai)
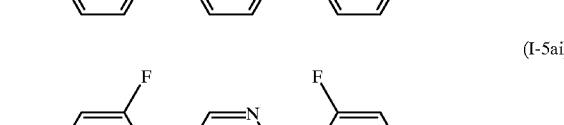
(I-5ai)
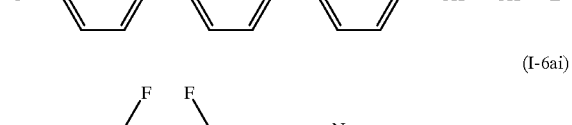
(I-6ai)
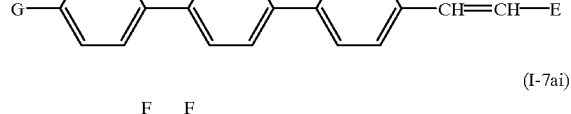
(I-7ai)
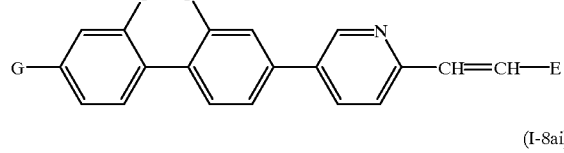
(I-8ai)
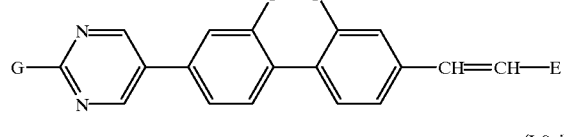
(I-9ai)
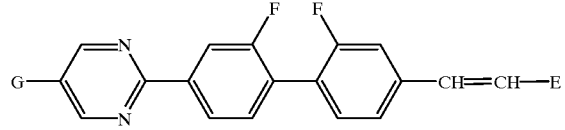
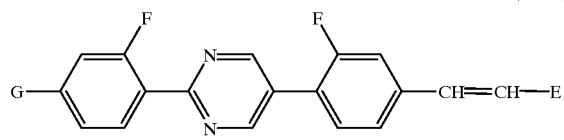
(I-10ai)
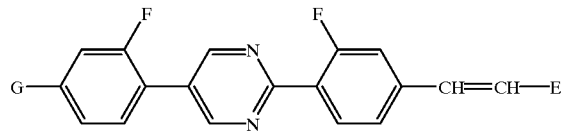
(I-11ai)
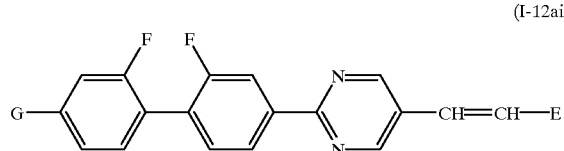
(I-12ai)
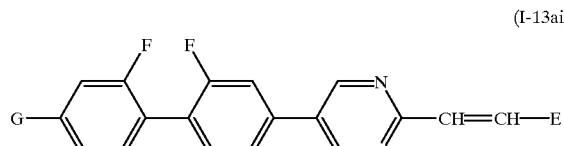
(I-13ai)
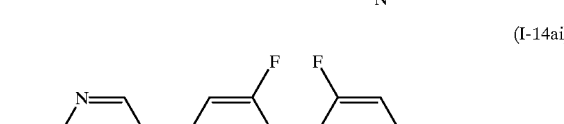
(I-14ai)
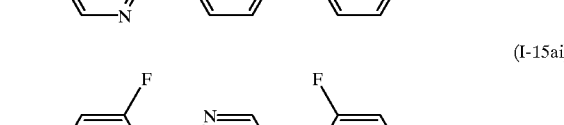
(I-15ai)
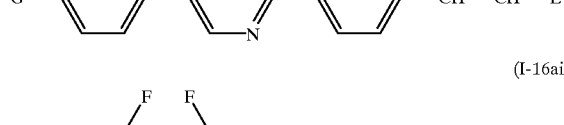
(I-16ai)
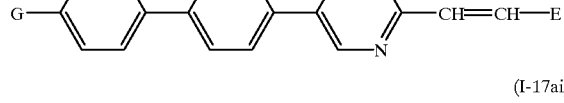
(I-17ai)
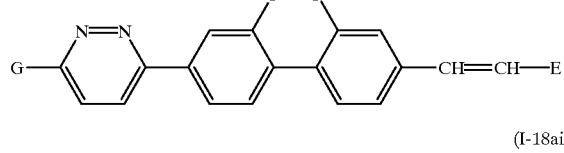
(I-18ai)
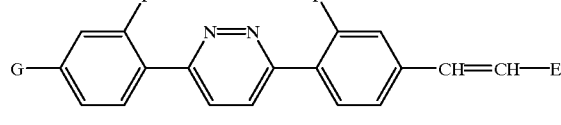
(I-19ai)

(I-2ak)
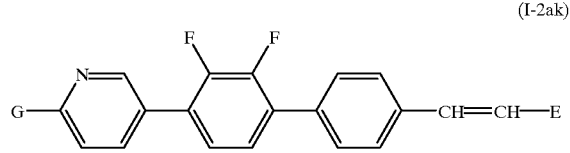
(I-3ak)
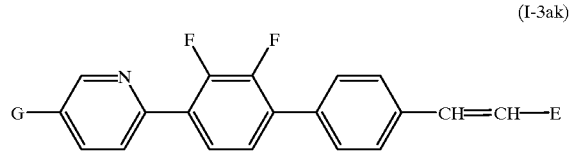
(I-4ak)
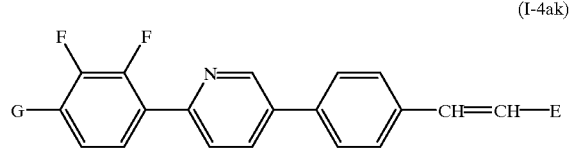
(I-5ak)
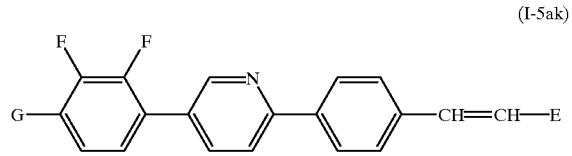
(I-6ak)
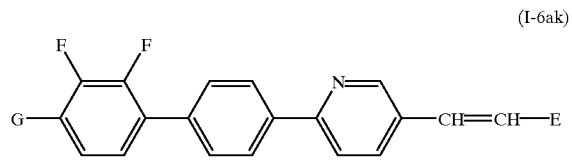
(I-7ak)
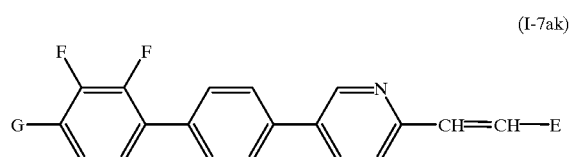
(I-8ak)
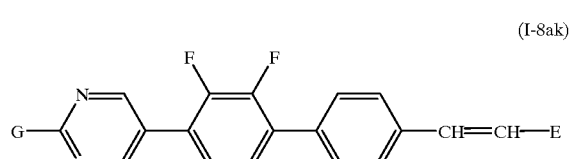
(I-9ak)
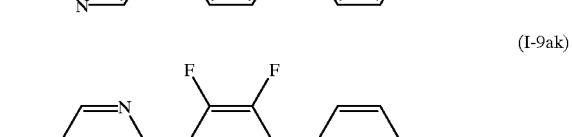
(I-10ak)
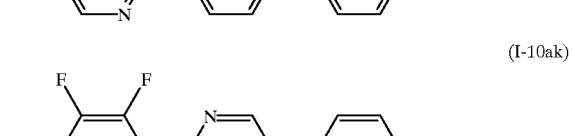
(I-11ak)
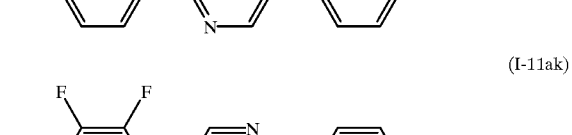
(I-12ak)
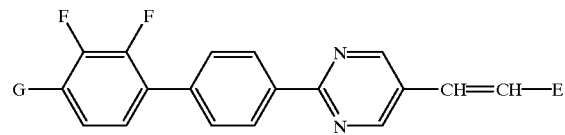
(I-13ak)
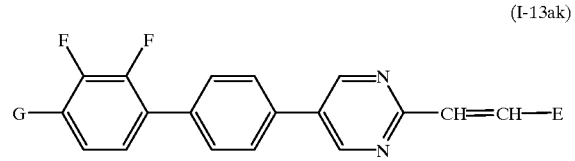
(I-14ak)
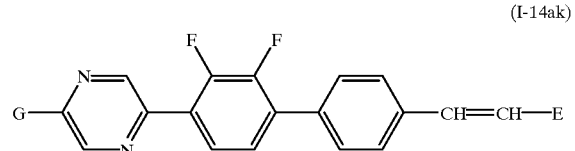
(I-15ak)
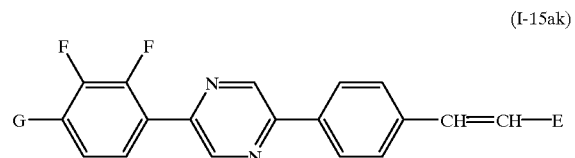
(I-16ak)
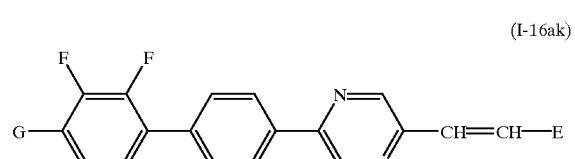
(I-17ak)
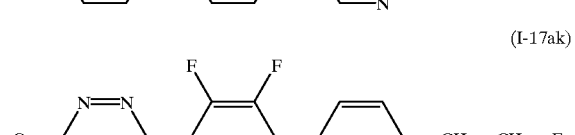
(I-18ak)
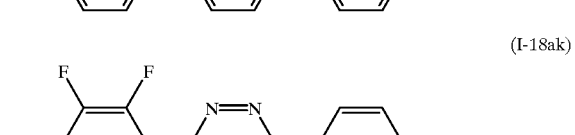
(I-19ak)
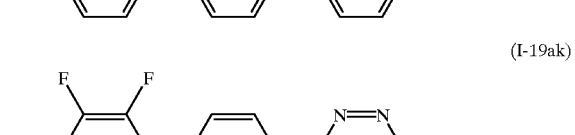
(I-1al)
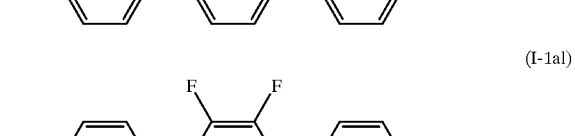
(I-2al)
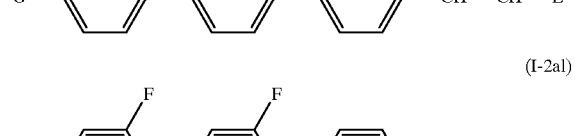

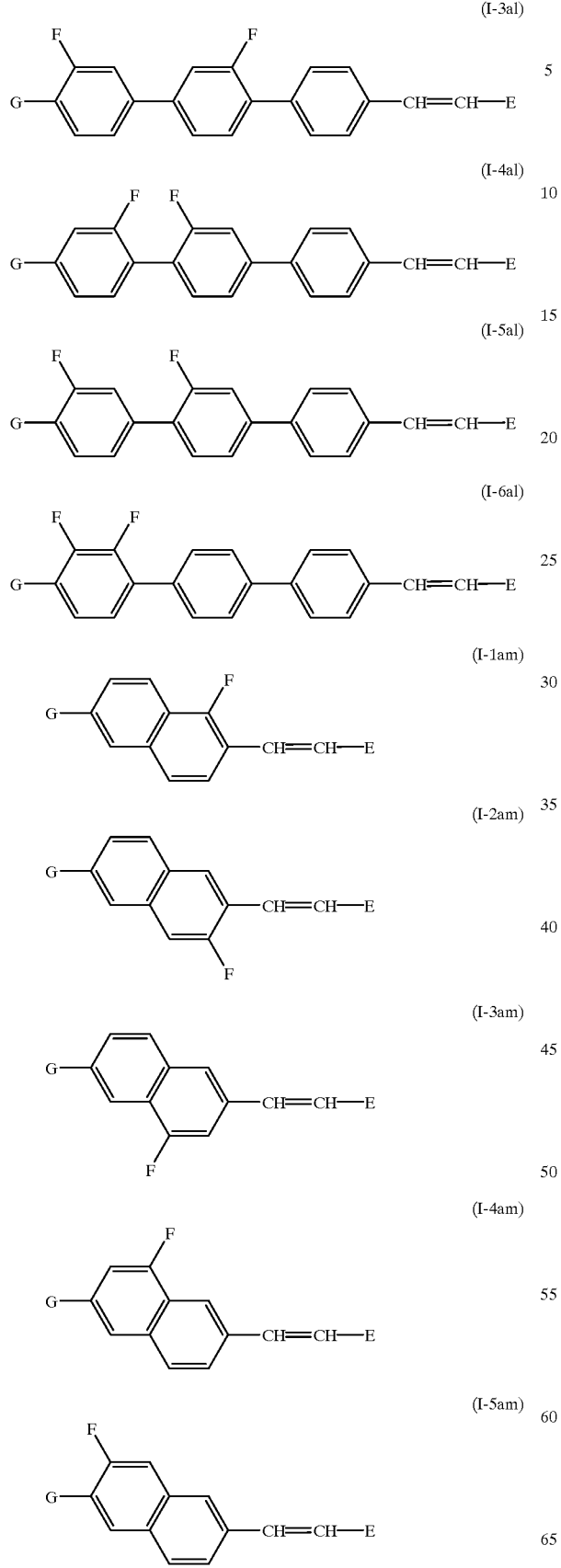
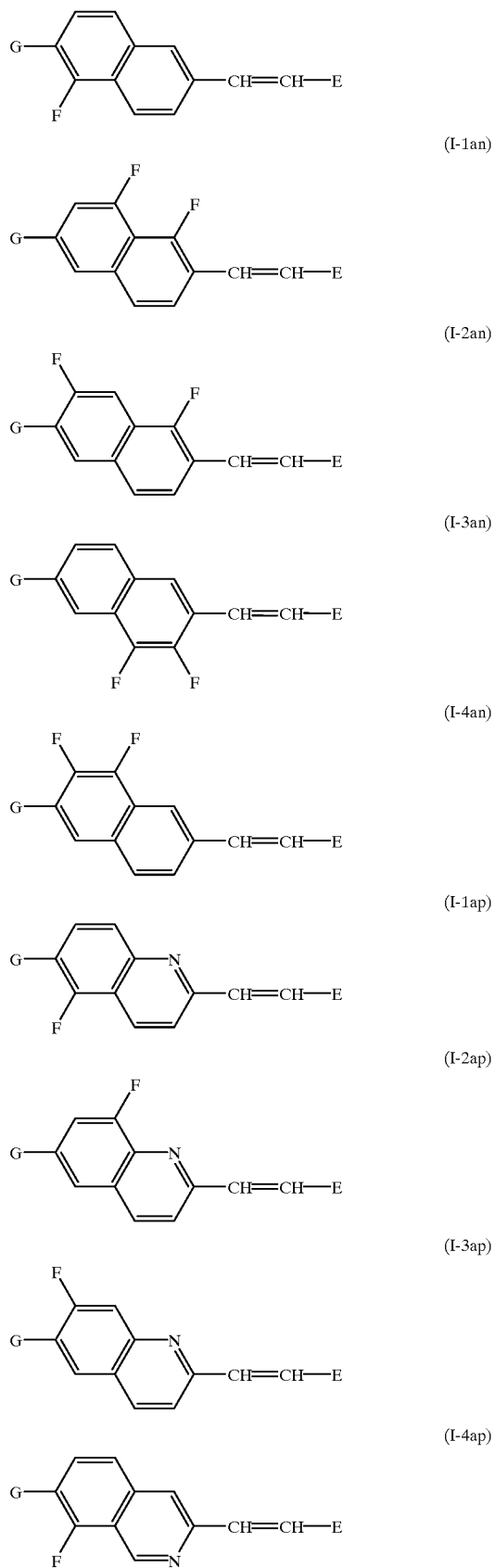

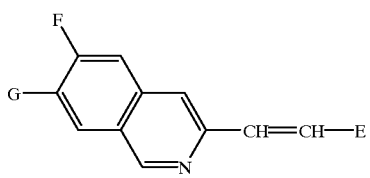 (I-5ap)
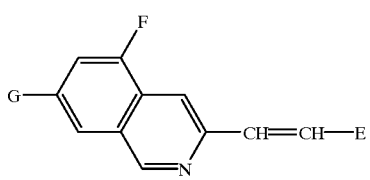 (I-6ap)
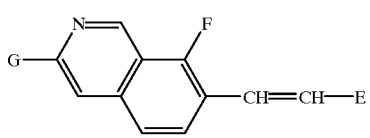 (I-1aq)
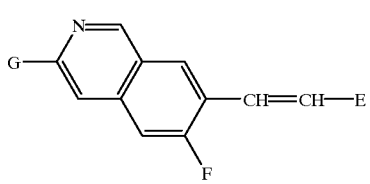 (I-2aq)
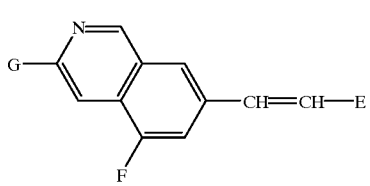 (I-3aq)
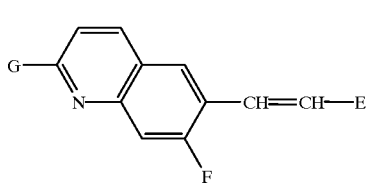 (I-4aq)
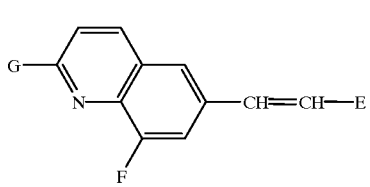 (I-5aq)
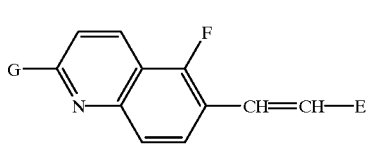 (I-6aq)
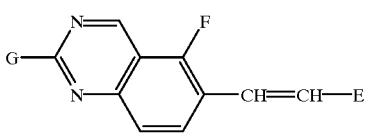 (I-1ar)
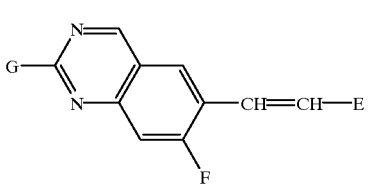 (I-2ar)
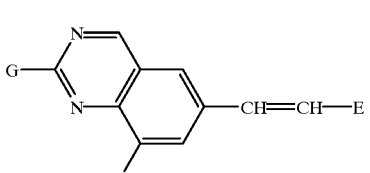 (I-3ar)
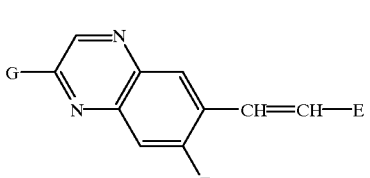 (I-4ar)
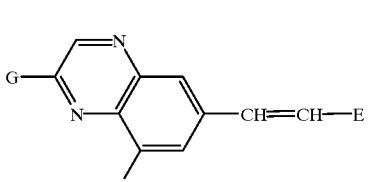 (I-5ar)
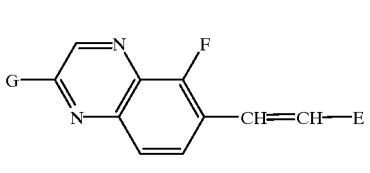 (I-6ar)
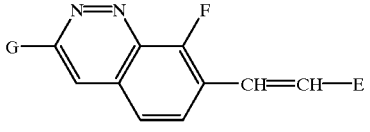 (I-7ar)
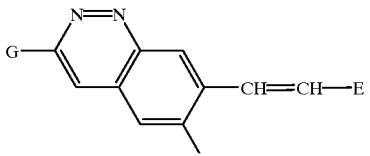 (I-8ar)

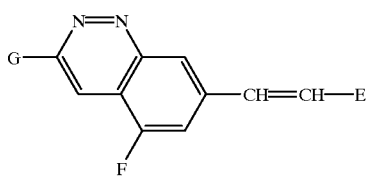
(I-9ar)

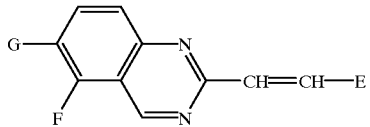
(I-1as)

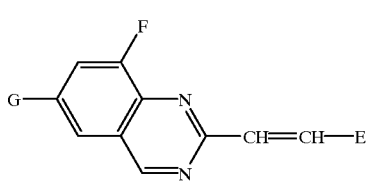
(I-2as)

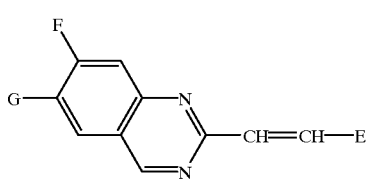
(I-3as)

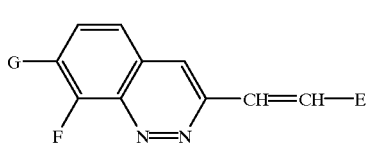
(I-4as)

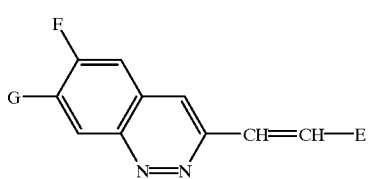
(I-5as)

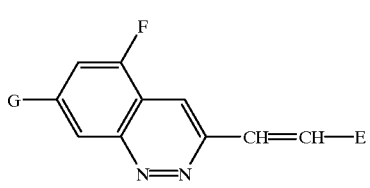
(I-6as)

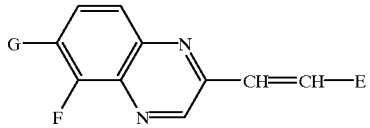
(I-7as)

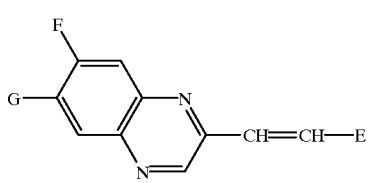
(I-8as)

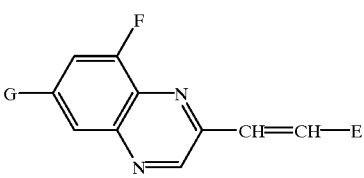
(I-9as)

Specific examples of the compound of the formula (II) are as follows:

4"-alkyl-4-(6-fluoro-1-heptynyl)-p-terphenyl,
4"-alkyloxy-4-(6-fluoro-1-heptynyl)-p-terphenyl,
6-alkyl-2-[4-(6-fluoro-1-heptynyl)phenyl]naphthalene,
6-alkyloxy-2-[4-(6-fluoro-1-heptynyl)phenyl]-naphthalene,
6-(4-alkylphenyl)-2-(6-fluoro-1-heptynyl)naphthalene,
6-(4-alkyloxyphenyl)-2-(6-fluoro-1-heptynyl)naphthalene,
5-alkyl-[4-(6-fluoro-1-heptynyl)phenyl]pyridine,
5-alkyloxy-[4-(6-fluoro-1-heptynyl)phenyl]pyridine,
2-(4-alkylphenyl)-5-(6-fluoro-1-heptynyl)pyridine,
2-(4-alkyloxyphenyl)-5-(6-fluoro-1-heptynyl)pyridine,
2-alkyl-5-[4-(6-fluoro-1-heptynyl)phenyl]pyridine,
2-alkyloxy-5-[4-(6-fluoro-1-heptynyl)phenyl]pyridine,
5-(4-alkylphenyl)-2-(6-fluoro-1-heptynyl)pyridine,
5-(4-alkyloxyphenyl)-2-(6-fluoro-1-heptynyl)pyridine,
5-alkyl-2-[4'-(6-fluoro-1-heptynyl)-4-biphenylyl]pyridine,
5-alkyloxy-2-[4'-(6-fluoro-1-heptynyl)-4-biphenylyl]pyridine,
2-(4'-alkyl-4-biphenylyl)-5-(6-fluoro-1-heptynyl)pyridine,
2-(4'-alkyloxy-4-biphenylyl)-5-(6-fluoro-1-heptynyl)pyridine,
5-(4-alkylphenyl)-2-[4-(6-fluoro-1-heptynyl)phenyl]pyridine,
5-(4-alkyloxyphenyl)-2-[4-(6-fluoro-1-heptynyl)phenyl]pyridine,
2-(4-alkylphenyl)-5-[4-(6-fluoro-1-heptynyl)phenyl]pyridine,
2-(4-alkyloxyphenyl)-5-[4-(6-fluoro-1-heptynyl)phenyl]pyridine,
5-alkyl-[4-(6-fluoro-1-heptynyl)phenyl]pyrimidine,
5-alkyloxy-[4-(6-fluoro-1-heptynyl)phenyl]pyrimidine,
2-(4-alkylphenyl)-5-(6-fluoro-1-heptynyl)pyrimidine,
2-(4-alkyloxyphenyl)-5-(6-fluoro-1-heptynyl)pyrimidine,
2-alkyl-5-[4-(6-fluoro-1-heptynyl)phenyl]pyrimidine,
2-alkyloxy-5-[4-(6-fluoro-1-heptynyl)phenyl]pyrimidine,
5-(4-alkylphenyl)-2-(6-fluoro-1-heptynyl)pyrimidine,
5-(4-alkyloxyphenyl)-2-(6-fluoro-1-heptynyl)pyrimidine,
5-alkyl-2-[4'-(6-fluoro-1-heptynyl)-4-biphenylyl]pyrimidine,
5-alkyloxy-2-[4'-(6-fluoro-1-heptynyl)-4-biphenylyl]pyrimidine,
2-(4'-alkyl-4-biphenylyl)-5-(6-fluoro-1-heptynyl)pyrimidine,
2-(4'-alkyloxy-4-biphenylyl)-5-(6-fluoro-1-heptynyl)pyrimidine, 5-(4-alkylphenyl)-2-[4-(6-fluoro-1-heptynyl)phenyl]
  pyrimidine,
5-(4-alkyloxyphenyl)-2-[4-(6-fluoro-1-heptynyl)phenyl]
  pyrimidine,
2-(4-alkylphenyl)-5-[4-(6-fluoro-1-heptynyl)phenyl]
  pyrimidine,
2-(4-alkyloxyphenyl)-5-[4-(6-fluoro-1-heptynyl)phenyl]
  pyrimidine,
5-alkyl-[4-(6-fluoro-1-heptynyl)phenyl]pyrazine,
5-alkyloxy-[4-(6-fluoro-1-heptynyl)phenyl]pyrazine,
2-(4-alkylphenyl)-5-(6-fluoro-1-heptynyl)pyrazine,
2-(4-alkyloxyphenyl)-5-(6-fluoro-1-heptynyl)pyrazine,
5-alkyl-2-[4'-(6-fluoro-1-heptynyl)-4-biphenylyl]
  pyrazine,
5-alkyloxy-2-[4'-(6-fluoro-1-heptynyl)-4-biphenylyl]
  pyrazine,
2-(4'-alkyl-4-biphenylyl)-5-(6-fluoro-1-heptynyl)
  pyrazine,
2-(4'-alkyloxy-4-biphenylyl)-5-(6-fluoro-1-heptynyl)
  pyrazine,
5-(4-alkylphenyl)-2-[4-(6-fluoro-1-heptynyl)phenyl]
  pyrazine,
5-(4-alkyloxyphenyl)-2-[4-(6-fluoro-1-heptynyl)phenyl]
  pyrazine,
6-(4-alkylphenyl)-3-[4-(6-fluoro-1-heptynyl)phenyl]
  pyridazine,
6-(4-alkyloxyphenyl)-3-[4-(6-fluoro-1-heptynyl)phenyl]
  pyridazine,
2-(6-alkyl-naphthalen-2-yl)-5-(6-fluoro-1-heptynyl)
  pyrimidine,
2-(6-alkyloxy-naphthalen-2-yl)-5-(6-fluoro-1-heptynyl)
  pyrimidine,
5-(6-alkyl-naphthalen-2-yl)-2-(6-fluoro-1-heptynyl)
  pyrimidine,
5-(6-alkyloxy-naphthalen-2-yl)-2-(6-fluoro-1-heptynyl)
  pyrimidine,
2-alkyl-5-[6-(6-fluoro-1-heptynyl)naphthalen-2-yl]
  pyrimidine,
2-alkyloxy-5-[6-(6-fluoro-1-heptynyl)naphthalen-2-yl]
  pyrimidine,
5-alkyl-2-[6-(6-fluoro-1-heptynyl)naphthalen-1-yl]
  pyrimidine,
5-alkyloxy-2-[6-(6-fluoro-1-heptynyl)naphthalen-1-yl]
  pyrimidine,
7-alkyl-3-[4-(6-fluoro-1-heptynyl)phenyl]isoquinoline,
7-alkyloxy-3-[4-(6-fluoro-1-heptynyl)phenyl]
  isoquinoline,
3-(4-alkylphenyl)-7-(6-fluoro-1-heptynyl)isoquinoline,
3-(4-alkyloxyphenyl)-7-(6-fluoro-1-heptynyl)
  isoquinoline,
6-alkyl-2-[4-(6-fluoro-1-heptynyl)phenyl]quinoline,
6-alkyloxy-2-[4-(6-fluoro-1-heptynyl)phenyl]quinoline,
2-(4-alkylphenyl)-6-(6-fluoro-1-heptynyl)quinoline,
2-(4-alkyloxyphenyl)-6-(6-fluoro-1-heptynyl)quinoline,
3-alkyl-7-[4-(6-fluoro-1-heptynyl)phenyl]quinoxaline,
3-alkyloxy-7-[4-(6-fluoro-1-heptynyl)phenyl]
  quinoxaline,
2-alkyloxy-6-[4-(6-fluoro-1-heptynyl)phenyl]
  quinazoline,
4"-alkyl-4-(6-fluoro-1-heptyl)-p-terphenyl,
4"-alkyloxy-4-(6-fluoro-1-heptyl)-p-terphenyl,
6-alkyl-2-[4-(6-fluoro-1-heptyl)phenyl]naphthalene,
6-alkyloxy-2-[4-(6-fluoro-1-heptyl)phenyl]naphthalene,
6-(4-alkylphenyl)-2-(6-fluoro-1-heptyl)naphthalene,
6-(4-alkyloxyphenyl)-2-(6-fluoro-1-heptyl)naphthalene,
5-alkyl-[4-(6-fluoro-1-heptyl)phenyl]pyridine,
5-alkyloxy-[4-(6-fluoro-1-heptyl)phenyl]pyridine,
2-(4-alkylphenyl)-5-(6-fluoro-1-heptyl)pyridine,
2-(4-alkyloxyphenyl)-5-(6-fluoro-1-heptyl)pyridine,
2-alkyl-5-[4-(6-fluoro-1-heptyl)phenyl]pyridine,
2-alkyloxy-5-[4-(6-fluoro-1-heptyl)phenyl]pyridine,
5-(4-alkylphenyl)-2-(6-fluoro-1-heptyl)pyridine,
5-(4-alkyloxyphenyl)-2-(6-fluoro-1-heptyl)pyridine,
5-alkyl-2-[4'-(6-fluoro-1-heptyl)-4-biphenylyl]pyridine,
5-alkyloxy-2-[4'-(6-fluoro-1-heptyl)-4-biphenylyl]
  pyridine,
2-(4'-alkyl-4-biphenylyl)-5-(6-fluoro-1-heptyl)pyridine,
2-(4'-alkyloxy-4-biphenylyl)-5-(6-fluoro-1-heptyl)
  pyridine,
5-(4-alkylphenyl)-2-[4-(6-fluoro-1-heptyl)phenyl]
  pyridine,
5-(4-alkyloxyphenyl)-2-[4-(6-fluoro-1-heptyl)phenyl]
  pyridine,
2-(4-alkylphenyl)-5-[4-(6-fluoro-1-heptyl)phenyl]
  pyridine,
2-(4-alkyloxyphenyl)-5-[4-(6-fluoro-1-heptyl)phenyl]
  pyridine,
5-alkyl-[4-(6-fluoro-1-heptyl)phenyl]pyrimidine,
5-alkyloxy-[4-(6-fluoro-1-heptyl)phenyl]pyrimidine,
2-(4-alkylphenyl)-5-(6-fluoro-1-heptyl)pyrimidine,
2-(4-alkyloxyphenyl)-5-(6-fluoro-1-heptyl)pyrimidine,
2-alkyl-5-[4-(6-fluoro-1-heptyl)phenyl]pyrimidine,
2-alkyloxy-5-[4-(6-fluoro-1-heptyl)phenyl]pyrimidine,
5-(4-alkylphenyl)-2-(6-fluoro-1-heptyl)pyrimidine,
5-(4-alkyloxyphenyl)-2-(6-fluoro-1-heptyl)pyrimidine,
5-alkyl-2-[4'-(6-fluoro-1-heptyl)-4-biphenylyl]
  pyrimidine,
5-alkyloxy-2-[4'-(6-fluoro-1-heptyl)-4-biphenylyl]
  pyrimidine,
2-(4'-alkyl-4-biphenylyl)-5-(6-fluoro-1-heptyl)
  pyrimidine,
2-(4'-alkyloxy-4-biphenylyl)-5-(6-fluoro-1-heptyl)
  pyrimidine,
5-(4-alkylphenyl)-2-[4-(6-fluoro-1-heptyl)phenyl]
  pyrimidine,
5-(4-alkyloxyphenyl)-2-[4-(6-fluoro-1-heptyl)phenyl]
  pyrimidine,
2-(4-alkylphenyl)-5-[4-(6-fluoro-1-heptyl)phenyl]
  pyrimidine,
2-(4-alkyloxyphenyl)-5-[4-(6-fluoro-1-heptyl)phenyl]
  pyrimidine,
5-alkyl-[4-(6-fluoro-1-heptyl)phenyl]pyrazine,
5-alkyloxy-[4-(6-fluoro-1-heptyl)phenyl]pyrazine,
2-(4-alkylphenyl)-5-(6-fluoro-1-heptyl)pyrazine,
2-(4-alkyloxyphenyl)-5-(6-fluoro-1-heptyl)pyrazine,
5-alkyl-[4'-(6-fluoro-1-heptyl)-4-biphenylyl]pyrazine,
5-alkyloxy-[4'-(6-fluoro-1-heptyl)-4-biphenylyl]
  pyrazine,
2-(4'-alkyl-4-biphenylyl)-5-(6-fluoro-1-heptyl)pyrazine, 2-(4'-alkyloxy-4-biphenylyl)-5-(6-fluoro-1-heptyl)pyrazine,
5-(4-alkylphenyl)-2-(6-fluoro-1-heptyl)phenyl]pyrazine,
5-(4-alkyloxyphenyl)-2-[4-(6-fluoro-1-heptyl)phenyl]pyrazine,
6-(4-alkylphenyl)-3-[4-(6-fluoro-1-heptyl)phenyl]pyridazine,
6-(4-alkyloxyphenyl)-3-[4-(6-fluoro-1-heptyl)phenyl]pyridazine,
2-(6-alkyl-naphthalen-2-yl)-5-(6-fluoro-1-heptyl)pyrimidine,
2-(6-alkyloxy-naphthalen-2-yl)-5-(6-fluoro-1-heptyl)pyrimidine,
5-(6-alkyl-naphthalen-2-yl)-2-(6-fluoro-1-heptyl)pyrimidine,
5-(6-alkyloxy-naphthalen-2-yl)-2-(6-fluoro-1-heptyl)pyrimidine,
2-alkyl-5-[6-(6-fluoro-1-heptyl)-naphthalen-2-yl]pyrimidine,
2-alkyloxy-5-[6-(6-fluoro-1-heptyl)-naphthalen-2-yl)pyrimidine,
5-alkyl-2-[6-(6-fluoro-1-heptyl)-naphthalen-1-yl)pyrimidine,
5-alkyloxy-2-[6-(6-fluoro-1-heptyl)-naphthalen-1-yl)pyrimidine,
7-alkyl-3-[4-(6-fluoro-1-heptyl)phenyl]isoquinoline,
7-alkyloxy-3-[4-(6-fluoro-1-heptyl)phenyl]isoquinoline,
3-(4-alkylphenyl)-7-(6-fluoro-1-heptyl)isoquinoline,
3-(4-alkyloxyphenyl)-7-(6-fluoro-1-heptyl)isoquinoline,
6-alkyl-2-[4-(6-fluoro-1-heptyl)phenyl]quinoline,
6-alkyloxy-2-[4-(6-fluoro-1-heptyl)phenyl]quinoline,
2-(4-alkylphenyl)-6-(6-fluoro-1-heptyl)quinoline,
2-(4-alkyloxyphenyl)-6-(6-fluoro-1-heptyl)quinoline,
3-alkyl-7-[4-(6-fluoro-1-heptyl)phenyl]quinoxaline,
3-alkyloxy-7-[4-(6-fluoro-1-heptyl)phenyl]quinoxaline,
2-alkyloxy-6-[4-(6-fluoro-1-heptyl)phenyl]quinazoline,
4"-alkyl-4-(6-fluoro-1-heptenyl)-p-terphenyl,
4"-alkyloxy-4-(6-fluoro-1-heptenyl)-p-terphenyl,
6-alkyl-2-[4-(6-fluoro-1-heptenyl)phenyl]naphthalene,
6-alkyloxy-2-[4-(6-fluoro-1-heptenyl)phenyl]-naphthalene,
6-(4-alkylphenyl)-2-(6-fluoro-1-heptenyl)naphthalene,
6-(4-alkyloxyphenyl)-2-(6-fluoro-1-heptenyl)naphthalene,
5-alkyl-[4-(6-fluoro-1-heptenyl)phenyl]pyridine,
5-alkyloxy-[4-(6-fluoro-1-heptenyl)phenyl]pyridine,
2-(4-alkylphenyl)-5-(6-fluoro-1-heptenyl)pyridine,
2-(4-alkyloxyphenyl)-5-(6-fluoro-1-heptenyl)pyridine,
2-alkyl-5-[4-(6-fluoro-1-heptenyl)phenyl]pyridine,
2-alkyloxy-5-[4-(6-fluoro-1-heptenyl)phenyl]pyridine,
5-(4-alkylphenyl)-2-(6-fluoro-1-heptenyl)pyridine,
5-(4-alkyloxyphenyl)-2-(6-fluoro-1-heptenyl)pyridine,
5-alkyl-2-[4'-(6-fluoro-1-heptenyl)-4-biphenylyl]pyridine,
5-alkyloxy-2-[4'-(6-fluoro-1-heptenyl)-4-biphenylyl]pyridine,
2-(4'-alkyl-4-biphenylyl)-5-(6-fluoro-1-heptenyl)pyridine,
2-(4'-alkyloxy-4-biphenylyl)-5-(6-fluoro-1-heptenyl)pyridine,
5-(4-alkylphenyl)-2-[4-(6-fluoro-1-heptenyl)phenyl]pyridine,
5-(4-alkyloxyphenyl)-2-[4-(6-fluoro-1-heptenyl)phenyl]pyridine,
2-(4-alkylphenyl)-5-[4-(6-fluoro-1-heptenyl)phenyl]pyridine,
2-(4-alkyloxyphenyl)-5-[4-(6-fluoro-1-heptenyl)phenyl]pyridine,
5-alkyl-[4-(6-fluoro-1-heptenyl)phenyl]pyrimidine,
5-alkyloxy-[4-(6-fluoro-1-heptenyl)phenyl]pyrimidine,
2-(4-alkylphenyl)-5-(6-fluoro-1-heptenyl)pyrimidine,
2-(4-alkyloxyphenyl)-5-(6-fluoro-1-heptenyl)pyrimidine,
2-alkyl-5-[4-(6-fluoro-1-heptenyl)phenyl]pyrimidine,
2-alkyloxy-5-[4-(6-fluoro-1-heptenyl)phenyl]pyrimidine,
5-(4-alkylphenyl)-2-(6-fluoro-1-heptenyl)pyrimidine,
5-(4-alkyloxyphenyl)-2-(6-fluoro-1-heptenyl)pyrimidine,
5-alkyl-2-[4'-(6-fluoro-1-heptenyl)-4-biphenylyl]pyrimidine,
5-alkyloxy-2-[4'-(6-fluoro-1-heptenyl)-4-biphenylyl]pyrimidine,
2-(4'-alkyl-4-biphenylyl)-5-(6-fluoro-1-heptenyl)pyrimidine,
2-(4'-alkyloxy-4-biphenylyl)-5-(6-fluoro-1-heptenyl)pyrimidine,
5-(4-alkylphenyl)-2-[4-(6-fluoro-1-heptenyl)phenyl]pyrimidine,
5-(4-alkyloxyphenyl)-2-[4-(6-fluoro-1-heptenyl)phenyl]pyrimidine,
2-(4-alkylphenyl)-5-[4-(6-fluoro-1-heptenyl)phenyl]pyrimidine,
2-(4-alkyloxyphenyl)-5-[4-(6-fluoro-1-heptenyl)phenyl]pyrimidine,
5-alkyl-[4-(6-fluoro-1-heptenyl)phenyl]pyrazine,
5-alkyloxy-[4-(6-fluoro-1-heptenyl)phenyl]pyrazine,
2-(4-alkylphenyl)-5-(6-fluoro-1-heptenyl)pyrazine,
2-(4-alkyloxyphenyl)-5-(6-fluoro-1-heptenyl)pyrazine,
5-alkyl-2-[4'-(6-fluoro-1-heptenyl)-4-biphenylyl]pyrazine,
5-alkyloxy-2-[4'-(6-fluoro-1-heptenyl)-4-biphenylyl]pyrazine,
2-(4'-alkyl-4-biphenylyl)-5-(6-fluoro-1-heptenyl)pyrazine,
2-(4'-alkyloxy-4-biphenylyl)-5-(6-fluoro-1-heptenyl)pyrazine,
5-(4-alkylphenyl)-2-[4-(6-fluoro-1-heptenyl)phenyl]pyrazine,
5-(4-alkyloxyphenyl)-2-[4-(6-fluoro-1-heptenyl)phenyl]pyrazine,
6-(4-alkylphenyl)-3-[4-(6-fluoro-1-heptenyl)phenyl]pyridazine,
6-(4-alkyloxyphenyl)-3-[4-(6-fluoro-1-heptenyl)phenyl]pyridazine,
2-(6-alkyl-naphthalen-2-yl)-5-(6-fluoro-1-heptenyl)pyrimidine,
2-(6-alkyloxy-naphthalen-2-yl)-5-(6-fluoro-1-heptenyl)pyrimidine,
5-(6-alkyl-naphthalen-2-yl)-2-(6-fluoro-1-heptenyl)pyrimidine,
5-(6-alkyloxy-naphthalen-2-yl)-2-(6-fluoro-1-heptenyl)pyrimidine, 2-alkyl-5-[6-(6-fluoro-1-heptenyl)naphthalen-2-yl] pyrimidine,
2-alkyloxy-5-[6-(6-fluoro-1-heptenyl)naphthalen-2-yl] pyrimidine,
5-alkyl-2-[6-(6-fluoro-1-heptenyl)naphthalen-1-yl] pyrimidine,
5-alkyloxy-2-[6-(6-fluoro-1-heptenyl)naphthalen-1-yl] pyrimidine,
7-alkyl-3-[4-(6-fluoro-1-heptenyl)phenyl]isoquinoline,
7-alkyloxy-3-[4-(6-fluoro-1-heptenyl)phenyl] isoquinoline,
3-(4-alkylphenyl)-7-(6-fluoro-1-heptenyl)isoquinoline,
3-(4-alkyloxyphenyl)-7-(6-fluoro-1-heptenyl) isoquinoline,
6-alkyl-2-[4-(6-fluoro-1-heptenyl)phenyl]quinoline,
6-alkyloxy-2-[4-(6-fluoro-1-heptenyl)phenyl]quinoline,
2-(4-alkylphenyl)-6-(6-fluoro-1-heptenyl)quinoline,
2-(4-alkyloxyphenyl)-6-(6-fluoro-1-heptenyl)quinoline,
3-alkyl-7-[4-(6-fluoro-1-heptenyl)phenyl]quinoxaline,
3-alkyloxy-7-[4-(6-fluoro-1-heptenyl)phenyl] quinoxaline,
2-alkyloxy-6-[4-(6-fluoro-1-heptenyl)phenyl] quinazoline.

the above compounds in which each of the 6-fluoro-1-heptynyl group, the 6-fluoro-1-heptyl group or the 6-fluoro-heptenyl group is respectively replaced by a 4-fluoro-1-pentynyl, 5-fluoro-1-hexynyl, 7-fluoro-1-octynyl, 8-fluoro-1-nonynyl, 9-fluoro-1-decynyl, 10-fluoro-1-undecynyl, 11-fluoro-1-dodecynyl, 12-fluoro-1-tridecynyl or 13-fluoro-1-tetradecynyl group; a 4-fluoro-1-pentyl, 5-fluoro-1-hexyl, 7-fluoro-1-octyl, 8-fluoro-1-nonyl, 9-fluoro-1-decyl, 10-fluoro-1-undecyl, 11-fluoro-1-dodecyl, 12-fluoro-1-tridecyl or 13-fluoro-1-tetradecyl group; or a 4-fluoro-1-pentenyl, 5-fluoro-1-hexenyl, 7-fluoro-1-octenyl, 8-fluoro-1-nonenyl, 9-fluoro-1-decenyl, 10-fluoro-1-undecenyl, 11-fluoro-1-dodecenyl, 12-fluoro-1-tridecenyl or 13-fluoro-1-tetradecenyl, the above compounds in which one, two or three hydrogens of a benzene ring are replaced by one, two or three fluorine atoms, the above compounds in which an alkyl group or an alkyloxy group is respectively replaced by an alkenyl group or an alkenyloxy group, and the above compounds in which an alkyl group or an alkyloxy group is replaced by an alkenyl group or an alkenyloxy group. Herein, the alkyl or alkenyl means $C_3$–$C_{20}$ alkyl or alkenyl.

The compound of the formula (II) may be prepared by fluorinating an alcohol derivative of the formula (IX):

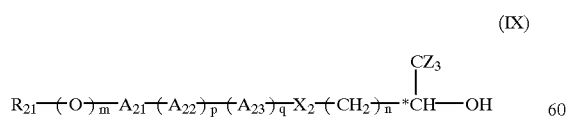

wherein $R_{21}$, $A_{21}$, $A_{22}$, $A_{23}$, $X_2$, Z, m, n, p and q are the same as defined in the formula (II) with a fluorinating agent such as hydrogen fluoride.

The alcohol derivative (IX) as a raw material may be prepared according to the following reactions:

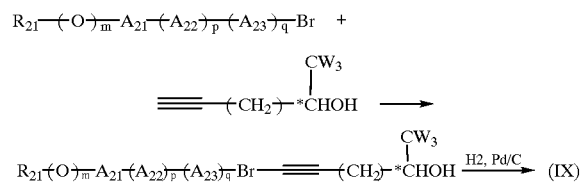

Specific examples of the compound of the formula (III) are described below. In the compounds (III-1) to (III-28), $R_{31}$ and $R_{32}$ are a $C_3$–$C_{15}$ alkyl, alkoxy or alkoxyalkyl group which may be substituted by at least one halogen atom, preferably fluorine atom.

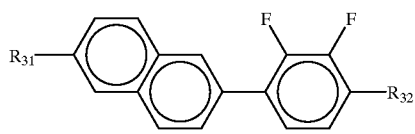
(III-1)

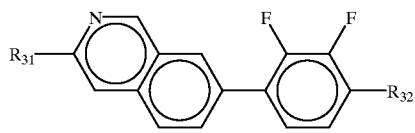
(III-2)

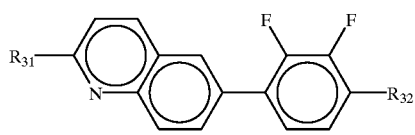
(III-3)

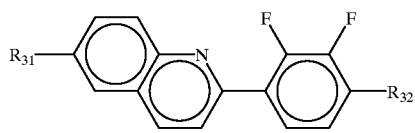
(III-4)

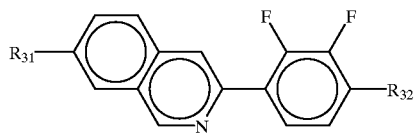
(III-5)

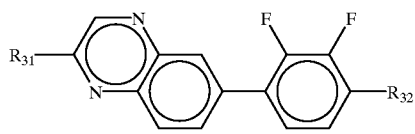
(III-6)

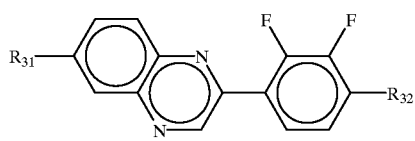
(III-7)

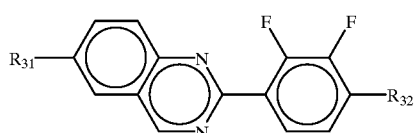
(III-8)

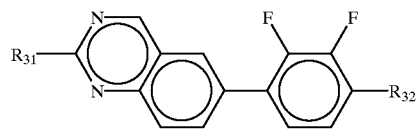
(III-9)
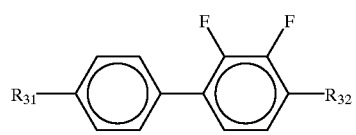
(III-10)
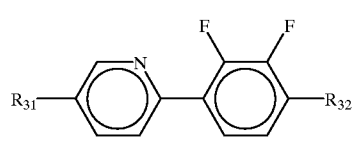
(III-11)
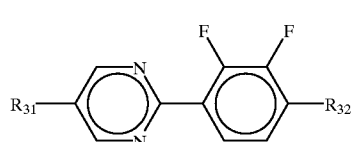
(III-12)
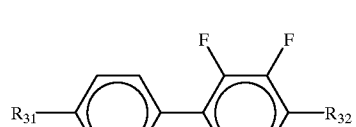
(III-13)
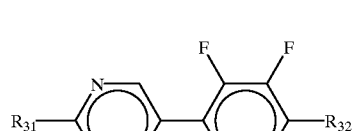
(III-14)
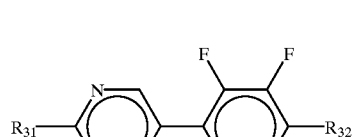
(III-15)
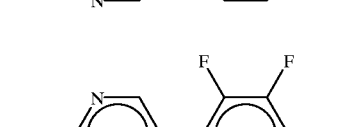
(III-16)
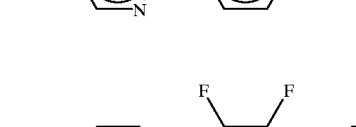
(III-17)
(III-18)
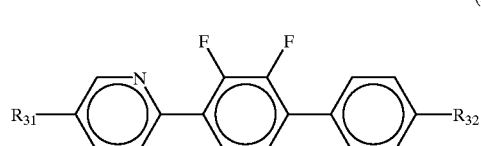
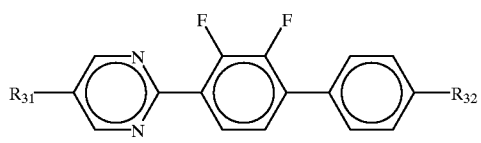
(III-19)
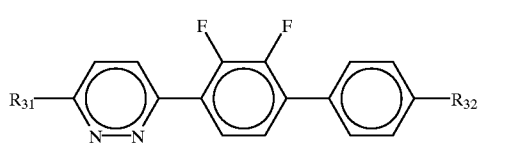
(III-20)
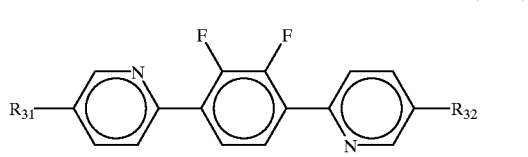
(III-21)
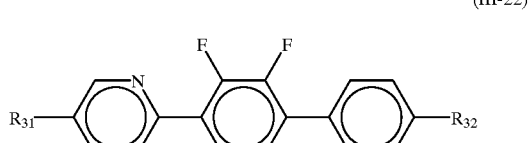
(III-22)
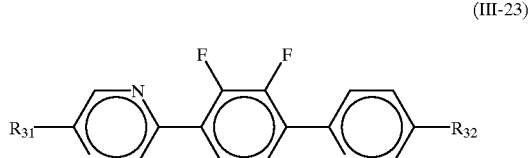
(III-23)
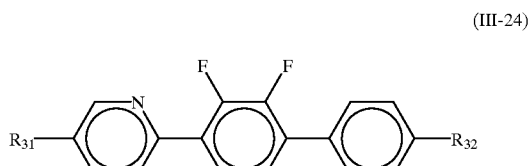
(III-24)
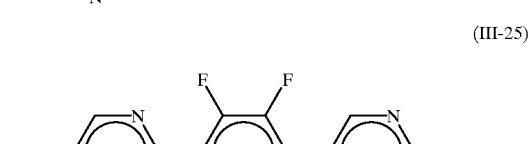
(III-25)
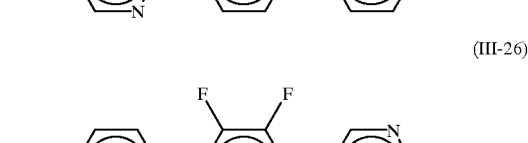
(III-26)
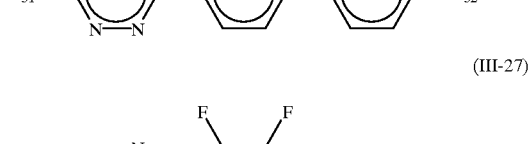
(III-27)
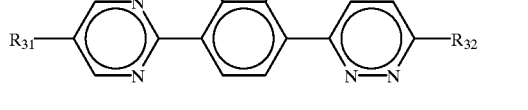

(III-28)

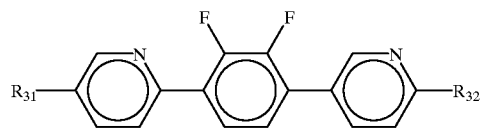

Specific examples of the compound of the formula (IV) are described below. In the compounds (IV-1) to (IV-51), $R_{41}$ is a $C_5$–$C_{15}$ alkyl, alkoxy or alkoxyalkyl group, $R_{42}$ is a $C_1$–$C_{10}$ alkyl or alkoxy or $C_2$–$C_{10}$ alkoxyalkyl group which may be substituted by at least one halogen atom, preferably fluorine atom, and continuing methylene groups in $R_{41}$ and $R_{42}$ may be replaced by a double or triple bond, r is an integer of 0 to 10, and * indicates an asymmetric carbon atom.

(IV-1)

(IV-2)

(IV-3)

(IV-4)

(IV-5)

(IV-6)

(IV-7)

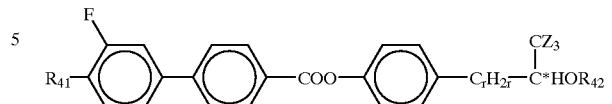

(IV-8)

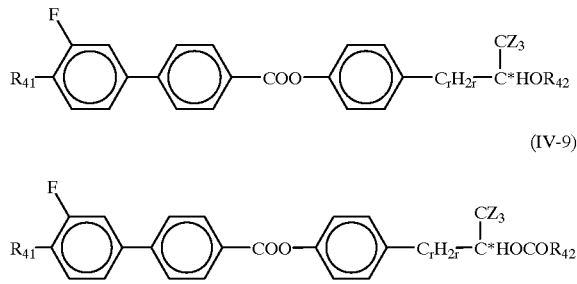

(IV-9)

(IV-10)

(IV-11)

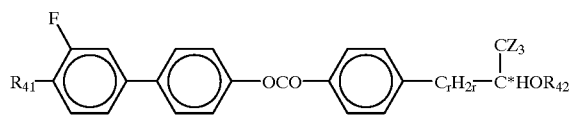

(IV-12)

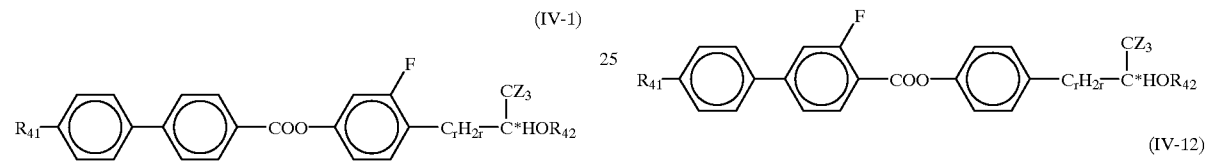

(IV-13)

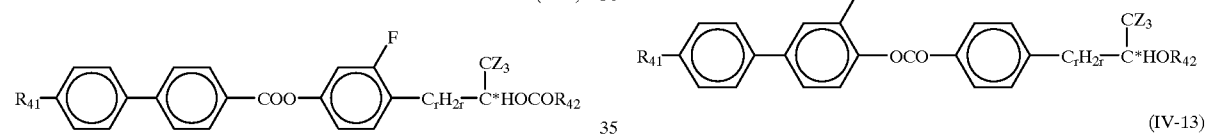

(IV-14)

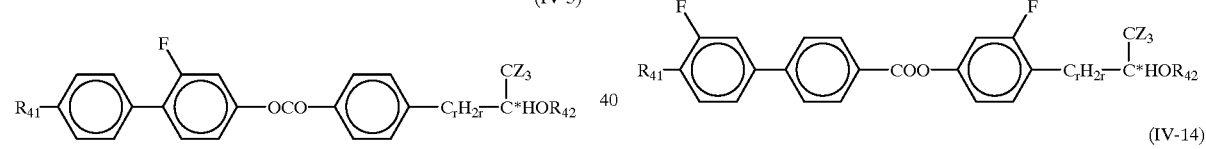

(IV-15)

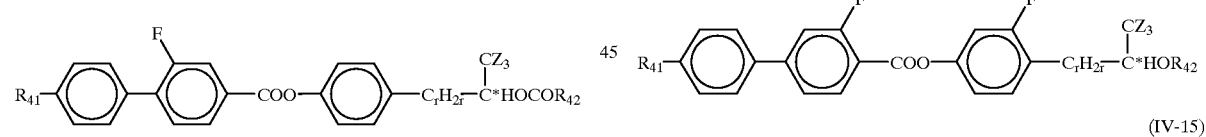

(IV-16)

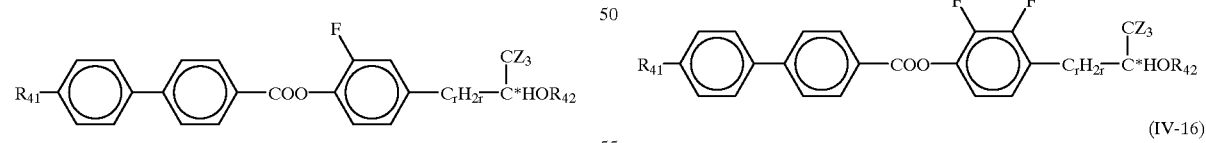

(IV-17)

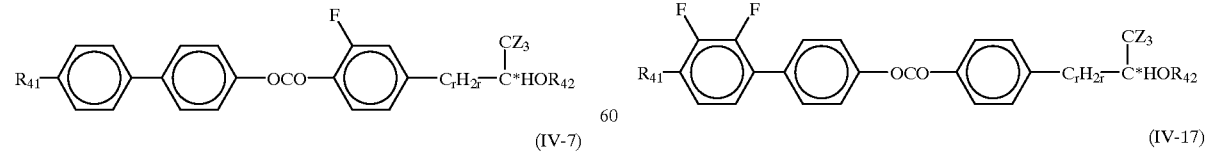

-continued
(IV-18)
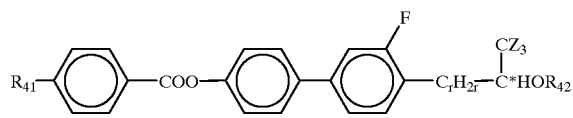
(IV-19)
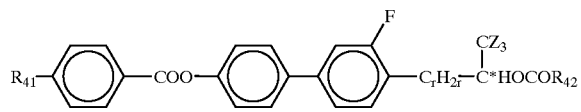
(IV-20)
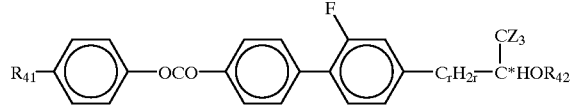
(IV-21)
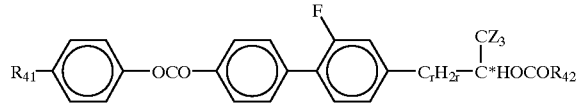
(IV-22)
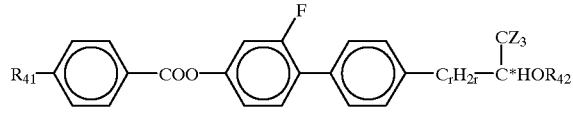
(IV-23)
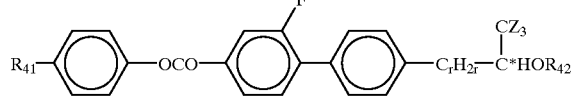
(IV-24)
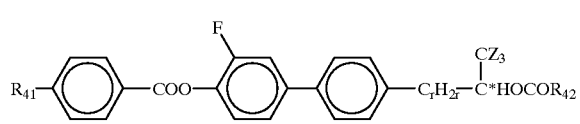
(IV-25)
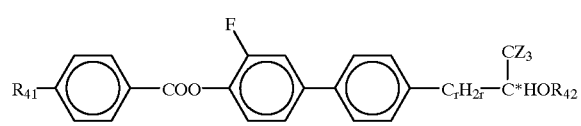
(IV-26)
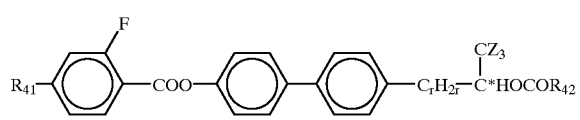
(IV-27)
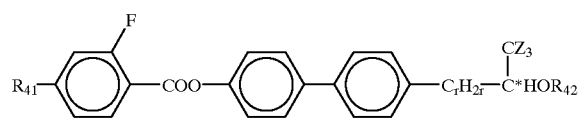
-continued
(IV-28)
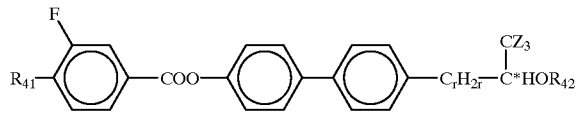
(IV-29)
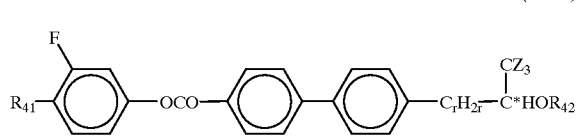
(IV-30)
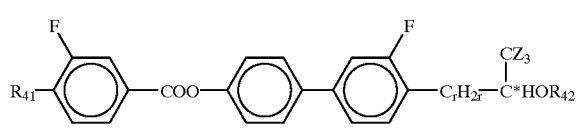
(IV-31)
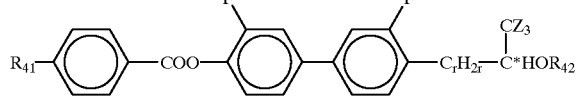
(IV-32)
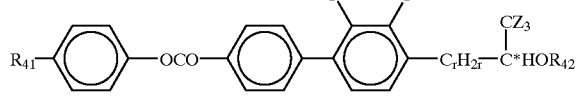
(IV-33)
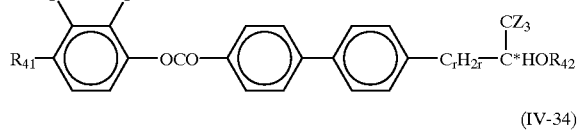
(IV-34)
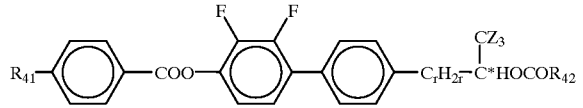
(IV-35)
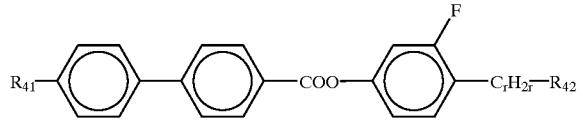
(IV-36)
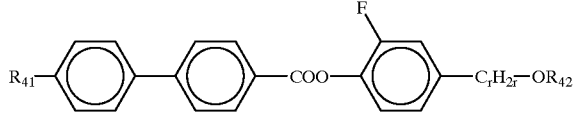
(IV-37)
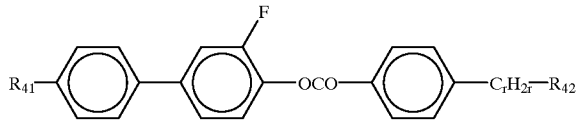

(IV-38)
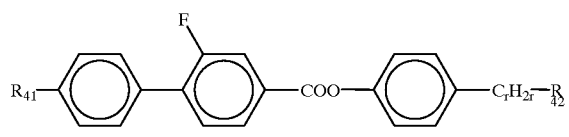
(IV-39)
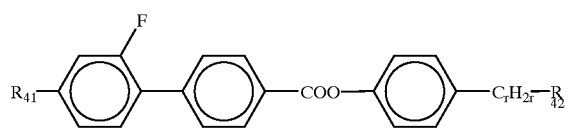
(IV-40)
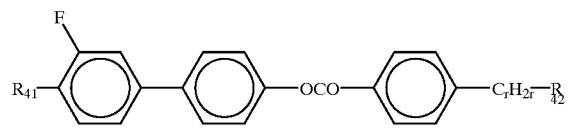
(IV-41)
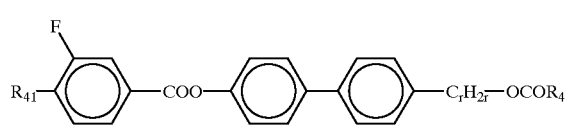
(IV-42)
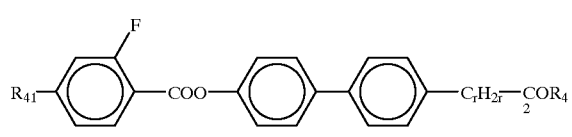
(IV-43)
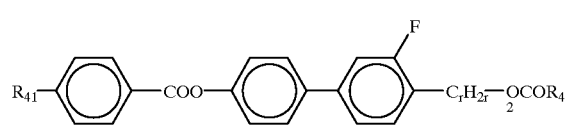
(IV-44)
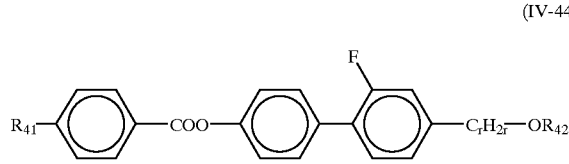
(IV-45)
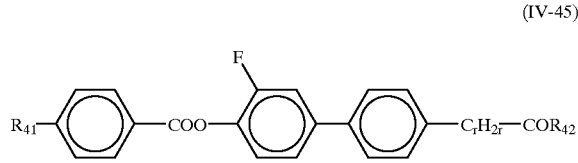
(IV-46)
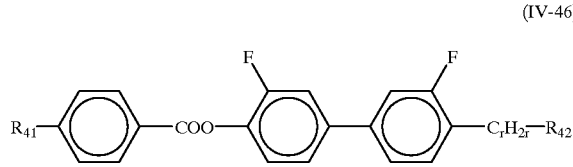
(IV-47)
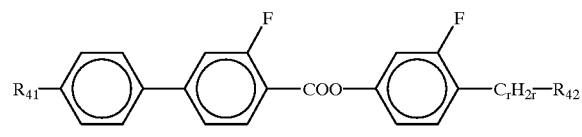
(IV-48)
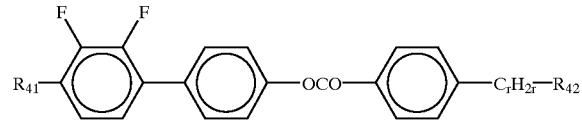
(IV-49)
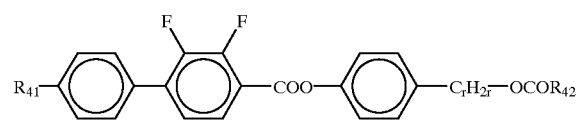
(IV-50)
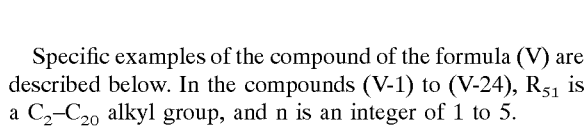
(IV-51)
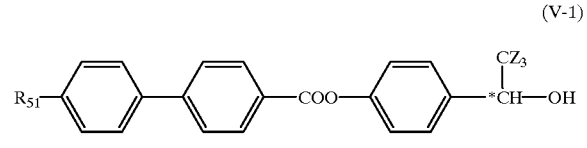
Specific examples of the compound of the formula (V) are described below. In the compounds (V-1) to (V-24), $R_{51}$ is a $C_2$–$C_{20}$ alkyl group, and n is an integer of 1 to 5.
(V-1)
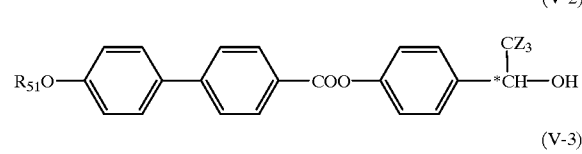
(V-2)
(V-3)
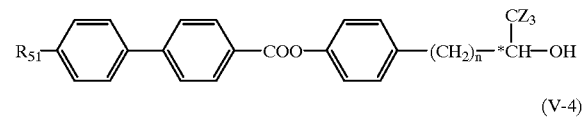
(V-4)
(V-5)
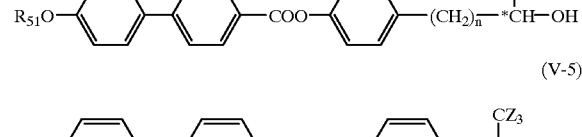
(V-6)

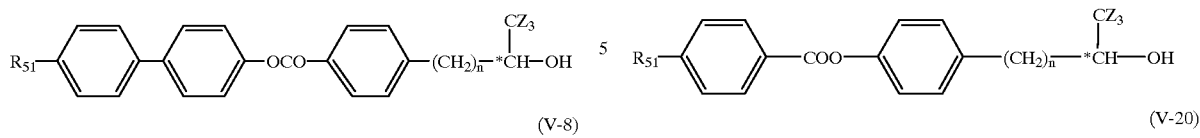
(V-7)
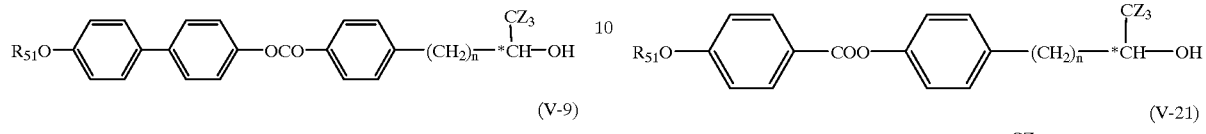
(V-8)
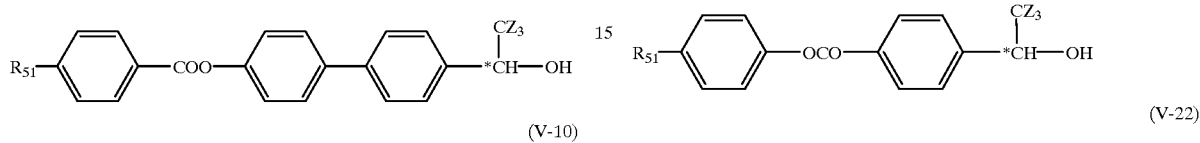
(V-9)
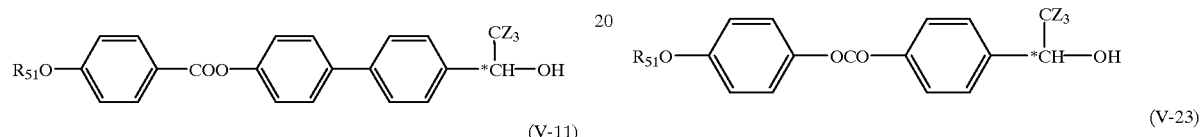
(V-10)
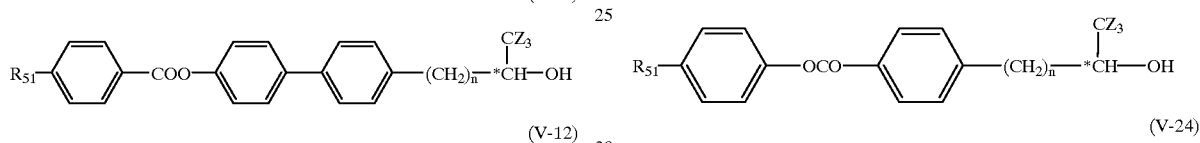
(V-11)
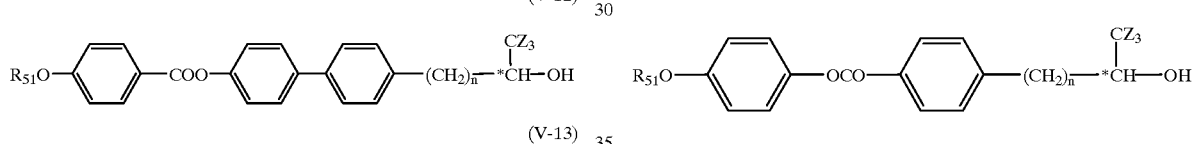
(V-12)
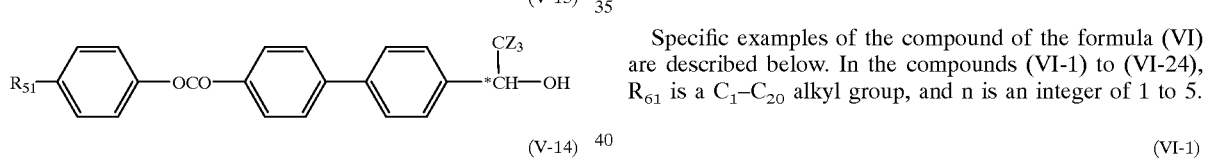
(V-13)
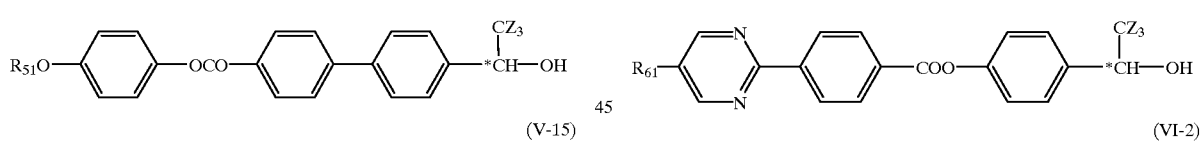
(V-14)
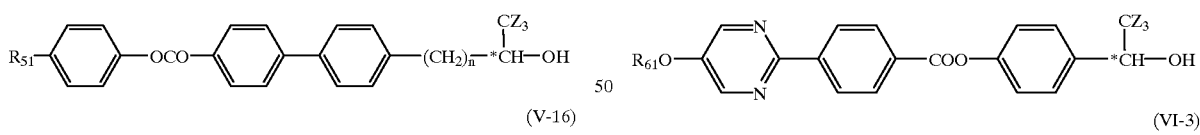
(V-15)
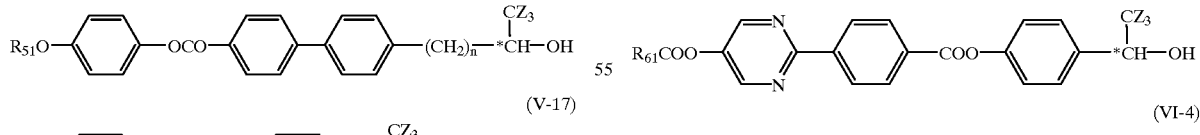
(V-16)
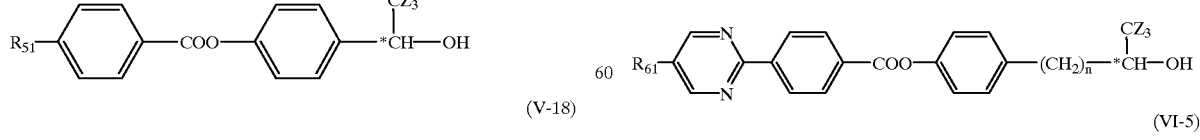
(V-17)
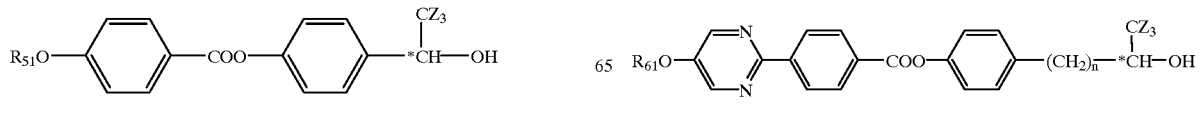
(V-18)
(V-19)
(V-20)
(V-21)
(V-22)
(V-23)
(V-24)
Specific examples of the compound of the formula (VI) are described below. In the compounds (VI-1) to (VI-24), $R_{61}$ is a $C_1$–$C_{20}$ alkyl group, and n is an integer of 1 to 5.
(VI-1)
(VI-2)
(VI-3)
(VI-4)
(VI-5)

(VI-6)
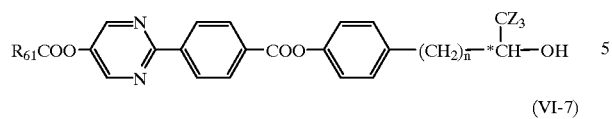
(VI-7)
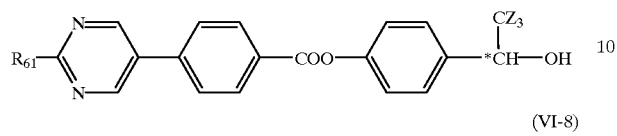
(VI-8)
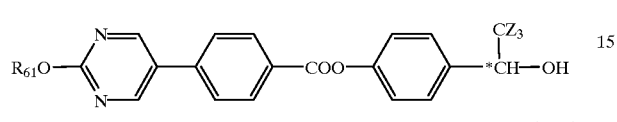
(VI-9)
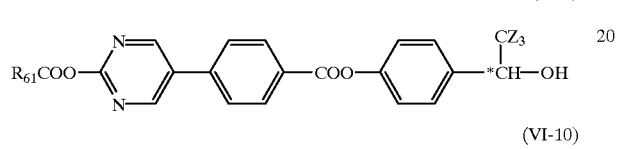
(VI-10)
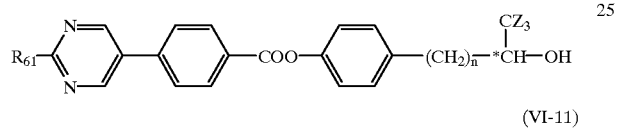
(VI-11)
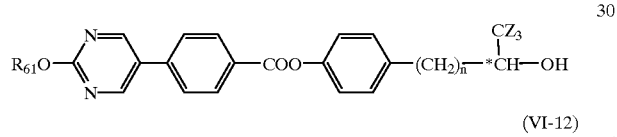
(VI-12)
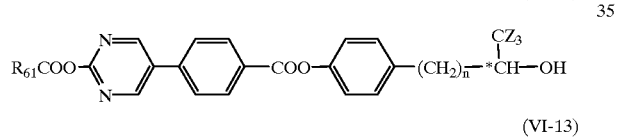
(VI-13)
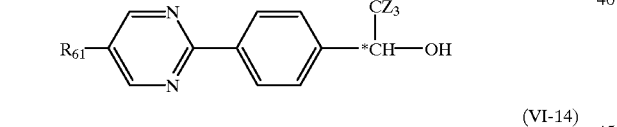
(VI-14)
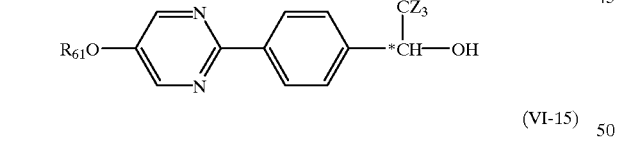
(VI-15)
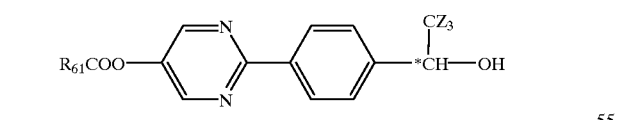
(VI-16)
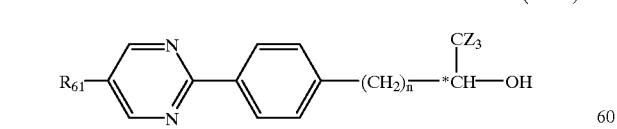
(VI-17)
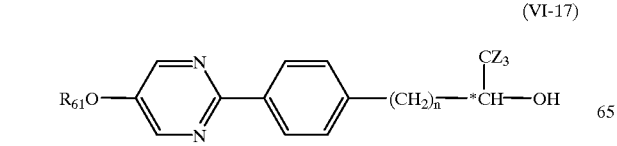
(VI-18)
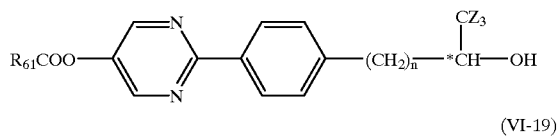
(VI-19)
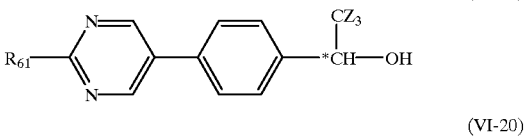
(VI-20)
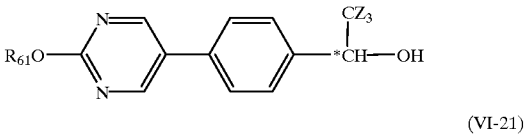
(VI-21)
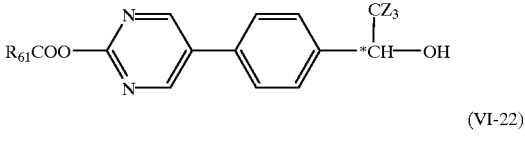
(VI-22)
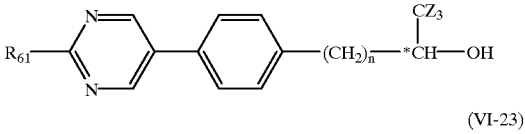
(VI-23)
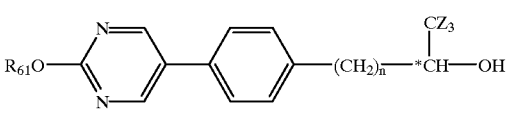
(VI-24)
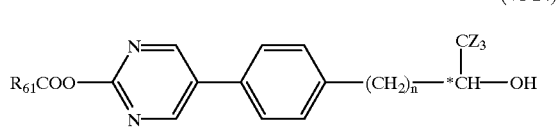
Specific examples of the compound of the formula (VII) are described below. In the compounds (VII-1) to (VII-150), $R_{71}$ is a $C_1$–$C_{20}$ alkyl group, and n is an integer of 0 to 8.
(VII-1)
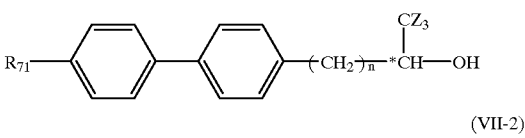
(VII-2)
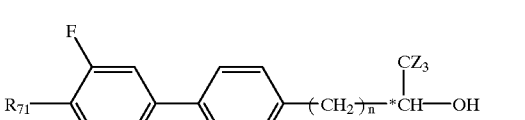
(VII-3)
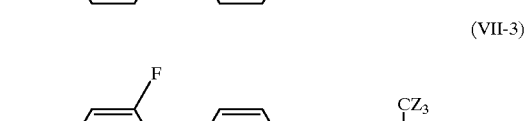

(VII-4)
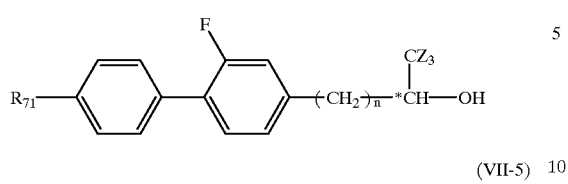
(VII-5)
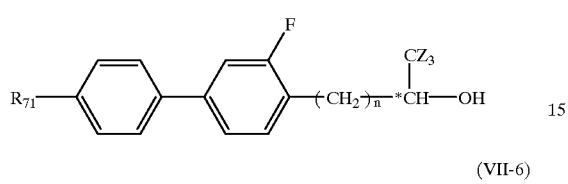
(VII-6)
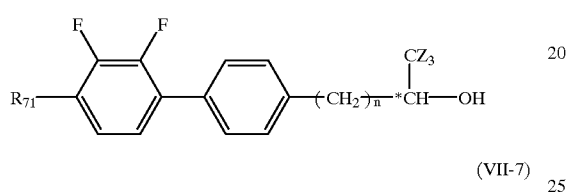
(VII-7)
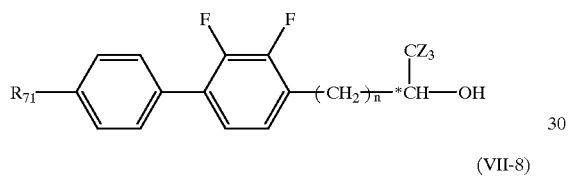
(VII-8)
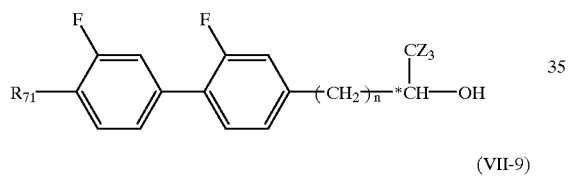
(VII-9)
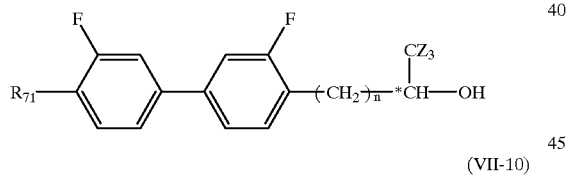
(VII-10)
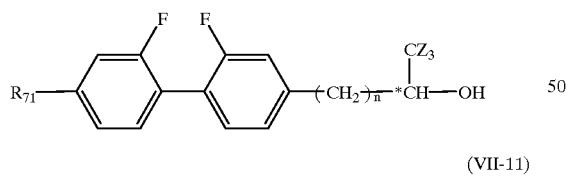
(VII-11)
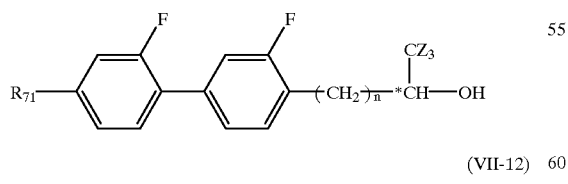
(VII-12)
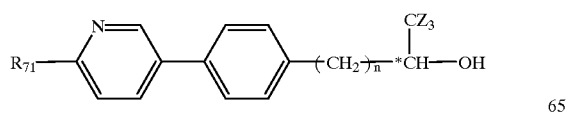
(VII-13)
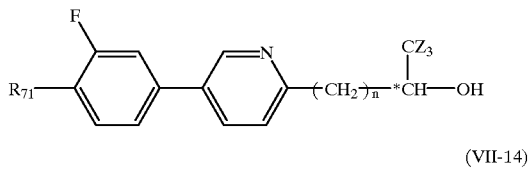
(VII-14)
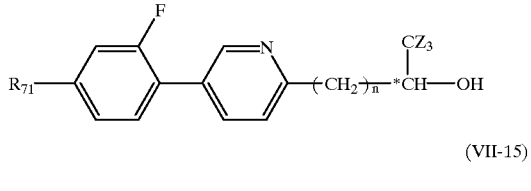
(VII-15)
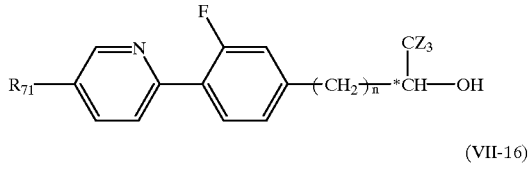
(VII-16)
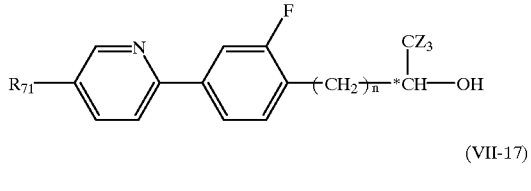
(VII-17)
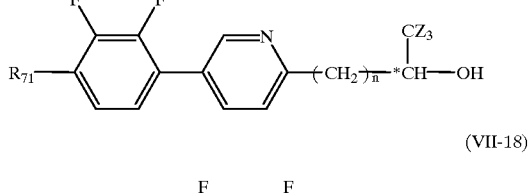
(VII-18)
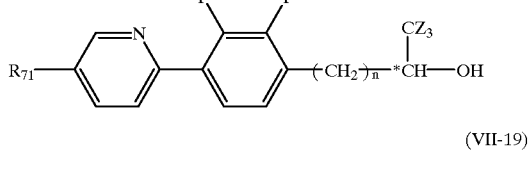
(VII-19)
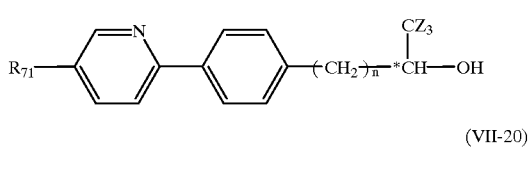
(VII-20)
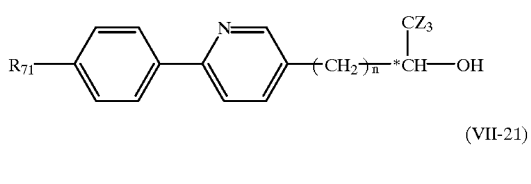
(VII-21)
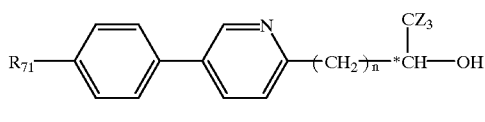

(VII-22)
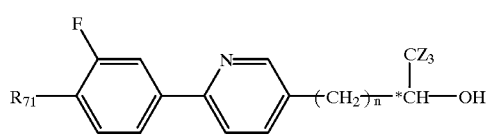
(VII-23)
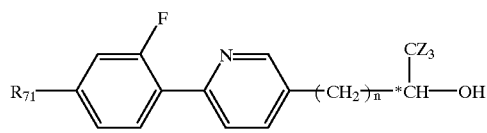
(VII-24)
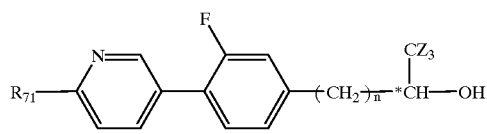
(VII-25)
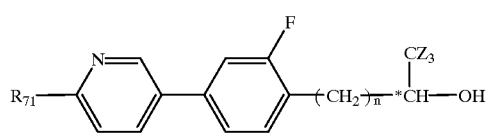
(VII-26)
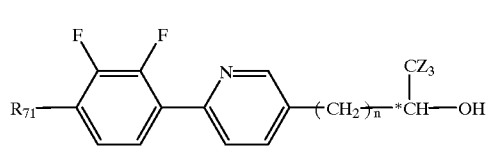
(VII-27)
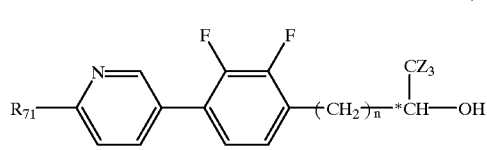
(VII-28)
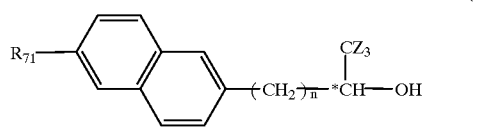
(VII-29)
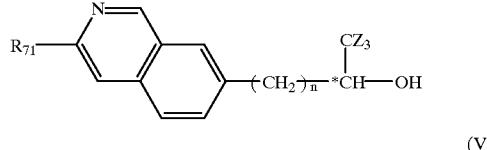
(VII-30)
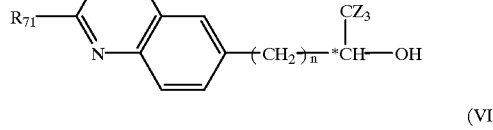
(VII-31)
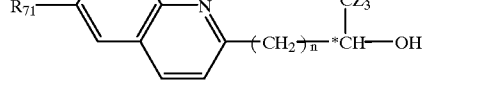
(VII-32)
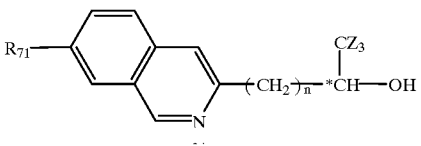
(VII-33)
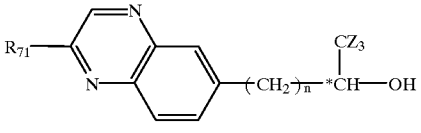
(VII-34)
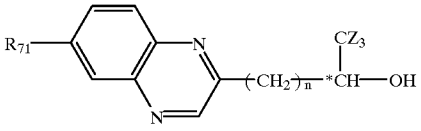
(VII-35)
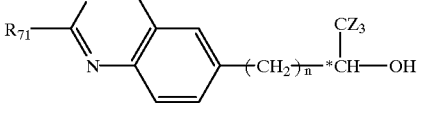
(VII-36)
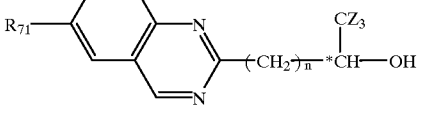
(VII-37)
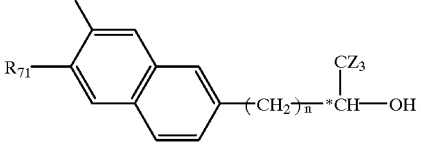
(VII-38)
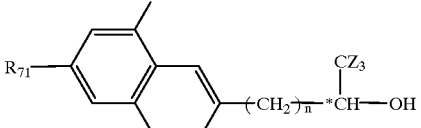
(VII-39)
(VII-40)
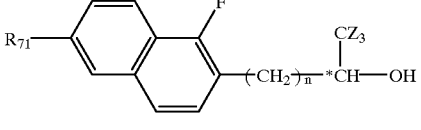

(VII-41)
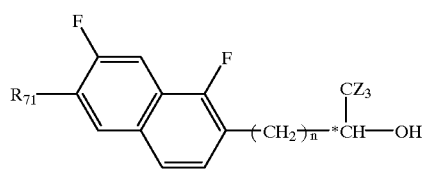
(VII-42)
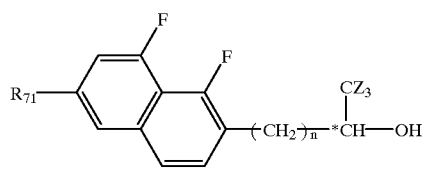
(VII-43)
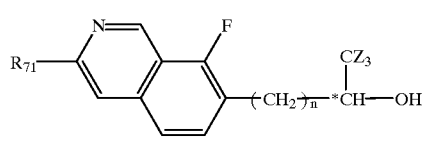
(VII-44)
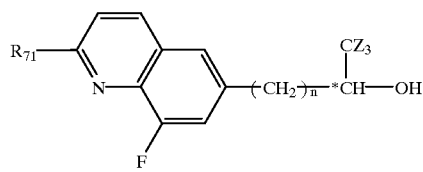
(VII-45)
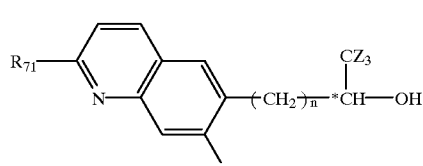
(VII-46)
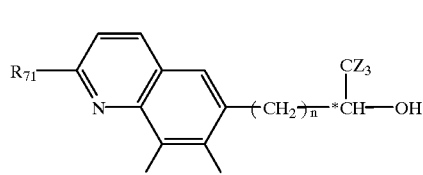
(VII-47)
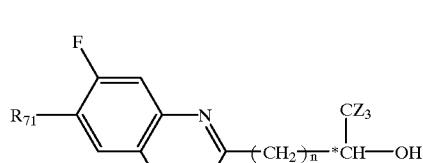
(VII-48)
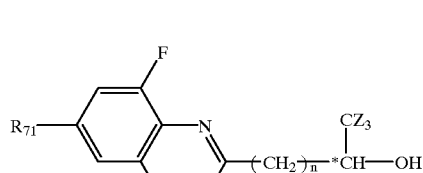
(VII-49)
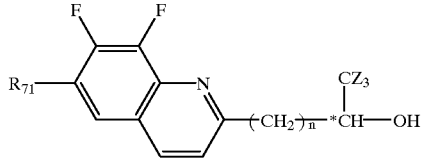
(VII-50)
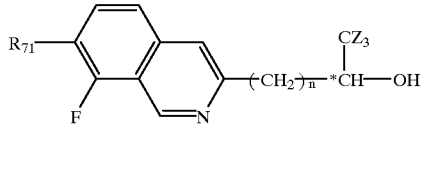
(VII-51)
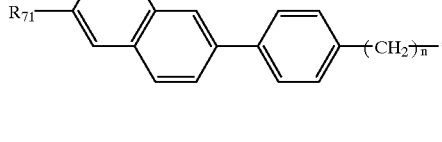
(VII-52)
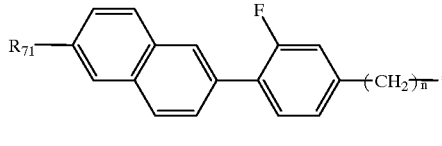
(VII-53)
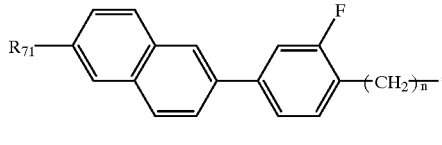
(VII-54)
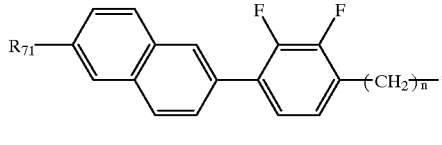
(VII-55)
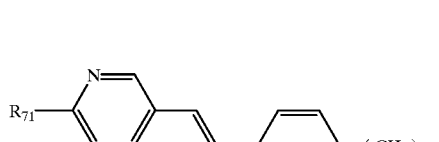
(VII-56)
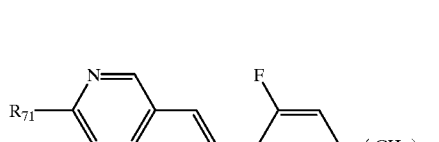
(VII-57)
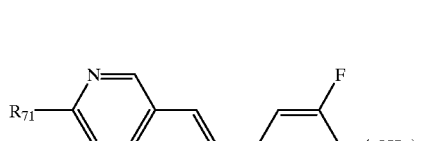

(VII-58) (VII-67) (VII-59) (VII-68) (VII-60) (VII-69) (VII-61) (VII-70) (VII-62) (VII-71) (VII-63) (VII-72) (VII-64) (VII-73) (VII-65) (VII-74) (VII-66) (VII-75)

(VII-76) (VII-77) (VII-78) (VII-79) (VII-80) (VII-81) (VII-82) (VII-83) (VII-84) (VII-85) (VII-86) (VII-87) (VII-88) (VII-89) (VII-90) (VII-91) (VII-92)

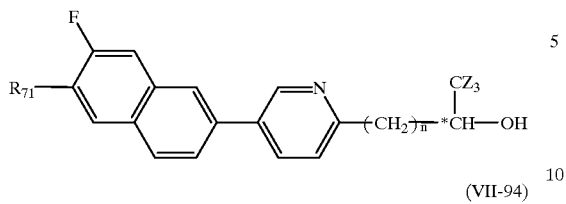
(VII-93)
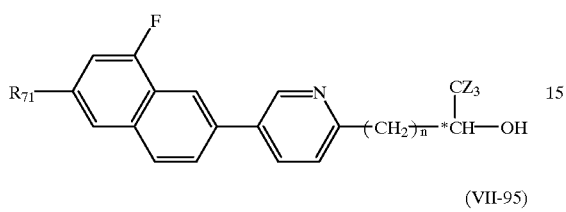
(VII-94)
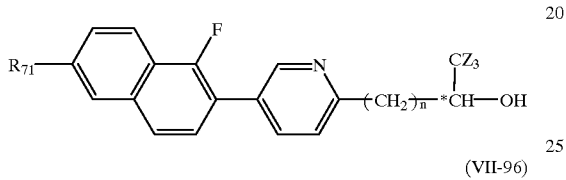
(VII-95)
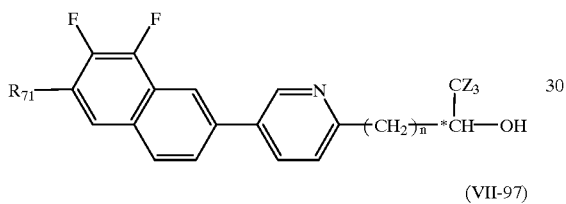
(VII-96)
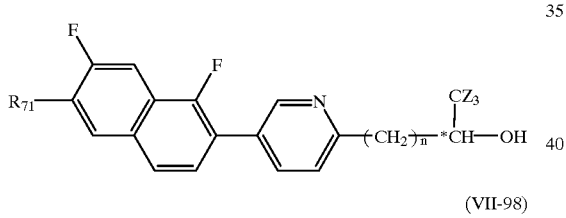
(VII-97)
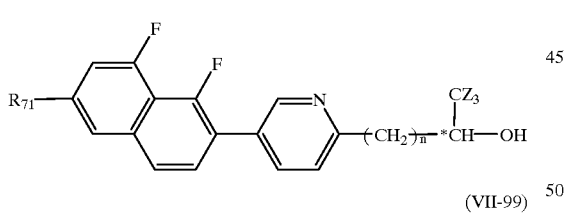
(VII-98)
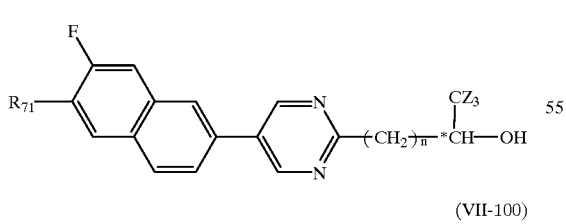
(VII-99)
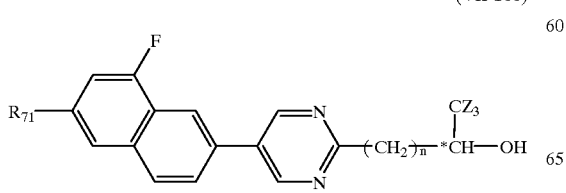
(VII-100)
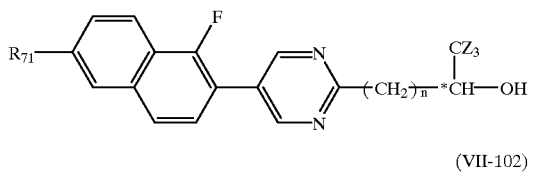
(VII-101)
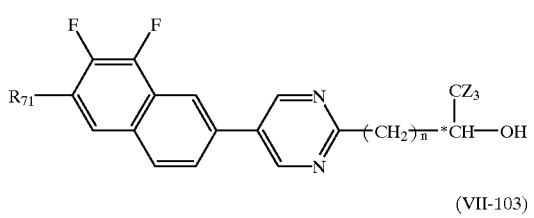
(VII-102)
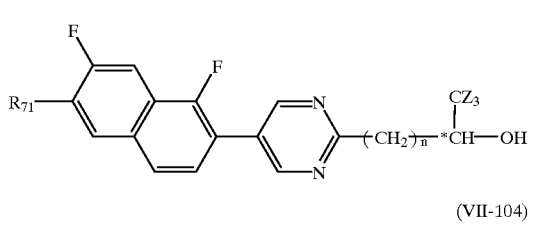
(VII-103)
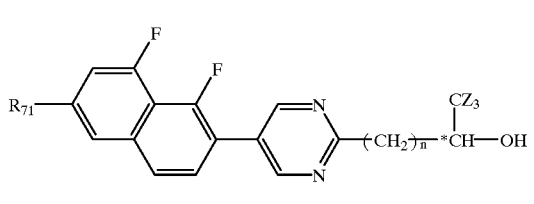
(VII-104)
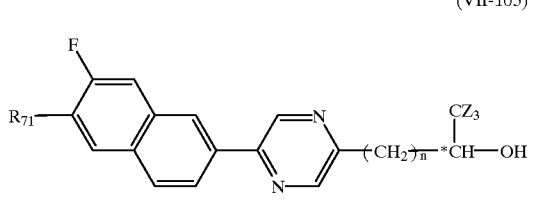
(VII-105)
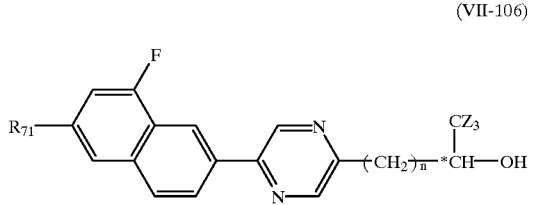
(VII-106)
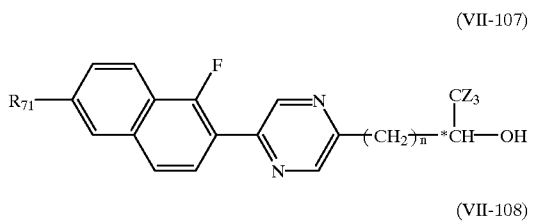
(VII-107)
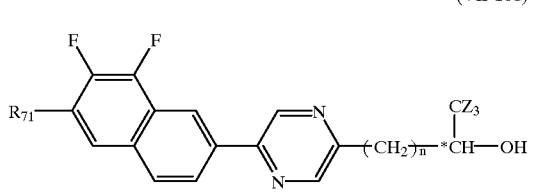
(VII-108)

(VII-109)
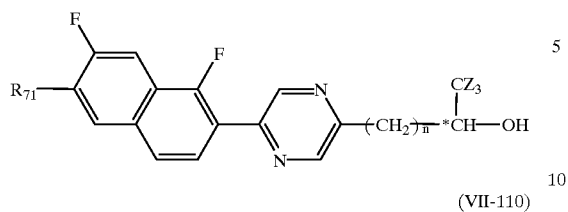
(VII-110)
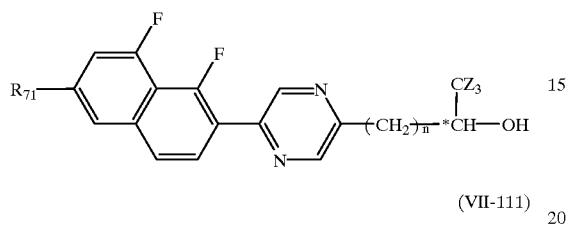
(VII-111)
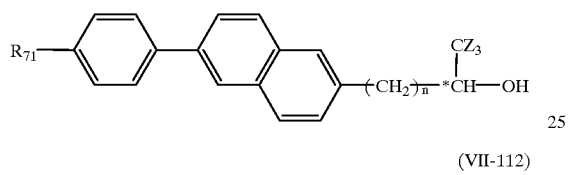
(VII-112)
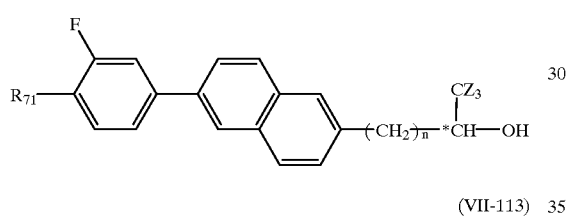
(VII-113)
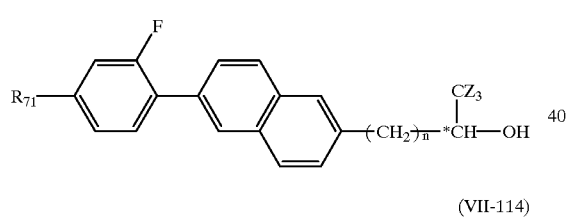
(VII-114)
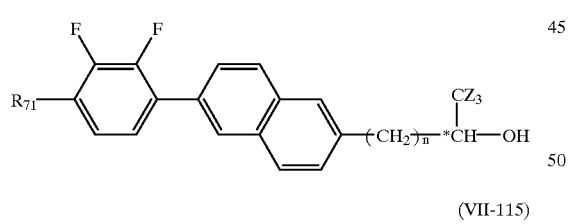
(VII-115)
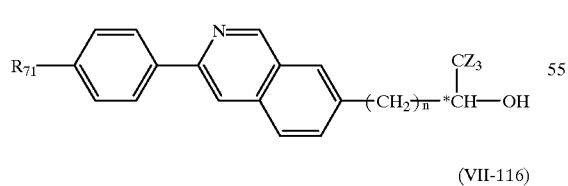
(VII-116)
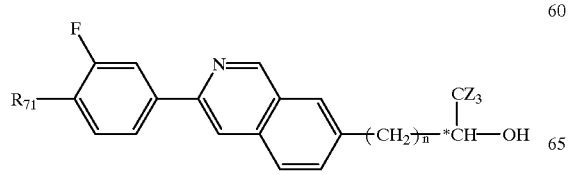
(VII-117)
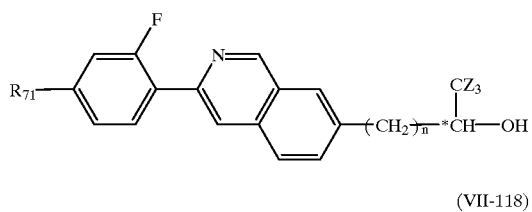
(VII-118)
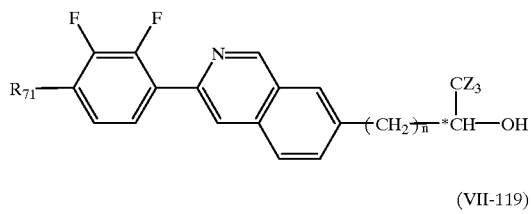
(VII-119)
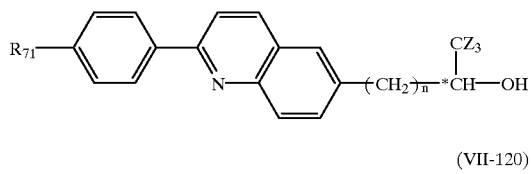
(VII-120)
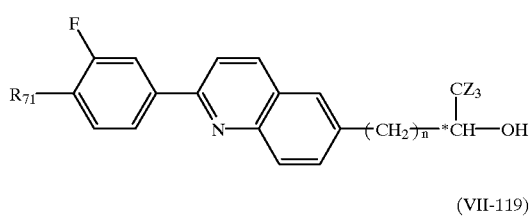
(VII-119)
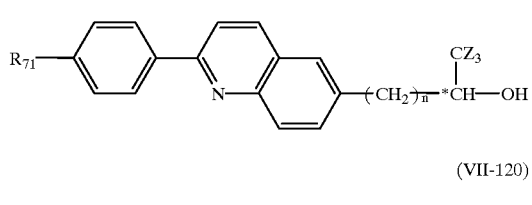
(VII-120)
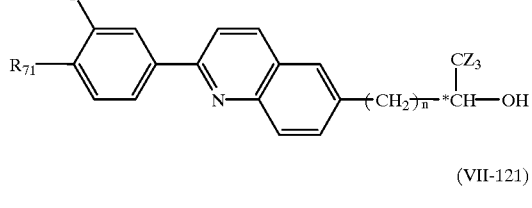
(VII-121)
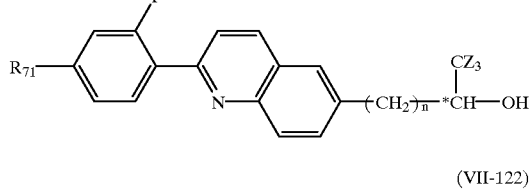
(VII-122)
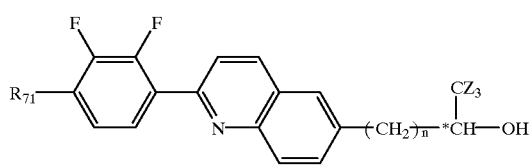

(VII-123)
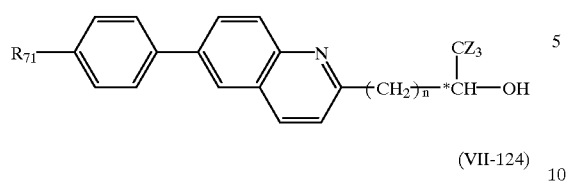
(VII-124)
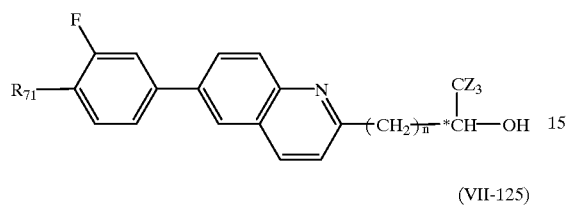
(VII-125)
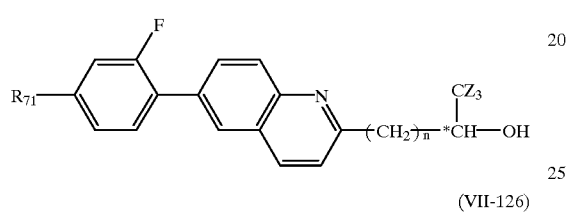
(VII-126)
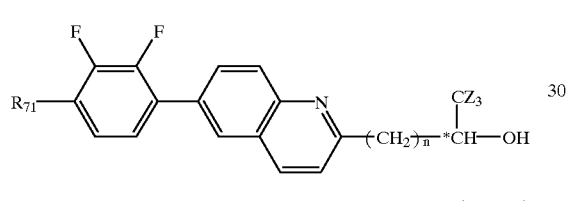
(VII-127)
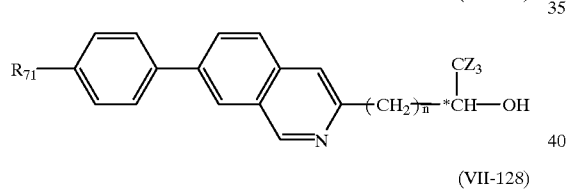
(VII-128)
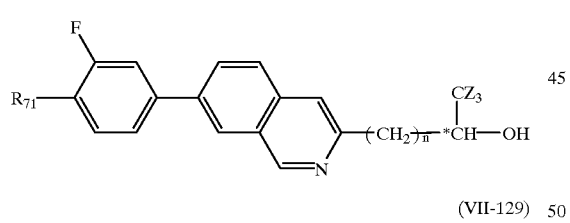
(VII-129)
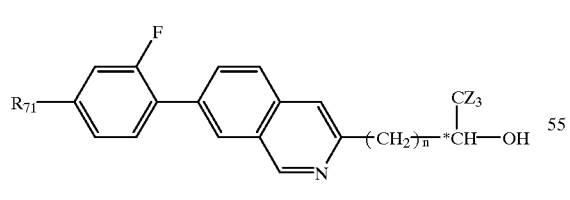
(VII-130)
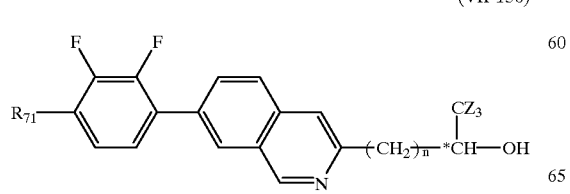
(VII-131)
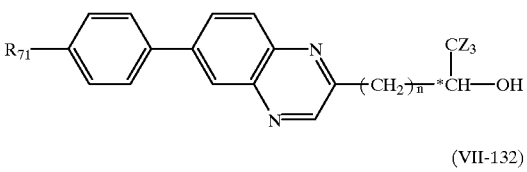
(VII-132)
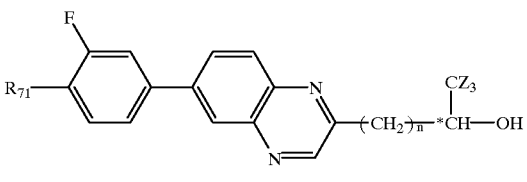
(VII-133)
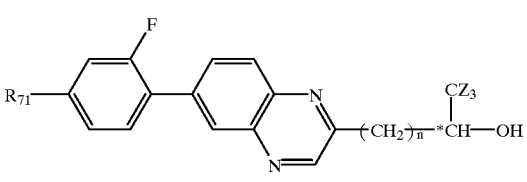
(VII-134)
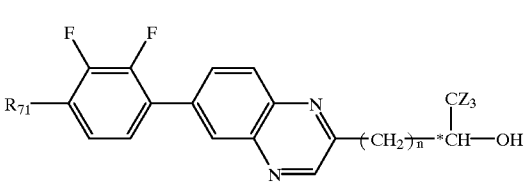
(VII-135)
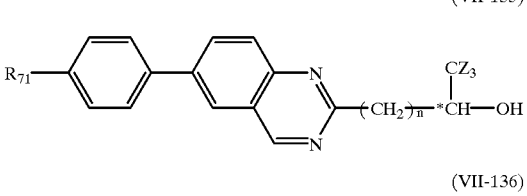
(VII-136)
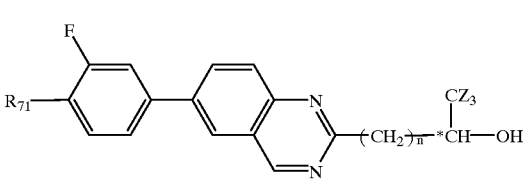
(VII-137)
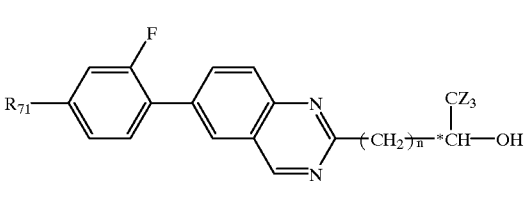
(VII-138)
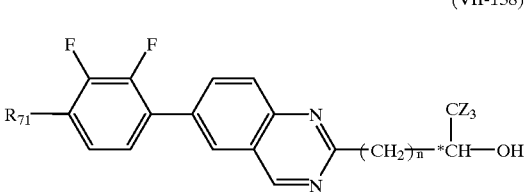

103
-continued
(VII-139)
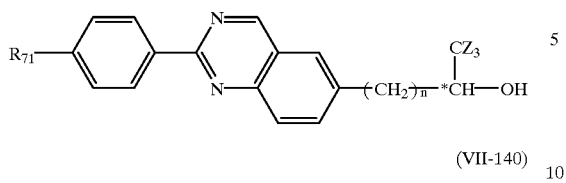
(VII-140)
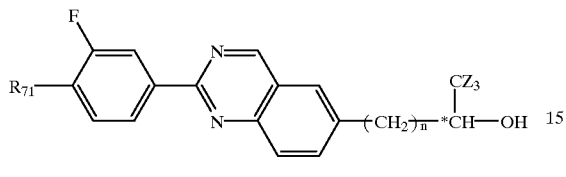
(VII-141)
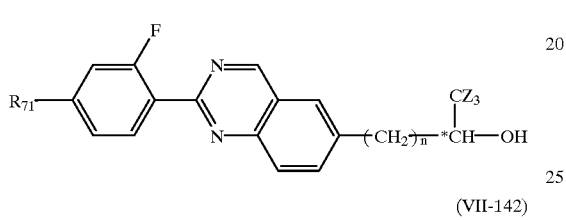
(VII-142)
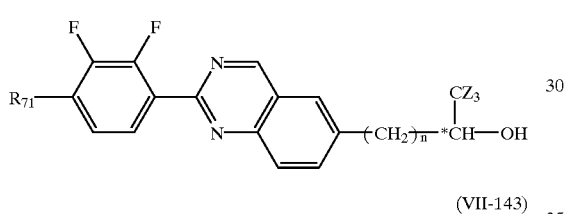
(VII-143)
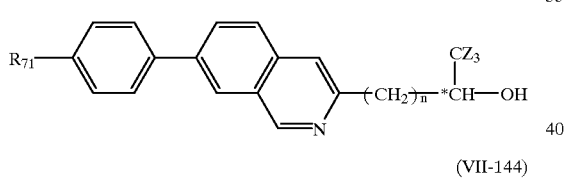
(VII-144)
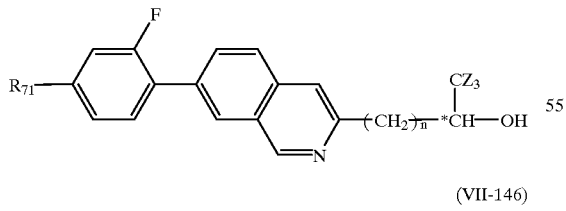
(VII-145)
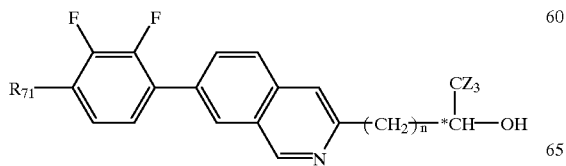
(VII-146)
104
-continued
(VII-147)
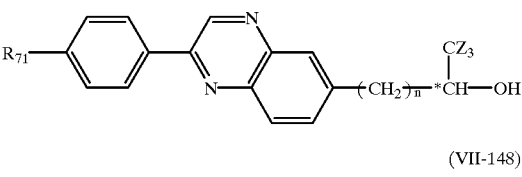
(VII-148)
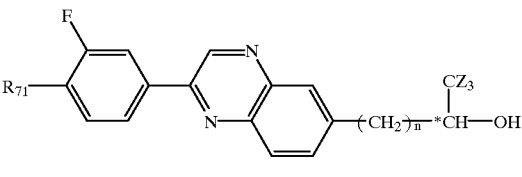
(VII-149)
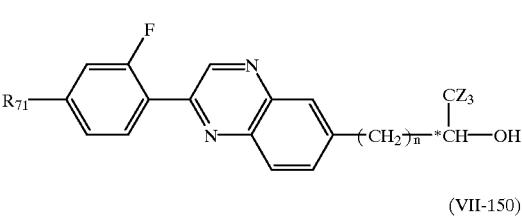
(VII-150)
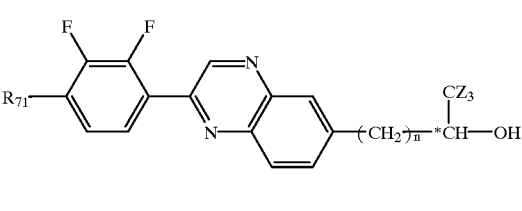
Specific examples of the compound of the formula (VIII) are described below. In the compounds (VIII-1) to (VIII-16), $R_{81}$ and $R_{82}$ are each a $C_1$–$C_{18}$ alkyl group, and n is an integer of 0 to 5.
(VIII-1)
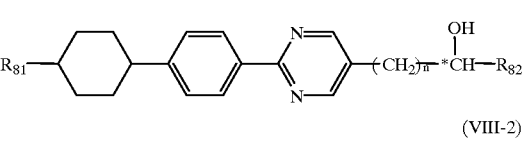
(VIII-2)
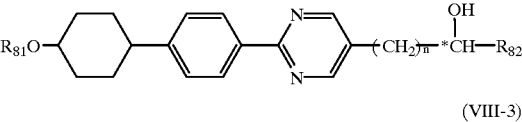
(VIII-3)
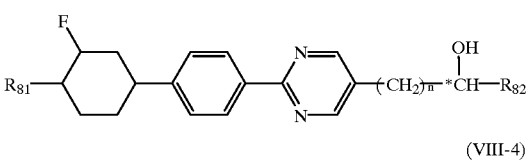
(VIII-4)
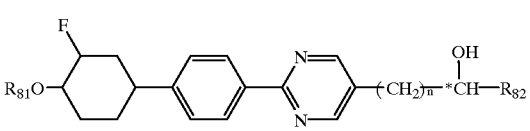

-continued

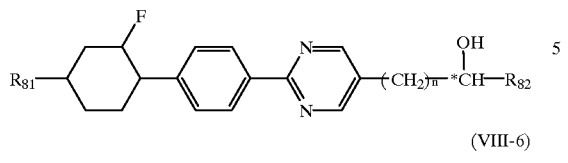
(VIII-5)

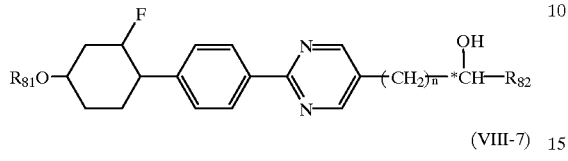
(VIII-6)

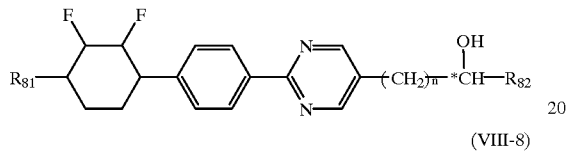
(VIII-7)

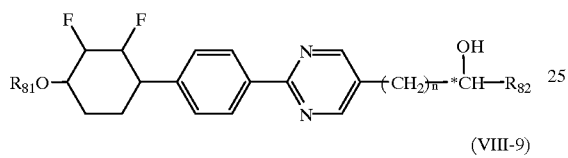
(VIII-8)

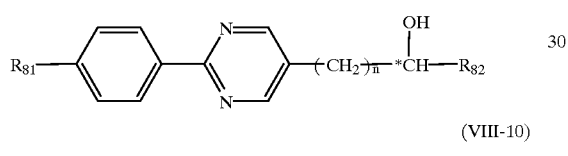
(VIII-9)

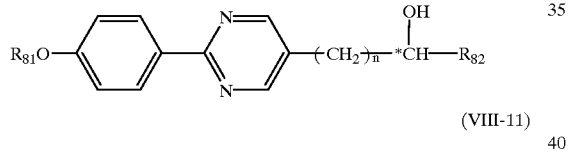
(VIII-10)

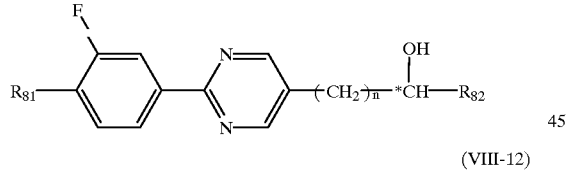
(VIII-11)

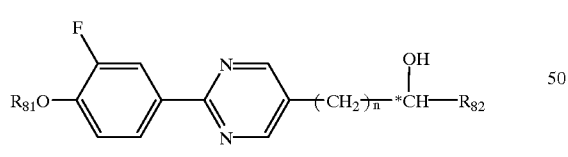
(VIII-12)

-continued

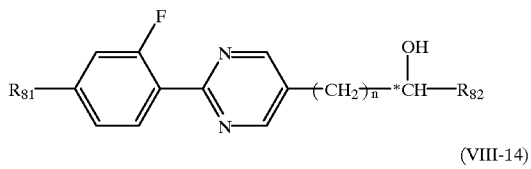
(VIII-13)

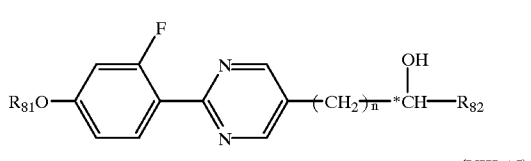
(VIII-14)

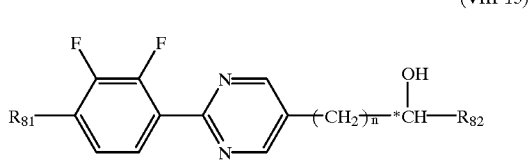
(VIII-15)

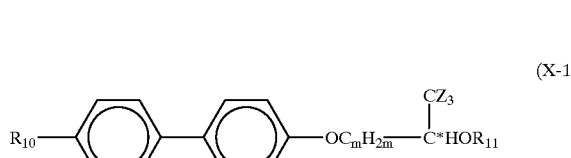
(VIII-16)

The above described optically active compounds may be synthesized by any one of the methods disclosed in Japanese Patent KOKAI Publication Nos. 104026/1989, 275864/1990 and 264566/1991.

The liquid crystal mixture of the present invention may contain at least one other optically active compound to adjust a spontaneous polarization value in the ferroelectric liquid crystal phase and a helical pitch in the cholesteric phase. The other optically active compound may not necessarily exhibit a liquid crystal phase.

Further, the liquid crystal mixture of the present invention may contain at least one other nonchiral compound to increase and maintain a liquid crystal temperature range.

Kinds of the other optically active compound and the other nonchiral compound are not limited. Specific examples are described below. In the compounds (X-1) to (X-19), $R_{10}$ is a $C_5$–$C_{15}$ alkyl group, $R_{11}$ is a $C_1$–$C_{10}$ alkyl or alkoxy group or $C_2$–$C_{10}$ alkoxyalkyl group which may be substituted by at least one halogen atom, preferably fluorine atom, m is an integer of 0 to 10, Z is a hydrogen atom or a fluorine atom, and * indicates an asymmetric carbon atom.

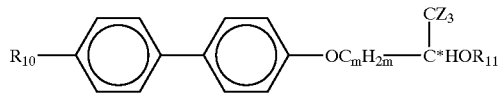
(X-1)

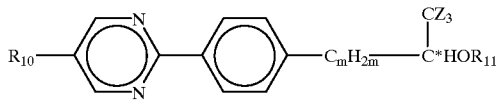
(X-2)

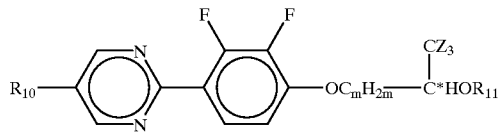
(X-3)

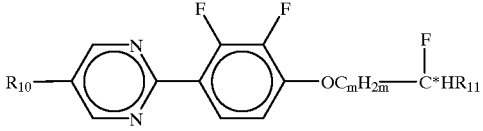
(X-4)

-continued
(X-5)
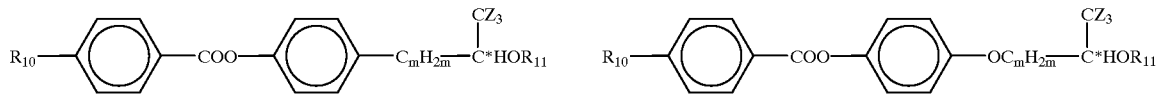
(X-6)
(X-7)
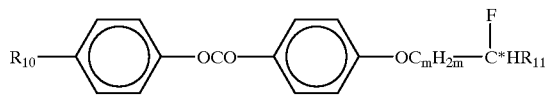
(X-8)
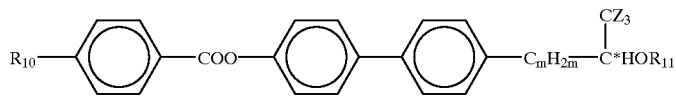
(X-9)
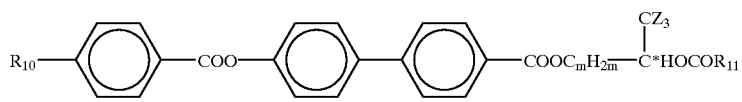
(X-10)
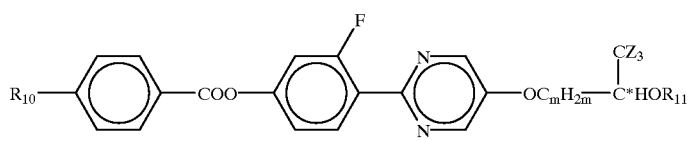
(X-11)
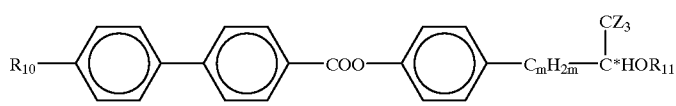
(X-12)
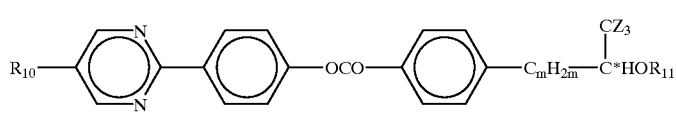
(X-13)
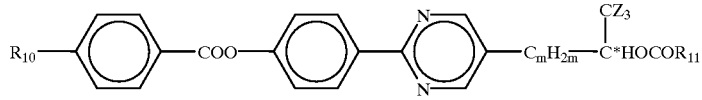
(X-14)
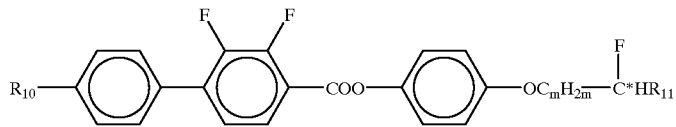
(X-15)
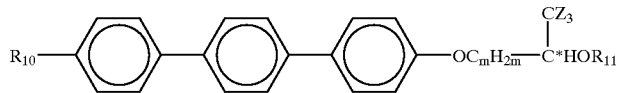
(X-16)
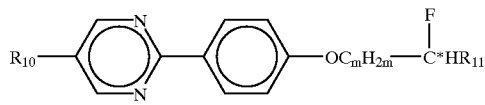
(X-17)
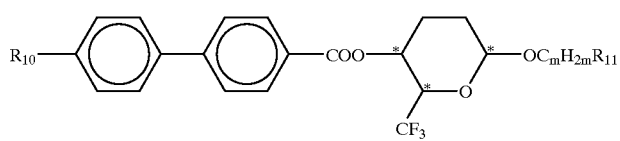

-continued

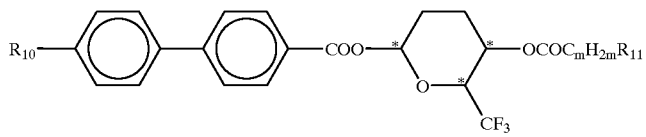
(X-18)

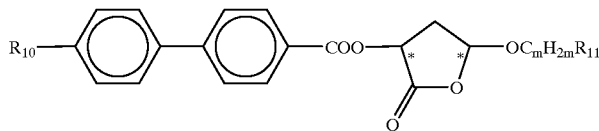
(X-19)

Further, it has been found that, when a liquid crystal has a substantially zero or negative temperature dependency of a minimum driving voltage $V_{min}$, a driving temperature margin can be widen.

Figure 1B:
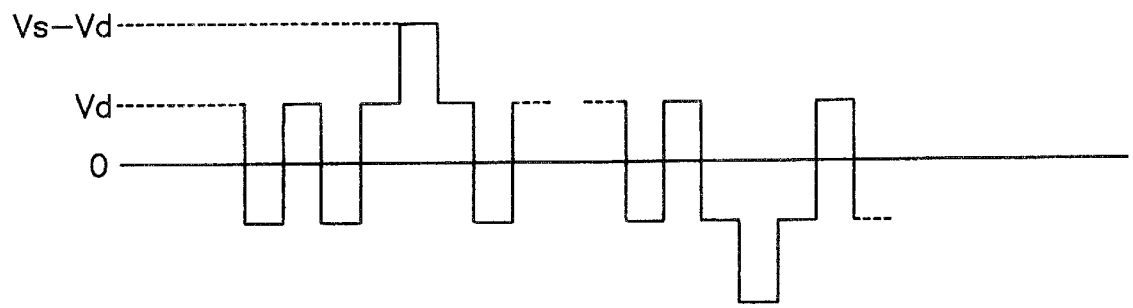
Figure 2:
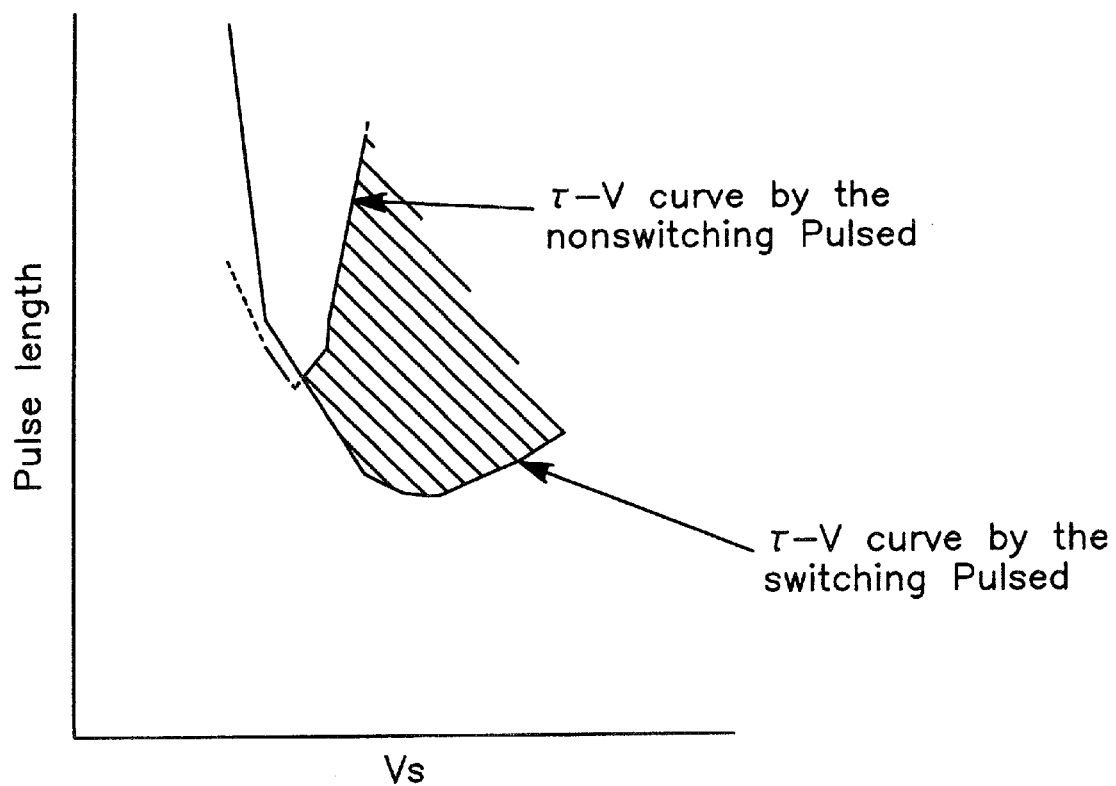
FIG. 2 shows an example of a $\tau$-V curve.

A liquid crystal for the $\tau$-$V_{min}$ mode can be driven by, for example, the JOERS/ALVEY Scheme disclosed by P. W. Surguy et al. in Ferroelectrics, 122 (1991) 63–79. Example of a driving wave form for this liquid crystal are shown in FIG. 1. When this liquid crystal is driven by either the non-switching pulse (a) or the switching pulse (b) of FIG. 1, it exhibits the $\tau$-V curve of FIG. 2, respectively, and the pulse length and the applied voltage Vs in the hatched range can drive the liquid crystal.

With the already reported liquid crystals for the $\tau$-$V_{min}$ mode, as a temperature increases, the $V_{min}$ increases while the $\tau_{min}$ decreases. Examples thereof are disclosed by J. C. Jones et al. in Ferroelectrics, 121 (1991) 91–102 and M. Koden in Ferroelectrics, 149 (1993) 183–192.

According to the present invention, it has been found that, when a liquid crystal, a liquid crystal mixture and a liquid crystal device, which are explained below, are used, a driving temperature margin can be widen, and a liquid crystal having such property has been found.

According to the present invention, a ferroelectric liquid crystal for a $\tau$-$V_{min}$ mode has a substantially zero or negative temperature dependency of a minimum driving voltage $V_{min}$, that is, a property that $V_{min}$ does not change with the change of temperature or $V_{min}$ increases as the temperature lowers (Property (1)).

Preferably, with this ferroelectric liquid crystal, minimum values ($V_{min}$, $\tau_{min}$) of a $\tau$-$V_{min}$ curve obtained when the liquid crystal is driven by a monopolar pulse at a temperature $T_1$ are in a range surrounded by two $\tau$-V curves which are obtained when the liquid crystal is driven at a temperature $T_2$ which is higher than $T_1$ by a same polarity pulse and a opposite polarity pulse, respectively, where $T_1$ and $T_2$ are arbitrary temperatures in the temperature range of the ferroelectric smectic C phase (Property (2)).

The same polarity pulse means a pulse having a wave form which has the same polarity as that of the switching pulse just before the switching pulse is applied and generates a pulse with a voltage smaller than the switching pulse, and the opposite polarity pulse means a pulse which has the reverse polarity to that of the switching pulse just before the switching pulse is applied and generates a pulse with a voltage smaller than the switching pulse.

In a preferred embodiment, the liquid crystal having the above Property (1) or (2) is a ferroelectric chiral smectic liqiud crystal.

A ferroelectric chiral smectic liquid crystal mixture of the above type comprises the ferroelectric chiral smectic liquid crystal described above. In addition, a liquid crystal device of the above type comprises a pair of electrode substrates, and a layer of the ferroelectric chiral smectic liquid crystal or mixture of the above type between the pair of the electrode substrates.

Figure 3:
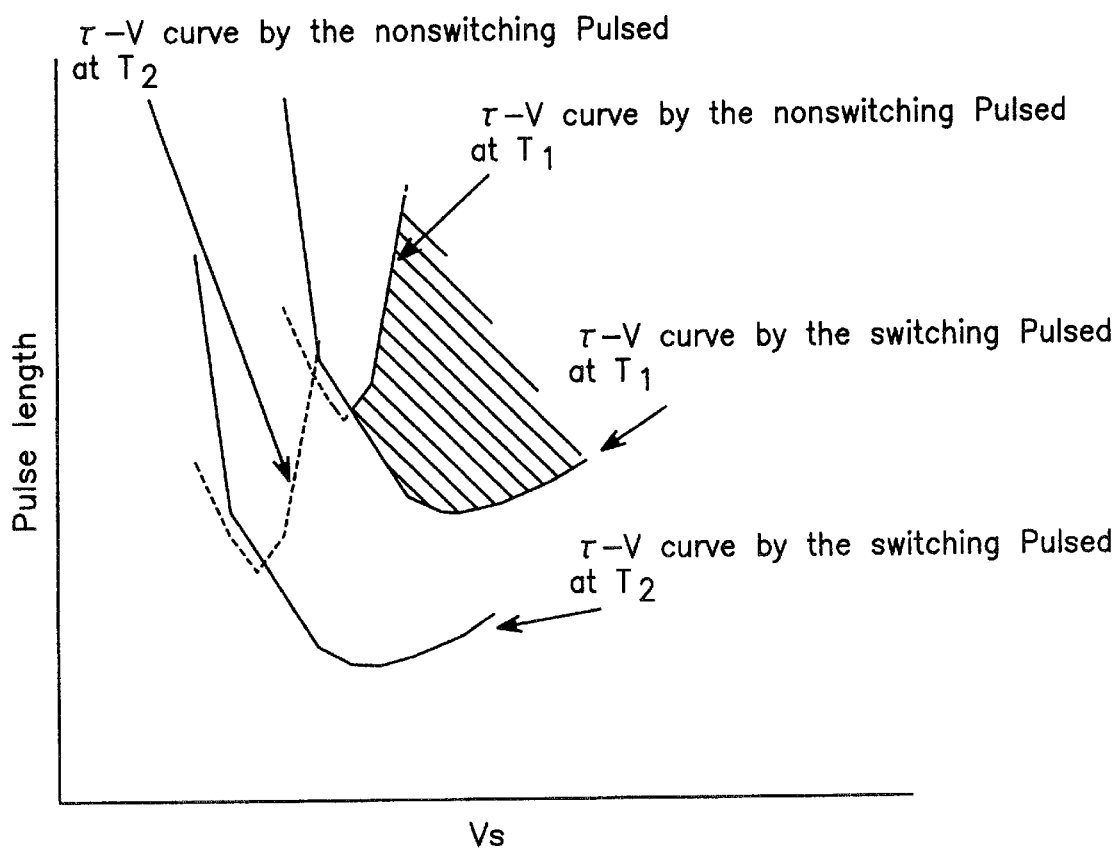
FIG. 3 shows a $\tau$-V curve when the temperature dependency of $V_{min}$ is negative.

The liquid crystal having the negative temperature dependency of $V_{min}$ is one having the property, for example, shown in FIG. 3, in which $T_1$ is lower than $T_2$. In an example shown in FIG. 3, a range in which the liquid crystal can be driven both at $T_1$ and at $T_2$ is the hatched range.

Figure 4:
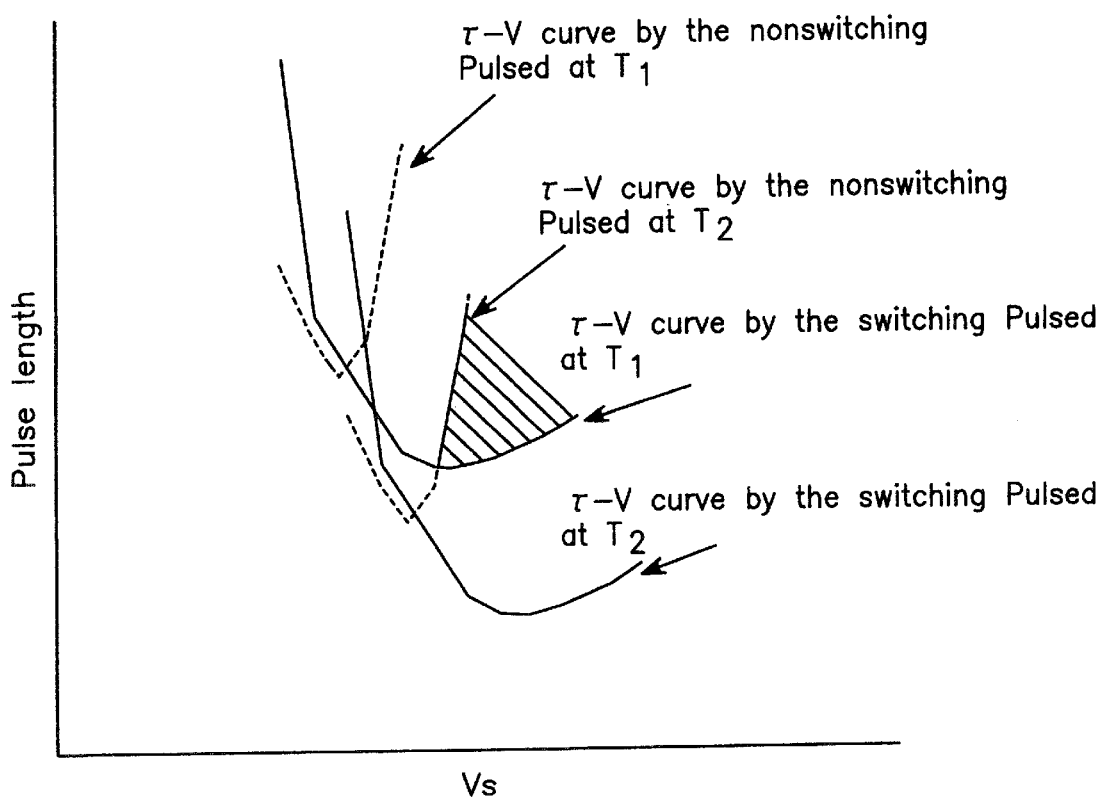
FIG. 4 shows a $\tau$-V curve when the temperature dependency of $V_{min}$ is positive.

FIG. 4 shows a $\tau$-V characteristic of a conventional liquid crystal for the $\tau$-$V_{min}$ mode, Vmin of which decreases as the temperature increases. In comparison with FIG. 3, the area in which the liquid crystal can be driven either at $T_1$ or at $T_2$ is narrowed.

According to the present invention, it has been found that a driving temperature margin is widened by the use of a liquid crystal which has a substantially zero or negative temperature dependency of a minimum driving voltage $V_{min}$, and a specific compound having such property has been found. Before the present invention, any liquid crystal having $V_{min}$ which decreases with the increase of a temperature has not been reported.

This property can be attained when the liquid crystal is driven by the JORES/ALEVEY scheme and also by Malvern-3 scheme which is proposed by J. R. Hughes et al in Liquid Crystals, 13 (4), (1993) 567–801.

The liquid crystal having the Property (1) or (2) has the wide driving temperature margin. Preferably, it has one or more of the following properties:

(i) The minimum value ($V_{1min}$, $\tau_{1min}$) in the $\tau$-V curve which is obtained when the liquid crystal having the Property (2) is driving by the monopolar pulse at the temperature $T_1$ is included in a first neighboring area of the $\tau$-V curve which is obtained when the liquid crystal is driving by the monopolar pulse at the temperature $T_2$, wherein the "first neighboring area" of the $\tau$-V curve means an area occupied by an ellipsoid having a radius of 15 V in the voltage direction and a radius of $\tau'$ in the pulse length direction when the center of the ellipsoid moves along the $\tau$-V curve, in which, $\tau'$ is a $\tau$ value on the $\tau$-V curve at the voltage of ($V_{2min}$+8) V/$\mu$m when the minimum value of the $\tau$-V curve which is obtained by driving the liquid crystal by the monopolar pulse at the temperature $T_2$ is ($V_{2min}$, $\tau_{2min}$), where $T_1$ and $T_2$ are the same as defined in the Property (2).

(ii) The minimum value ($V_{1min}$, $\tau_{1min}$) in the $\tau$-V curve which is obtained when the liquid crystal having the Property (2) is driving by the monopolar pulse at the temperature $T_1$ is included in a second neighboring area of the $\tau$-V curve which is obtained when the liquid crystal is driving by the monopolar pulse at the temperature $T_2$, wherein the "second neighboring area" of the $\tau$-V curve means an area occupied by an ellipsoid having a radius of 15 V in the voltage direction and a radius of τ" in the pulse length direction when the center of the ellipsoid move along the τ-V curve, in which, τ" is a τ value on the τ-V curve at the voltage of $(V_{2min}+5)$ V/μm when the minimum value of the τ-V curve which is obtained by driving the liquid crystal by the monopolar pulse at the temperature $T_2$ is $(V_{2min}, \tau_{2min})$, where $T_1$ and $T_2$ are the same as defined in the Property (2).

(iii) The minimum value $(V_{1min}, \tau_{1min})$ in the τ-V curve which is obtained when the liquid crystal having the Property (2) is driving by the monopolar pulse at the temperature $T_1$ is included in a third neighboring area of the τ-V curve which is obtained when the liquid crystal is driving by the monopolar pulse at the temperature $T_2$, wherein the "third neighboring area" of the τ-V curve means an area occupied by an ellipsoid having a radius of 15 V in the voltage direction and a radius of τ'" in the pulse length direction when the center of the ellipsoid moves along the τ-V curve, in which, τ'" is a τ value on the τ-V curve at the voltage of $(V_{2min}+3)$ V/μm when the minimum value of the τ-V curve which is obtained by driving the liquid crystal by the monopolar pulse at the temperature $T_2$ is $(V_{2min}, \tau_{2min})$, where $T_1$ and $T_2$ are the same as defined in the Property (2).

(iv) With the liquid crystal having the property (i), (ii) or (iii), preferably $T_1$ is 30° C. or lower, and $T_2$ is $(T_C-20)°$ C. or higher, wherein $T_C$ is an upper limit temperature of the ferroelectric smectic C phase.

A specific example of the liquid crystal having the Property (1) or (2) is a liquid crystal mixture comprising at least one optically active compound of the formula (II) in which $R_{21}, A_{21}, A_{22}, A_{23}, X_2, Z, p, q, n, m, i, j, k$ and * are the same as defined above, provided that at least one of $A_{21}, A_{22}$ and $A_{23}$ is a group of the formula:

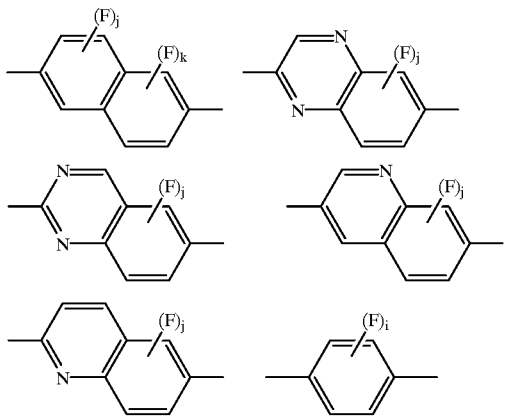

in which i, j and k are not zero at the same time.

Preferred examples of the above compound are those exemplified in connection with the compound of the formula (II) in which the phenyl group is substituted by one or two fluorine atoms. Among them, the following compounds are more preferred:

5-Octyl-2-[2-fluoro-4-(6-fluoroheptyl)phenyl] pyrimidine,
5-Octyloxy-2-[2-fluoro-4-(6-fluoroheptyl)phenyl] pyrimidine,
5-Nonyl-2-[2-fluoro-4-(6-fluoroheptyl)phenyl] pyrimidine,
5-Nonyloxy-2-[2-fluoro-4-(6-fluoroheptyl)phenyl] pyrimidine,
5-Decyl-2-[2-fluoro-4-(6-fluoroheptyl)phenyl] pyrimidine,
5-Decyloxy-2-[2-fluoro-4-(6-fluoroheptyl)phenyl] pyrimidine,
5-Octyl-2-[2-fluoro-4-(5-fluorohexyl)phenyl]pyrimidine,
5-Octyloxy-2-[2-fluoro-4-(5-fluorohexyl)phenyl] pyrimidine,
5-Nonyl-2-[2-fluoro-4-(5-fluorohexyl)phenyl] pyrimidine,
5-Nonyloxy-2-[2-fluoro-4-(5-fluorohexyl)phenyl] pyrimidine,
5-Decyl-2-[2-fluoro-4-(5-fluorohexyl)phenyl]pyrimidine,
5-Decyloxy-2-[2-fluoro-4-(5-fluorohexyl)phenyl] pyrimidine,
5-Octyl-2-[2-fluoro-4-(4-fluoropentyl)phenyl] pyrimidine,
5-Octyloxy-2-[2-fluoro-4-(4-fluoropentyl)phenyl] pyrimidine,
5-Nonyl-2-[2-fluoro-4-(4-fluoropentyl)phenyl] pyrimidine,
5-Nonyloxy-2-[2-fluoro-4-(4-fluoropentyl)phenyl] pyrimidine,
5-Decyl-2-[2-fluoro-4-(4-fluoropentyl)phenyl] pyrimidine,
5-Decyloxy-2-[2-fluoro-4-(4-fluoropentyl)phenyl] pyrimidine,
5-Octyl-2-[3-fluoro-4-(6-fluoroheptyl)phenyl] pyrimidine,
5-Octyloxy-2-[3-fluoro-4-(6-fluoroheptyl)phenyl] pyrimidine,
5-Nonyl-2-[3-fluoro-4-(6-fluoroheptyl)phenyl] pyrimidine,
5-Nonyloxy-2-[3-fluoro-4-(6-fluoroheptyl)phenyl] pyrimidine,
5-Decyl-2-[3-fluoro-4-(6-fluoroheptyl)phenyl] pyrimidine,
5-Decyloxy-2-[3-fluoro-4-(6-fluoroheptyl)phenyl] pyrimidine,
5-Octyl-2-[3-fluoro-4-(5-fluorohexyl)phenyl]pyrimidine,
5-Octyloxy-2-[3-fluoro-4-(5-fluorohexyl)phenyl] pyrimidine,
5-Nonyl-2-[3-fluoro-4-(5-fluorohexyl)phenyl] pyrimidine,
5-Nonyloxy-2-[3-fluoro-4-(5-fluorohexyl)phenyl] pyrimidine,
5-Decyl-2-[3-fluoro-4-(5-fluorohexyl)phenyl]pyrimidine,
5-Decyloxy-2-[3-fluoro-4-(5-fluorohexyl)phenyl] pyrimidine,
5-Octyl-2-[3-fluoro-4-(4-fluoropentyl)phenyl] pyrimidine,
5-Octyloxy-2-[3-fluoro-4-(4-fluoropentyl)phenyl] pyrimidine,
5-Nonyl-2-[3-fluoro-4-(4-fluoropentyl)phenyl] pyrimidine,
5-Nonyloxy-2-[3-fluoro-4-(4-fluoropentyl)phenyl] pyrimidine,
5-Decyl-2-[3-fluoro-4-(4-fluoropentyl)phenyl] pyrimidine,
5-Decyloxy-2-[3-fluoro-4-(4-fluoropentyl)phenyl] pyrimidine,
5-Octyl-2-[2,3-difluoro-4-(6-fluoroheptyl)phenyl] pyrimidine,
5-Octyloxy-2-[2,3-difluoro-4-(6-fluoroheptyl)phenyl] pyrimidine, 5-Nonyl-2-[2,3-difluoro-4-(6-fluoroheptyl)phenyl]pyrimidine,
5-Nonyloxy-2-[2,3-difluoro-4-(6-fluoroheptyl)phenyl]pyrimidine,
5-Decyl-2-[2,3-difluoro-4-(6-fluoroheptyl)phenyl]pyrimidine,
5-Decyloxy-2-[2,3-difluoro-4-(6-fluoroheptyl)phenyl]pyrimidine,
5-Octyl-2-[2,3-difluoro-4-(5-fluorohexyl)phenyl]pyrimidine,
5-Octyloxy-2-[2,3-difluoro-4-(5-fluorohexyl)phenyl]pyrimidine,
5-Nonyl-2-[2,3-difluoro-4-(5-fluorohexyl)phenyl]pyrimidine,
5-Nonyloxy-2-[2,3-difluoro-4-(5-fluorohexyl)phenyl]pyrimidine,
5-Decyl-2-[2,3-difluoro-4-(5-fluorohexyl)phenyl]pyrimidine,
5-Decyloxy-2-[2,3-difluoro-4-(5-fluorohexyl)phenyl]pyrimidine,
5-Octyl-2-[2,3-difluoro-4-(4-fluoropentyl)phenyl]pyrimidine,
5-Octyloxy-2-[2,3-difluoro-4-(4-fluoropentyl)phenyl]pyrimidine,
5-Nonyl-2-[2,3-difluoro-4-(4-fluoropentyl)phenyl]pyrimidine,
5-Nonyloxy-2-[2,3-difluoro-4-(4-fluoropentyl)phenyl]pyrimidine,
5-Decyl-2-[2,3-difluoro-4-(4-fluoropentyl)phenyl]pyrimidine,
5-Decyloxy-2-[2,3-difluoro-4-(4-fluoropentyl)phenyl]pyrimidine,
2-(4-Decyloxyphenyl)-5-(4-fluoropentyl)pyrimidine,
2-(2-Fluoro-4-octylphenyl)-5-(6-fluoroheptyl)pyrimidine,
2-(2-Fluoro-4-octyloxyphenyl)-5-(6-fluoroheptyl)pyrimidine,
2-(2-Fluoro-4-nonylphenyl)-5-(6-fluoroheptyl)pyrimidine,
2-(2-Fluoro-4-nonyloxyphenyl)-5-(6-fluoroheptyl)pyrimidine,
2-(2-Fluoro-4-decylphenyl)-5-(6-fluoroheptyl)pyrimidine,
2-(2-Fluoro-4-decyloxyphenyl)-5-(6-fluoroheptyl)pyrimidine,
2-(2-Fluoro-4-octylphenyl)-5-(5-fluorohexyl)pyrimidine,
2-(2-Fluoro-4-octyloxyphenyl)-5-(5-fluorohexyl)pyrimidine,
2-(2-Fluoro-4-nonylphenyl)-5-(5-fluorohexyl)pyrimidine,
2-(2-Fluoro-4-nonyloxyphenyl)-5-(5-fluorohexyl)pyrimidine,
2-(2-Fluoro-4-decylphenyl)-5-(5-fluorohexyl)pyrimidine,
2-(2-Fluoro-4-decyloxyphenyl)-5-(5-fluorohexyl)pyrimidine,
2-(2-Fluoro-4-octylphenyl)-5-(4-fluoropentyl)pyrimidine,
2-(2-Fluoro-4-octyloxyphenyl)-5-(4-fluoropentyl)pyrimidine,
2-(2-Fluoro-4-nonylphenyl)-5-(4-fluoropentyl)pyrimidine,
2-(2-Fluoro-4-nonyloxyphenyl)-5-(4-fluoropentyl)pyrimidine,
2-(2-Fluoro-4-decylphenyl)-5-(4-fluoropentyl)pyrimidine,
2-(2-Fluoro-4-decyloxyphenyl)-5-(4-fluoropentyl)pyrimidine,
2-(3-Fluoro-4-octylphenyl)-5-(6-fluoroheptyl)pyrimidine,
2-(3-Fluoro-4-octyloxyphenyl)-5-(6-fluoroheptyl)pyrimidine,
2-(3-Fluoro-4-nonylphenyl)-5-(6-fluoroheptyl)pyrimidine,
2-(3-Fluoro-4-nonyloxyphenyl)-5-(6-fluoroheptyl)pyrimidine,
2-(3-FIuoro-4-decylphenyl)-5-(6-fluoroheptyl)pyrimidine,
2-(3-Fluoro-4-decyloxyphenyl)-5-(6-fluoroheptyl)pyrimidine,
2-(3-Fluoro-4-octylphenyl)-5-(5-fluorohexyl)pyrimidine,
2-(3-Fluoro-4-octyloxyphenyl)-5-(5-fluorohexyl)pyrimidine,
2-(3-Fluoro-4-nonylphenyl)-5-(5-fluorohexyl)pyrimidine,
2-(3-Fluoro-4-nonyloxyphenyl)-5-(5-fluorohexyl)pyrimidine,
2-(3-Fluoro-4-decylphenyl)-5-(5-fluorohexyl)pyrimidine,
2-(3-Fluoro-4-decyloxyphenyl)-5-(5-fluorohexyl)pyrimidine,
2-(2,3-Difluoro-4-octylphenyl)-5-(4-fluoropentyl)pyrimidine,
2-(2,3-Difluoro-4-octyloxyphenyl)-5-(4-fluoropentyl)pyrimidine,
2-(2,3-Difluoro-4-nonylphenyl)-5-(4-fluoropentyl)pyrimidine,
2-(2,3-Difluoro-4-nonyloxyphenyl)-5-(4-fluoropentyl)pyrimidine,
2-(2,3-Difluoro-4-decylphenyl)-5-(4-fluoropentyl)pyrimidine,
2-(2,3-Difluoro-4-decyloxyphenyl)-5-(4-fluoropentyl)pyrimidine,
2-(2,3-Difluoro-4-octylphenyl)-5-(6-fluoroheptyl)pyrimidine,
2-(2,3-Difluoro-4-octyloxyphenyl)-5-(6-fluoroheptyl)pyrimidine,
2-(2,3-Difluoro-4-nonylphenyl)-5-(6-fluoroheptyl)pyrimidine,
2-(2,3-Difluoro-4-nonyloxyphenyl)-5-(6-fluoroheptyl)pyrimidine,
2-(2,3-Difluoro-4-decylphenyl)-5-(6-fluoroheptyl)pyrimidine,
2-(2,3-Difluoro-4-decyloxyphenyl)-5-(6-fluoroheptyl)pyrimidine,
2-(2,3-Difluoro-4-octylphenyl)-5-(5-fluorohexyl)pyrimidine,
2-(2,3-Difluoro-4-octyloxyphenyl)-5-(5-fluorohexyl)pyrimidine,
2-(2,3-Difluoro-4-nonylphenyl)-5-(5-fluorohexyl)pyrimidine,
2-(2,3-Difluoro-4-nonyloxyphenyl)-5-(5-fluorohexyl)pyrimidine,
2-(2,3-Difluoro-4-decylphenyl)-5-(5-fluorohexyl)pyrimidine, 2-(2,3-Difluoro-4-decyloxyphenyl)-5-(5-fluorohexyl)
pyrimidine.

More preferably, the liquid crystal comprises at least one of the above exemplified compounds and at least one of the following compounds:

5-Nonyloxy-2-[2,3-difluoro-4-(1-trans-nonenyl)phenyl]
pyrimidine,
5-Decyloxy-2-[2,3-difluoro-4-(1-trans-nonenyl)phenyl]
pyrimidine,
5-Nonyl-2-[2,3-difluoro-4-(1-trans-nonenyl)phenyl]
pyrimidine,
5-Decyl-2-[2,3-difluoro-4-(1-trans-nonenyl)phenyl]
pyrimidine,
5-Nonyloxy-2-[2,3-difluoro-4-(1-trans-decenyl)phenyl]
pyrimidine,
5-Decyloxy-2-[2,3-difluoro-4-(1-trans-decenyl)phenyl]
pyrimidine,
5-Nonyl-2-[2,3-difluoro-4-(1-trans-decenyl)phenyl]
pyrimidine,
5-Decyl-2-[2,3-difluoro-4-(1-trans-decenyl)phenyl]
pyrimidine,
5 2-(2,3-Difluoro-4-nonyloxyphenyl)-5-(1-trans-nonenyl)pyrimidine,
2-(2,3-Difluoro-4-decyloxyphenyl)-5-(1-trans-nonenyl)
pyrimidine,
2-(2,3-Difluoro-4-nonylphenyl)-5-(1-trans-nonenyl)
pyrimidine,
2-(2,3-Difluoro-4-decylphenyl)-5-(1-trans-nonenyl)
pyrimidine,
2-(2,3-Difluoro-4-nonyloxyphenyl)-5-(1-trans-decenyl)
pyrimidine,
2-(2,3-Difluoro-4-decyloxyphenyl)-5-(1-trans-decenyl)
pyrimidine,
2-(2,3-Difluoro-4-nonylphenyl)-5-(1-trans-decenyl)
pyrimidine,
2-(2,3-Difluoro-4-decylphenyl)-5-(1-trans-decenyl)
pyrimidine.

The liquid crystal device of the present invention can be used in various types of liquid crystal apparatuses or displays.

A structure of the liquid crystal device of the present invention is not limited.

Figure 5:
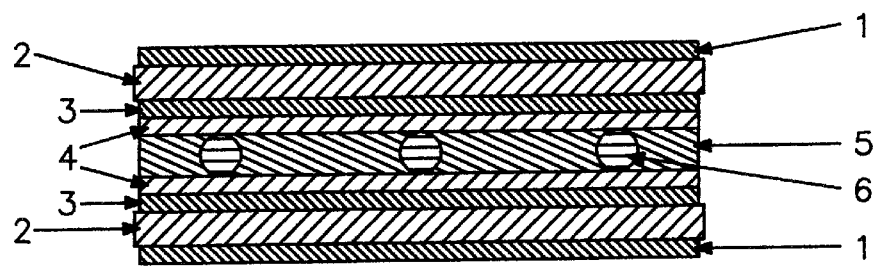
FIG. 5 schematically shows a cross section of an example of a liquid crystal device comprising a ferroelectric liquid crystal.

FIG. 5 shows a schematic cross sectional view of an embodiment of the ferroelectric liquid crystal device, which comprises polarizing plates 1, glass substrates 2, transparent electrodes 3, orientation-controlling insulating films 4, a ferroelectric liquid crystal 5 and spacers 6.

One example of the liquid crystal element of FIG. 5 is a surface stabilized ferroelectric liquid crystal display, in which the ferroelectric liquid crystal is packed in a state of homogeneous orientation in a cell having a very narrow gap between a pair of the glass substrates 2. A thickness of the ferroelectric liquid crystal layer 5 is determined by the gap between the pair of the glass substrates 2 and the thicknesses of the transparent electrodes 3 and the orientation-controlling insulating films 4, and is preferably from 0.5 to 20 $\mu$m, more preferably from 1 to 5 $\mu$m.

The transparent electrode 3 is provided on a surface of each glass substrate 2 on the side of the ferroelectric liquid crystal layer 5. As the transparent electrode, an ITO (indium oxide-tin oxide) film, an indium oxide film, a tin oxide film and the like are used. The orientation-controlling insulating film (alignment film) 4 is provided on the surface of each transparent electrode on the side of the ferroelectric liquid crystal layer 5. When the alignment film alone has a good insulating property, no additional insulating film is necessary. Otherwise, an additional insulating film may be provided beneath the alignment film.

As the orientation-controlling film, any of conventional organic, inorganic, low molecular or polymeric films can be used. Examples of the polymeric material are polyimide, polyamide, polyamideimide, polyvinyl alcohol, polystyrene, polyester, polyesterimide, and various kinds of photoresists.

When the polymeric material is used as the orientation-controlling film, its surface may be subjected to a so-called rubbing treatment comprising rubbing the surface with, for example, a piece of gauze or acetate flocked fabric in one direction, whereby the orientation of the liquid crystal molecules is further facilitated.

The additional insulating film may be formed from, for example, titanium oxide, aluminum oxide, zirconium oxide, silicon oxide, silicon nitride, and the like.

The alignment film and the insulating film may be formed by any suitable method according to the kinds of the materials forming the films.

For instance, in the case of a polymeric material, the polymeric material or its precursor is dissolved in a solvent in which it can be dissolved, and coated by screen printing, spinner coating, dip coating, etc. In the case of an inorganic material, dipping, vapor deposition, inclined vapor deposition and the like may be used.

A thickness of the alignment film is not critical, and preferably from 10 Å to 20 $\mu$m, more preferably from 20 Å to 1000 Å.

The gap between the two glass substrates 3 on each of which the alignment film 4 and the transparent electrode 3 are provided is maintained at a predetermined distance using the spacers 6. As the spacer, an insulating material in the form of a bead, a fiber or a film having a specific diameter or thickness is used. Examples of the insulating material are silica, alumina and polymers.

The spacers are held between the pair of the glass substrates 2, and the periphery of the glass substrates is sealed with a sealant such as an epoxy adhesive to encapsulate the ferroelectric liquid crystal.

On the outer surface of the glass substrates 2, one or two polarizing plates 1 are provided. In the guest-host method using a dichromic dye, one polarizing plate is used, while in the birefringence method, tow polarizing plates are used. FIG. 5 shows the device using two polarizing plates. In such case, the two polarizing plates are placed in a state that their polarization axes are perpendicular to each other, namely, in the crossnicol state.

To each of the transparent electrodes 3, a suitable lead wire is bonded and then connected to an outer driving circuit.

PREFERRED EMBODIMENTS OF THE INVENTION

The present invention will be illustrated by the following Examples, which do not limit the scope of the present invention in any way.

EXAMPLE 1

The following compounds were mixed in the indicated amounts to prepare a ferroelectric smectic liquid crystal mixture (1) of the present invention:

| Compound | Mol. % |
|---|---|
| C₁₀H₂₁O—[3,4-difluorophenyl]—[pyrimidine]—CH=CH—C₇H₁₅ | 14.2 |
| C₁₀H₂₁O—[3,4-difluorophenyl]—[pyrimidine]—CH=CH—C₈H₁₇ | 14.2 |
| C₉H₁₉O—[3,4-difluorophenyl]—[pyrimidine]—CH=CH—C₇H₁₅ | 8.4 |
| C₁₀H₂₁—[pyrimidine]—[2,3-difluorophenyl]—CH=CH—C₇H₁₅ | 26.6 |
| C₈H₁₇O—[biphenyl]—COO—[3-fluorophenyl]—C₅H₁₁ | 10.6 |
| C₈H₁₇O—[biphenyl]—COO—[3-fluorophenyl]—C₅H₁₁ | 10.6 |
| C₁₀H₂₁O—[3,4-difluorophenyl]—[pyrimidine]—C₅H₁₀·CHCH₃(F) | 15.4 |

The mixture was held between a pair of glass substrates, on each of which a transparent electrode and an insulating film having a thickness of 500 Å were attached and a polyimide alignment film were coated, with adjusting a gap between the glass substrates to about 2 μm using spacers. On the outer surfaces of the glass substrates, respective polarizing plates were provided with rotating their polarization planes at 90° to assemble a liquid crystal element. The polarization axis on the light incident side coincided with the rubbing direction of the polyimide alignment film.

With this liquid crystal device, a dependency of a response time on an electric field (τ-V characteristic) was measured.

Herein, a response time means a minimum pulse length by which a good switching state is achieved when the pulse is applied.

Figure 6:
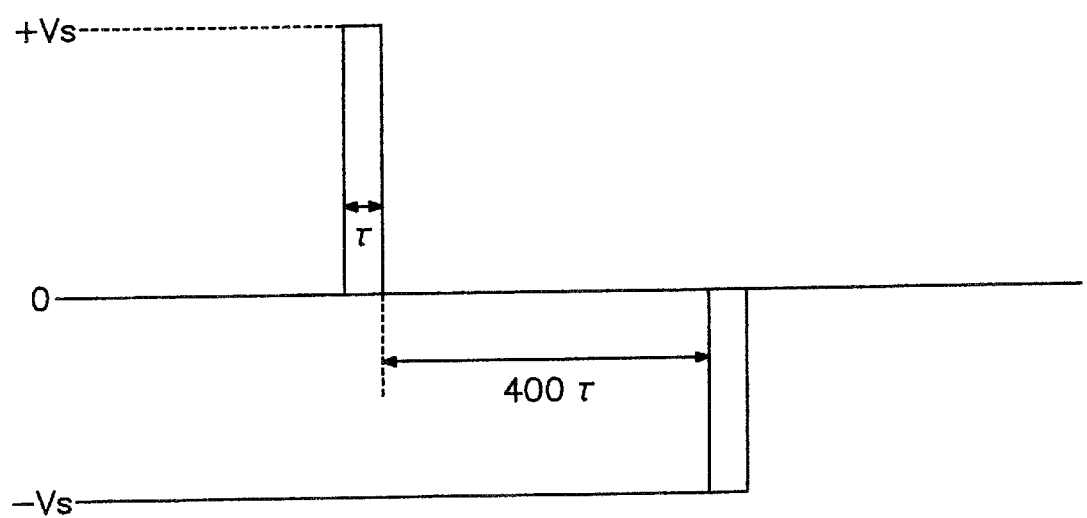
FIG. 6 shows a wave form of a monopulse.
Figure 7A:
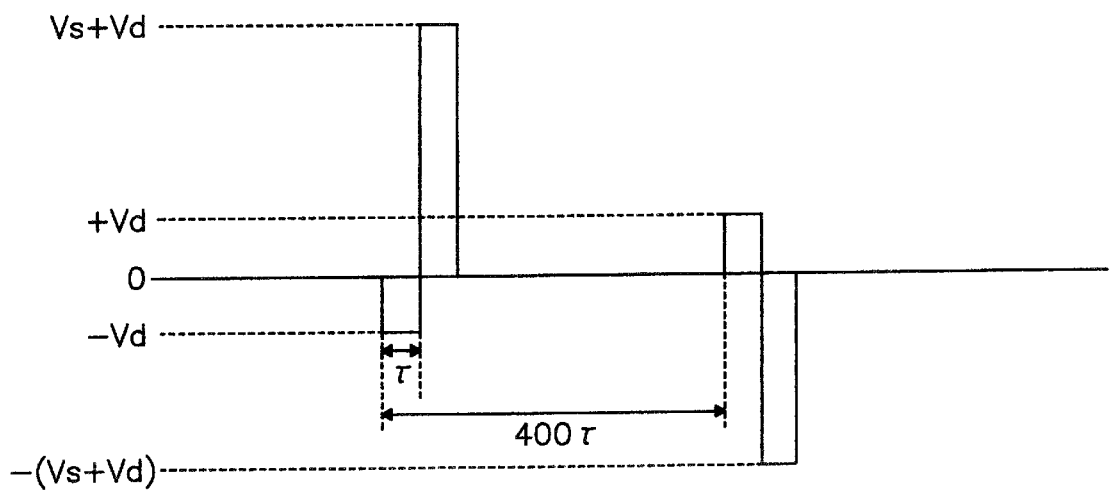
FIGS. 7(a) and 7(b) show wave forms for evaluating a driving temperature margin.
Figure 7B:
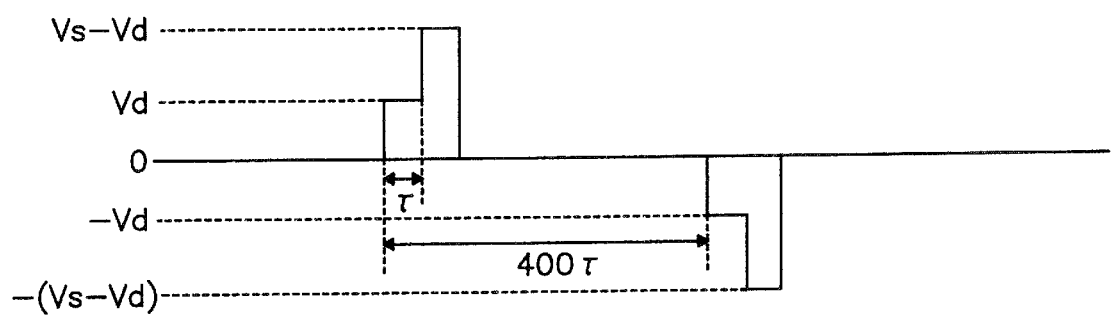

The τ-V characteristic is evaluated as follows:

To the liquid crystal device, a pulse of FIGS. 6 or 7 having a duty ratio of 1:400 is applied to cause switching of the device. A change of an amount of transmitted light is detected by a photo-multiplier, a detected current is converted to a voltage which is inputted in an oscilloscope, and a displayed figure is monitored.

The pulse of FIG. 6 is a monopolar pulse. The upper pulse (a) of FIG. 7 is a opposite polarity pulse, which is a simplified wave form of the non-switching pulse wave form (a) of FIG. 1 by removing the bias portions, and the lower pulse (b) of FIG. 7 is a same polarity pulse, which is a simplified wave form of the switching pulse wave form (b) of FIG. 1 by removing the bias portions. A minimum pulse length which provides a good switching property in a specific electric field, that is, maintains a memory property, is defined as a minimum pulse length in the applied electric field. A state which cannot maintain the memory property is a state in which a contrast ratio between two stable states decreases.

Then, the minimum pulse length was plotted against the applied electric field to obtain a τ-V characteristic curve.

The minimum value of the applied electric field in the τ-V characteristic curve was $V_{min}$, and the minimum pulse corresponding to $V_{min}$ was $\tau_{min}$.

Using the cell encapsulating the liquid crystal mixture (1), the τ-V characteristics by the monopolar pulse was measured at 25° C. and 40° C. A cell gap was 1.8 μm.

$V_{min}$ at 25° C. and 40° C. were 11 V/μm and 9 V/μm, respectively.

From these $V_{min}$ values, it is seen that the temperature dependency of $V_{min}$ was negative, when the device was driven by the monopolar pulse.

The τ-V characteristics were measured by applying the opposite polarity or same polarity pulse at 40° C. In both cases, Vd was 3 V/μm. The results are shown in FIG. 8 together with the result obtained by the monopolar pulse.

Figure 8:
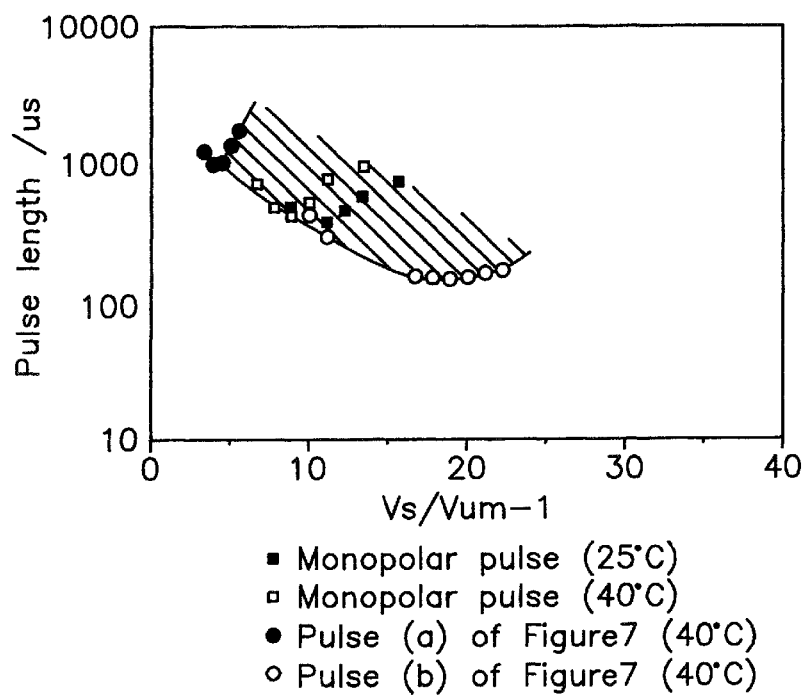
FIG. 8 is a $\tau$-V curve of the liquid crystal mixture of Example 1.

The hatched area in FIG. 8 is an area surrounded by the τ-V curves obtained by the opposite polarity pulse and the same polarity pulse at 40° C. Then, in the case of the liquid crystal mixture (1), the ($V_{min}$, $\tau_{min}$) by the monopolar pulse at 25° C. is included in the area surrounded by the τ-V curves obtained by the opposite polarity pulse and the same polarity pulse at 40° C.

In addition, the ($V_{min}$, $\tau_{min}$) by the monopolar pulse at 25° C. was present in a range of about 5 volts from a position of substantially the same pulse length on the τ-V curve obtained by the monopolar pulse at 40° C.

Figure 9:
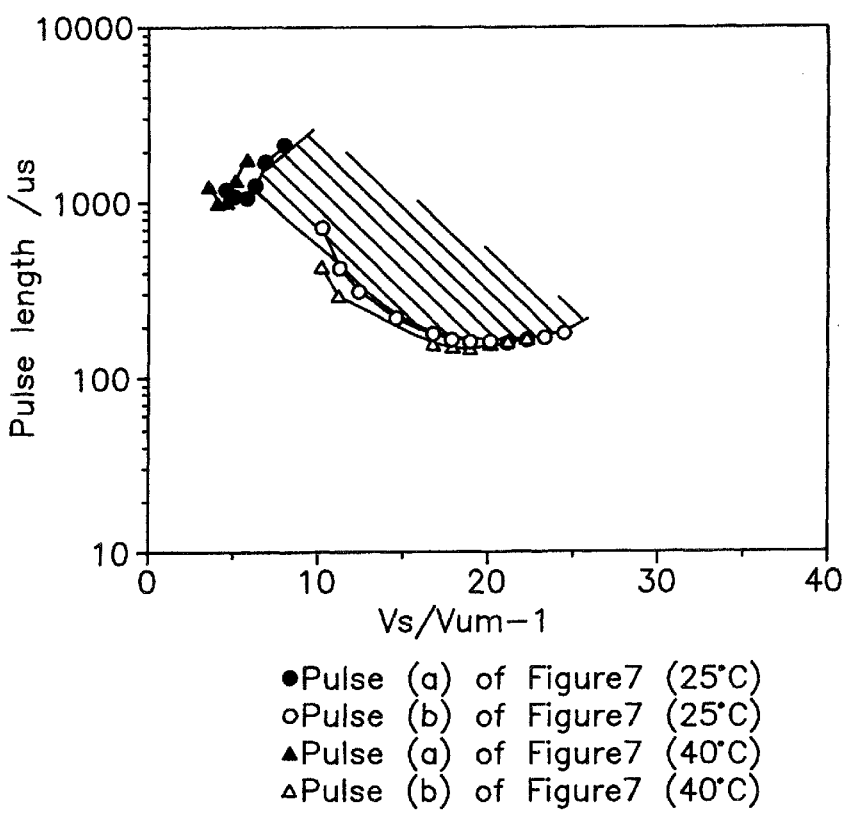
FIG. 9 shows a driving temperature margin of the liquid crystal mixture of Example 1.

FIG. 9 shows the τ-V curves obtained by the same polar pulse and the opposite poler pulse at 25° C. and 40° C. The hatched area indicate an area in which the liquid crystal device can be driven under the same condition at 25° C. and 40° C.

COMPARATIVE EXAMPLE 1

As an comparative example, the following compounds were mixed in the indicated amounts to prepare a comparative liquid crystal mixture (1R).

| Compound | Mol. % |
|---|---|
| C$_{10}$H$_{21}$-[pyrimidine]-[2,3-F,F-phenyl]-CH=CH-C$_7$H$_{15}$ | 15.0 |
| C$_9$H$_{19}$-[pyrimidine]-[2,3-F,F-phenyl]-OC$_7$H$_{15}$ | 2.3 |
| C$_9$H$_{19}$-[pyrimidine]-[2,3-F,F-phenyl]-OC$_8$H$_{17}$ | 2.9 |
| C$_9$H$_{19}$-[pyrimidine]-[2,3-F,F-phenyl]-OC$_9$H$_{19}$ | 3.3 |
| C$_7$H$_{15}$O-[phenyl]-[phenyl]-COO-[2-F-phenyl]-C$_5$H$_{11}$ | 5.9 |
| C$_8$H$_{17}$O-[phenyl]-[phenyl]-COO-[2-F-phenyl]-C$_5$H$_{11}$ | 23.8 |
| OC$_{10}$H$_{21}$-[3-F-phenyl]-OCO-[phenyl]-[phenyl]-*CH(CH$_3$)OC$_6$H$_{13}$ | 4.2 |
| C$_9$H$_{19}$-[pyrimidine]-[phenyl]-OC$_9$H$_{19}$ | 10.4 |
| C$_7$H$_{15}$-[pyrimidine]-[phenyl]-OC$_9$H$_{19}$ | 10.4 |
| C$_9$H$_{19}$-[pyrimidine]-[phenyl]-OC$_8$H$_{17}$ | 10.7 |
| C$_5$H$_{13}$O-[pyrimidine]-[phenyl]-OC$_6$H$_{13}$ | 11.1 |

The comparative liquid crystal mixture (1R) was encapsulated in the same cell as used in Example 1, and the same measurements were carried out. The cell gap was 2.2 μm.

$V_{min}$ values by the monopolar pulse at 25° C. and 40° C. were 24 V/μm and 30 V/μm, respectively.

From these $V_{min}$ values, it is seen that the temperature dependency of $V_{min}$ was positive, when the device was driven by the monopolar pulse.

The τ-V characteristics were measured by applying the opposite polarity or same polarity pulse at 40° C. The results are shown in FIG. 10 together with the result obtained by the monopolar pulse.

Figure 10:
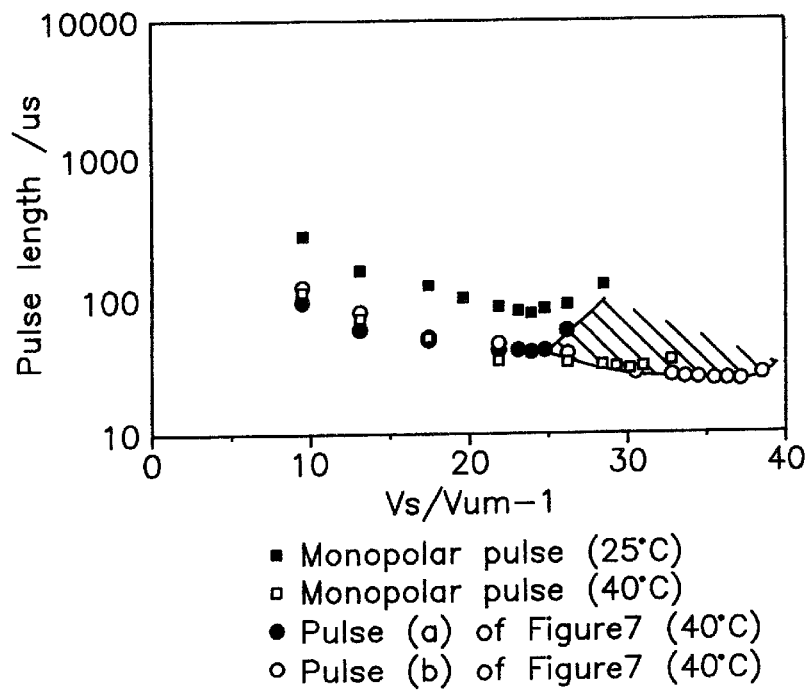
FIG. 10 is a $\tau$-V curve of the liquid crystal mixture of Comparative Example 1.

The hatched area in FIG. 10 is an area surrounded by the τ-V curves obtained by the opposite polarity pulse and the same polarity pulse at 40° C. Then, with the comparative liquid crystal mixture (1R), the ($V_{min}$, $τ_{min}$) by the monopolar pulse at 25° C. is not included in the area surrounded by the τ-V curves obtained by the opposite polarity pulse and the same polarity pulse at 40° C.

Figure 11:
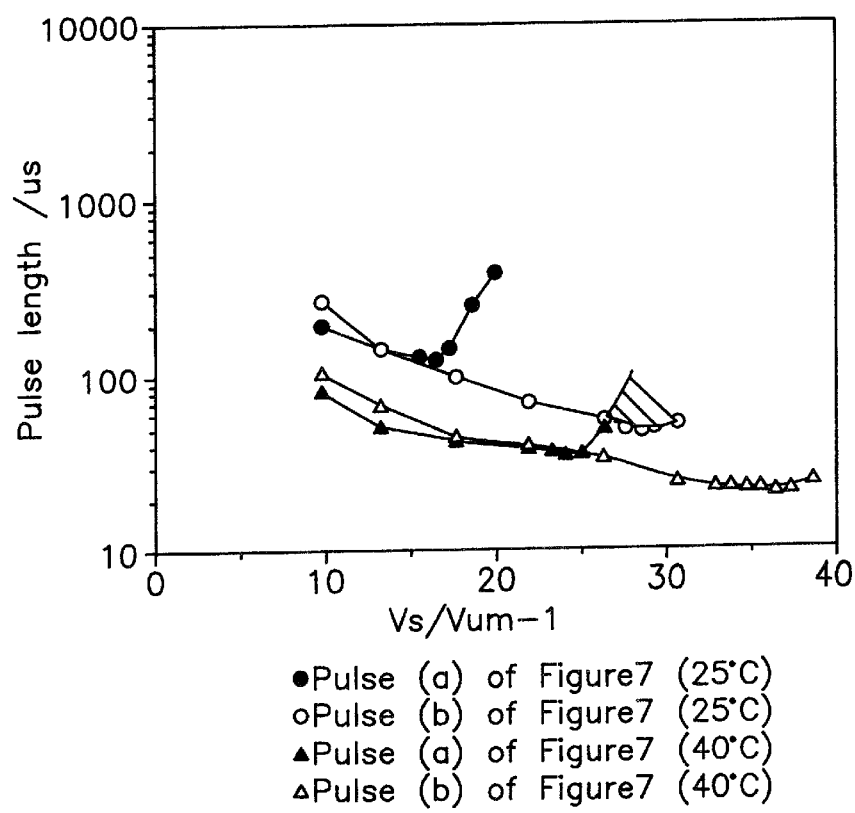
FIG. 11 shows a driving temperature margin of the liquid crystal mixture of Comparative Example 1.

FIG. 11 shows the τ-V curves obtained by the same polar pulse and the opposite poler pulse at 25° C. and 40° C. The hatched area indicate an area in which the liquid crystal device can be driven under the same condition at 25° C. and 40° C.

As is clear from FIGS. 9 and 11, the liquid crystal mixture (1) of the present invention had the wider driving temperature margin than the comparative liquid crystal mixture (1R).

EXAMPLE 2

The following compounds, which are examples of the compound of the formula (I), were mixed in the indicated amounts to prepare a smectic liquid crystal mixture A:

| Compound | Mol. % |
|---|---|
| C$_9$H$_{19}$O-[2,3-F,F-phenyl]-[pyrimidine]-C$_9$H$_{19}$ | 8 |
| C$_8$H$_{17}$O-[2,3-F,F-phenyl]-[pyrimidine]-C$_9$H$_{19}$ | 11 |
| C$_7$H$_{15}$O-[2,3-F,F-phenyl]-[pyrimidine]-C$_9$H$_{19}$ | 11 |
| C$_6$H$_{13}$O-[pyrimidine]-[phenyl]-OC$_6$H$_{13}$ | 19 |
| C$_9$H$_{19}$-[pyrimidine]-[phenyl]-OC$_8$H$_{17}$ | 17 |

-continued

| Compound | Mol. % |
|---|---|
| 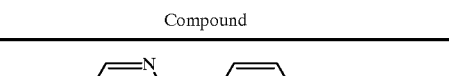 C$_9$H$_{19}$—[pyrimidine]—[phenyl]—OC$_9$H$_{19}$ | 17 |
|  C$_9$H$_{19}$—[pyrimidine]—[phenyl]—OC$_7$H$_{15}$ | 17 |

To the liquid crystal mixture A, the following compound (2-1), which is an example of the compound of the formula (II), was mixed in the indicated amount to prepare a ferroelectric smectic liquid crystal mixture (2):

| Component of the mixture (2) | Mol. % |
|---|---|
| Compound (2-1)  C$_{10}$H$_{21}$O—[difluorophenyl]—[pyrimidine]—C$_5$H$_{10}$·CHCH$_3$ (with F) | 15 |
| Mixture A | 85 |

For comparison, to the liquid crystal mixture A, the following compound (9) was mixed in the indicated amount to prepare a ferroelectric smectic liquid crystal mixture (2R):

| Component of the mixture (2R) | Mol. % |
|---|---|
| Compound (9) 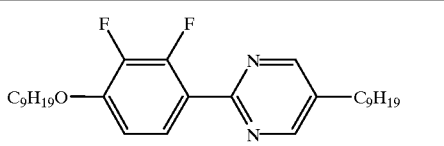 C$_{10}$H$_{21}$O—[phenyl]—[phenyl]—OCO—[phenyl]—·CHOCO$_3$H$_7$ (CH$_3$) | 5 |
| Mixture A | 95 |

Using each of the mixtures (2) and (2R), a liquid crystal device was assembled in the same manner as in Example 1.

Then, with the liquid crystal device, a response time was measured. The response time is a full width at a half maximum of a polarization current peak which flows when a rectangular pulse is applied.

The response times were as follows:

Mixture (2): 100 μsec.
Mixture (2R): 179 μsec.

A magnitude of spontaneous polarization of each of the mixtures (2) and (2R) was measured by a triangular wave method. Both mixtures had 2nC/cm². While the both mixtures had the same magnitude of spontaneous polarization, the mixture (2) of the present invention had the shorter response time than the mixture (2R).

With the above ferroelectric liquid crystal device, a dependency of the response time on the electric field (τ-V characteristic) was measured to evaluate its performance as a liquid crystal for the τ-$V_{min}$ mode.

Figure 12:
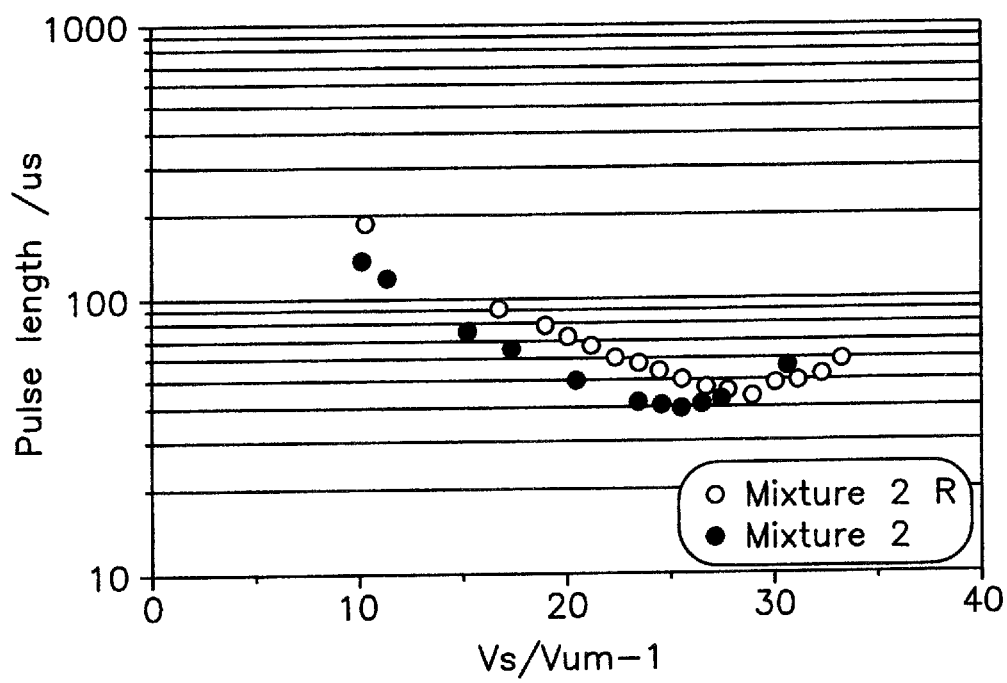
FIG. 12 is a $\tau$-V curve of the liquid crystal mixture of Example 2.

The τ-V characteristics of the liquid crystal mixtures (2) and (2R) are shown in FIG. 12.

As seen from FIG. 12, the liquid crystal mixture (2) of the present invention had the smaller ($V_{min}$, $τ_{min}$) than the comparative mixture (2R).

To compare the dependency of the τ-V characteristics on temperature, the τ-V characteristic of the liquid crystal mixture was measured at 40° C., and a difference between the $V_{min}$ at 40° C. and $V_{min}$ at 25° C. ($V_{min}$ at 40° C.−$V_{min}$ at 25° C.) was compared.

This difference of $V_{min}$ was −2 V/μm for the mixture (2), and 10 V/μm for the comparative mixture (2R).

As understood from these differences of $V_{min}$, the liquid crystal mixture (2) of the present invention had less dependency of $V_{min}$ on the temperature than the comparative mixture (2R).

With the liquid crystal mixtures (2) and (2R), the τ-V characteristics were measured by applying the opposite polarity pulse and the same polarity pulse in the same manner as in Example 1. The liquid crystal mixture (2) achieved the same result as that achieved by the mixture (1), and had a wider driving temperature margin than the liquid crystal mixture (2R).

EXAMPLE 3

The following compounds, which are examples of the compounds of the formulas (I) and (VII), were mixed in the indicated amounts to prepare a ferroelectric smectic liquid crystal mixture B:

| Compound | Mol. % |
|---|---|
| 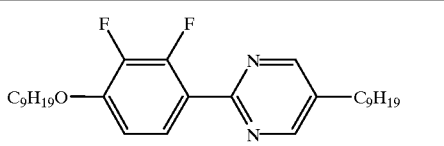 C$_9$H$_{19}$O—[difluorophenyl]—[pyrimidine]—C$_9$H$_{19}$ | 8 |
| 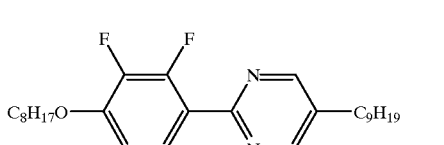 C$_8$H$_{17}$O—[difluorophenyl]—[pyrimidine]—C$_9$H$_{19}$ | 10 |
| 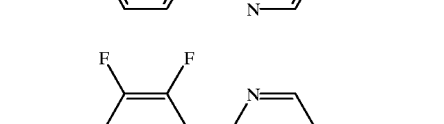 C$_7$H$_{15}$O—[difluorophenyl]—[pyrimidine]—C$_9$H$_{19}$ | 10 |
| 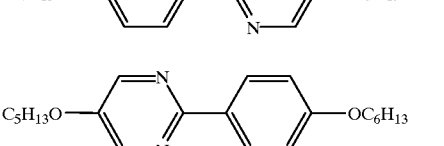 C$_5$H$_{13}$O—[pyrimidine]—[phenyl]—OC$_6$H$_{13}$ | 18 |
| 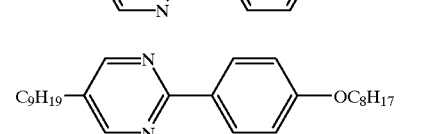 C$_9$H$_{19}$—[pyrimidine]—[phenyl]—OC$_8$H$_{17}$ | 17 |

| Compound | Mol. % |
|---|---|
| C9H19—[pyrimidine]—[phenyl]—OC9H19 | 17 |
| C9H19—[pyrimidine]—[phenyl]—OC7H15 | 17 |
| C10H21O—[pyrimidine]—[phenyl]—*CHOH(CH3) | 3 |

To the liquid crystal mixture B, the following compound (2-1), which is an example of the compound of the formula (II), was mixed in the indicated amount to prepare a liquid crystal mixture (3):

| Component of the mixture (3) | Mol. % |
|---|---|
| Compound (2-1) | 15 |
| C10H21O—[2,3-difluorophenyl]—[pyrimidine]—C5H10*CHCH3(F) | |
| Mixture B | 85 |

Using each of the mixtures B and (3), a liquid crystal device was assembled in the same manner as in Example 1.

Then, with the liquid crystal device, a response time was measured.

The response times were as follows:

Mixture (3): 85 μsec.

Mixture B: 90 μsec.

As seen from the above results, the mixture (3) of the present invention had the shorter response time than the mixture B.

EXAMPLE 4

The following compounds, which are examples of the compounds of the formulas (II), (III) and (IV), were mixed in the indicated amounts to prepare a smectic liquid crystal mixture C:

| Compound | Mol % |
|---|---|
| C9H19O—[2,3-difluorophenyl]—[pyrimidine]—C9H19 | 3 |
| C8H17O—[2,3-difluorophenyl]—[pyrimidine]—C9H19 | 4 |
| C7H15O—[2,3-difluorophenyl]—[pyrimidine]—C9H19 | 4 |
| C6H13O—[pyrimidine]—[phenyl]—OC6H13 | 14 |
| C9H19—[pyrimidine]—[phenyl]—OC8H17 | 13 |
| C9H19—[pyrimidine]—[phenyl]—OC9H19 | 13 |
| C9H19—[pyrimidine]—[phenyl]—OC7H15 | 13 |
| C8H17O—[biphenyl]—COO—[2-fluorophenyl]—C5H11 | 29 |
| C7H15—[biphenyl]—COO—[2-fluorophenyl]—C5H11 | 7 |

To the liquid crystal mixture C, the following compound (2-1), which is an example of the compound of the formula (II), was mixed in the indicated amount to prepare a liquid crystal mixture (4):

| Component of the mixture (4) | Mol. % |
|---|---|
| Compound (2-1) | 15 |
| C10H21O—[2,3-difluorophenyl]—[pyrimidine]—C5H10*CHCH3(F) | |
| Mixture C | 85 |

For comparison, to the liquid crystal mixture C, the following compound (4-1), which is an example of the compound of the formula (IV), was mixed in the indicated amount to prepare a ferroelectric smectic liquid crystal mixture (4R):

| Component of the mixture (4R) | Mol. % |
|---|---|
| Compound (4-1) | 5 |
| ![structure of compound 4-1: C10H21O-(F-phenyl)-OCO-phenyl-phenyl-CH(CH3)•CHOC6H13] | |
| Mixture C | 95 |

Using each of the mixtures (4) and (4R), a liquid crystal device was assembled in the same manner as in Example 1.

Then, with the liquid crystal device, a response time was measured in the same manner as in Example 2.

The response times were as follows:

Mixture (4): 150 μsec.

Mixture (4R): 164 μsec.

A magnitude of spontaneous polarization of each of the mixtures (4) and (4R) was measured by a triangular wave method. Both mixtures had $3nC/cm^2$. While the both mixtures had the same magnitude of spontaneous polarization, the mixture (4) of the present invention had the shorter response time than the mixture (4R).

With the above ferroelectric liquid crystal device, a dependency of the response time on the electric field (τ-V characteristic) was measured by the same method as in Example 1 to evaluate its performance as a liquid crystal for the $\tau\text{-}V_{min}$ mode.

Figure 13:
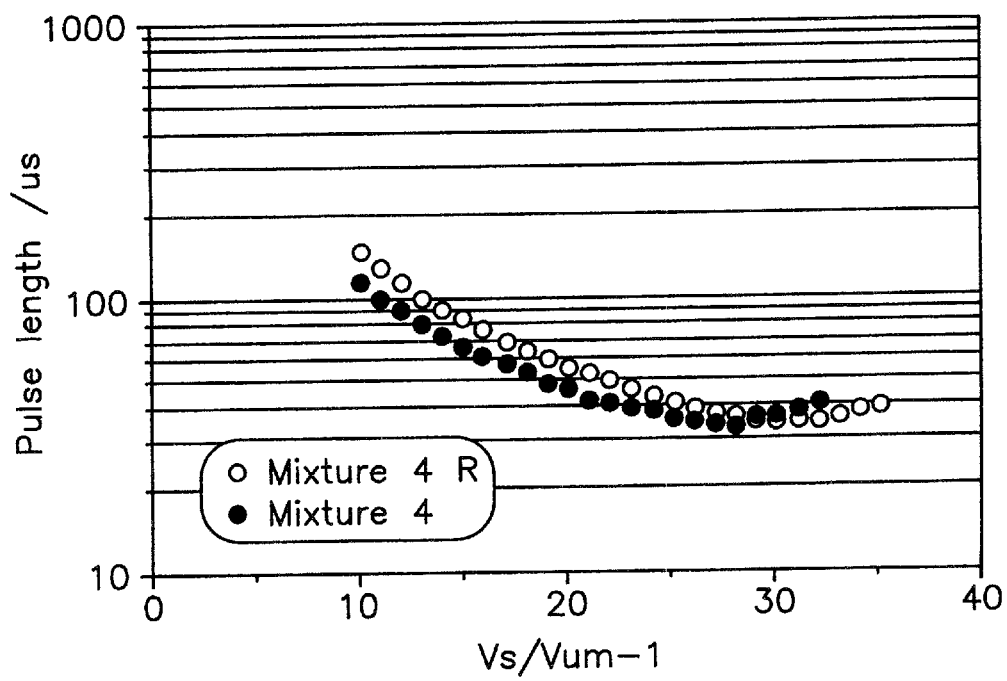
FIG. 13 is τ-V curve of thp liquid crystal mixture of Example 4.

The τ-V characteristics of the liquid crystal mixtures (4) and (4R) are shown in FIG. 13.

As seen from FIG. 13, the liquid crystal mixture (4) of the present invention had the smaller ($V_{min}$, $\tau_{min}$) than the comparative mixture (4R).

To compare the dependency of the τ-V characteristics on temperature, the τ-V characteristic of the liquid crystal mixture was measured at 40° C., and a difference between the $V_{min}$ at 40° C. and $V_{min}$ at 25° C. ($V_{min}$ at 40° C.$-V_{min}$ at 25° C.) was compared.

This difference of $V_{min}$ was 0 V/μm for the mixture (4), and 17 V/μm for the comparative mixture (4R).

As understood from these differences of $V_{min}$, the liquid crystal mixture (4) of the present invention had less dependency of $V_{min}$ on the temperature than the comparative mixture (4R).

With the liquid crystal mixtures (4) and (4R), the τ-V characteristics were measured by applying the opposite polarity pulse and the same polarity pulse in the same manner as in Example 1. The liquid crystal mixture (4) achieved the same result as that achieved by the mixture (1), and had a wider driving temperature margin than the liquid crystal mixture (4R).

EXAMPLE 5

The following compounds, which are examples of the compounds of the formula (I), (IV) and (VI), were mixed in the indicated amounts to prepare a ferroelectric smectic liquid crystal mixture D:

| Compound | Mol. % |
|---|---|
| ![C10H21O-(2,3-difluorophenyl)-pyrimidine-CH=CH-C7H15] | 16 |
| ![C10H21O-(2,3-difluorophenyl)-pyrimidine-CH=CH-C8H17] | 16 |
| ![C9H19O-(2,3-difluorophenyl)-pyrimidine-CH=CH-C7H15] | 10 |
| ![C10H21-pyrimidine-(2,3-difluorophenyl)-CH=CH-C7H15] | 31 |
| ![C8H17O-biphenyl-COO-(F-phenyl)-C5H11] | 12 |
| ![C8H17-biphenyl-COO-(F-phenyl)-C5H11] | 12 |
| ![C10H21O-pyrimidine-phenyl-CH(CH3)•CHOH] | 3 |

To the liquid crystal mixture D, the following compound (2-2), which is an example of the compound of the formula (II), was mixed in the indicated amount to prepare a liquid crystal mixture (5):

| Component of the mixture (5) | Mol. % |
|---|---|
| Compound (2-2) | 10 |

| Mixture D | 90 |

Using each of the mixtures D and (5), a liquid crystal device was assembled in the same manner as in Example 1.

Then, with the liquid crystal device, a response time was measured.

The response times were as follows:

Mixture D: 240 μsec.

Mixture (5): 180 μsec.

As seen from these response times, the mixture (5) of the present invention had the shorter response time than the mixture D.

EXAMPLE 6

To the liquid crystal mixture D obtained in Example 5, the following compound (2-3), which is an example of the compound of the formula (II), was mixed in the indicated amount to prepare a liquid crystal mixture (6):

| Component of the mixture (6) | Mol. % |
|---|---|
| Compound (2-3) $C_{10}H_{21}O-\text{[pyrimidine]}-\text{[phenyl]}-C_5H_{10}\cdot CHCH_3$ (with F) | 15 |
| Mixture D | 85 |

Using the mixture (6), a liquid crystal device was assembled in the same manner as in Example 1.

Then, with the liquid crystal device, a response time was measured.

The response times were as follows:

Mixture D: 240 μsec.

Mixture (6): 133 μsec.

As seen from these response times, the mixture (6) of the present invention had the shorter response time than the mixture D.

EXAMPLE 7

To the liquid crystal mixture D obtained in Example 5, the following compound (2-4), which is an example of the compound of the formula (II), was mixed in the indicated amount to prepare a ferroelectric smectic liquid crystal mixture (7):

| Component of the mixture (7) | Mol. % |
|---|---|
| Compound (2-4) $C_{10}H_{21}O-\text{[pyrimidine]}-\text{[fluorophenyl]}-C_5H_{10}\cdot CHCH_3$ (with F) | 15 |
| Mixture D | 85 |

Using the mixture (7), a liquid crystal device was assembled in the same manner as in Example 1.

Then, with the liquid crystal device, a response time was measured.

The response times were as follows:

Mixture D: 240 μsec.

Mixture (7): 222 μsec.

As seen from these response times, the mixture (7) of the present invention had the shorter response time than the mixture D.

With the above ferroelectric liquid crystal device, a dependency of the response time on the electric field (τ-V characteristic) was measured by the same method as in Example 1 to evaluate its performance as a liquid crystal for the τ-$V_{min}$ mode.

Figure 14:
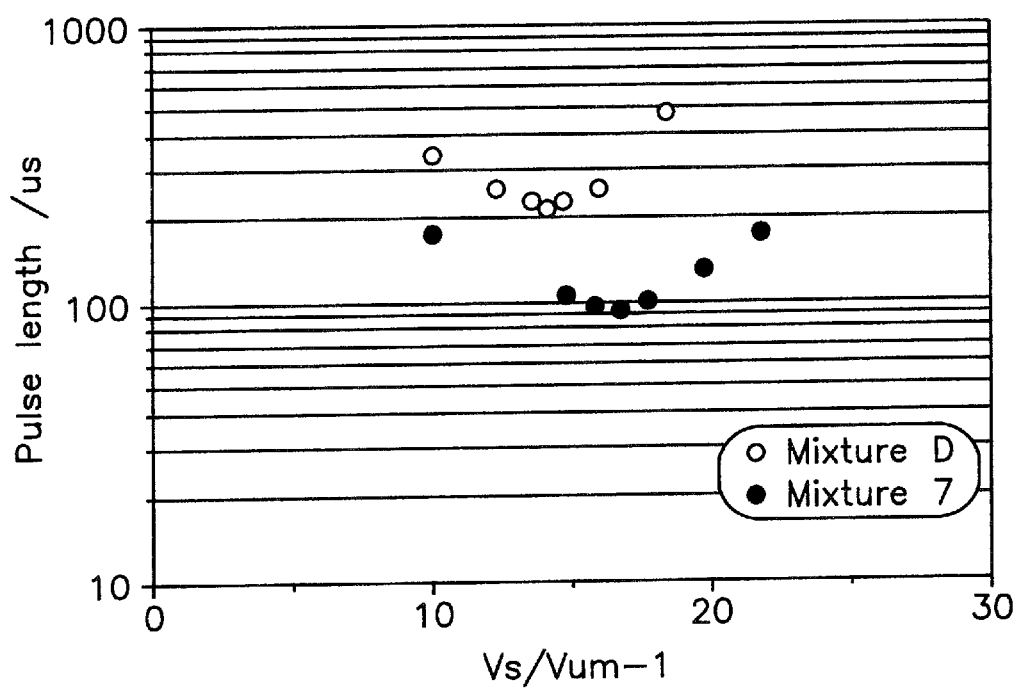
FIG. 14 is a τ-V curve of the liquid crystal mixture of Example 7.

The τ-V characteristics of the liquid crystal mixtures (7) and D are shown in FIG. 14.

As seen from FIG. 14, the compound (2-4), which is one of the compounds of the formula (II) could increase the response speed without increasing the $V_{min}$ considerably.

To compare the dependency of the τ-V characteristics on temperature, the τ-V characteristic of the liquid crystal mixture was measured at 40° C., and a difference between the $V_{min}$ at 40° C. and $V_{min}$ at 25° C. ($V_{min}$ at 40° C.−$V_{min}$ at 25° C.) was compared.

This difference of $V_{min}$ was 1 V/μm for the mixture (7), and 2 V/μm for the comparative mixture D.

As understood from these differences of $V_{min}$, the compound (2-4) which is one of the compounds of the formula (II) could reduce the dependency of $V_{min}$ on the temperature.

EXAMPLE 8

To the liquid crystal mixture D obtained in Example 5, the following compound (2-1), which is an example of the compound of the formula (II), was mixed in the indicated amount to prepare a liquid crystal mixture (8):

| Component of the mixture (8) | Mol. % |
|---|---|
| Compound (2-1) $C_{10}H_{21}O-\text{[difluorophenyl]}-\text{[pyrimidine]}-C_5H_{10}\cdot CHCH_3$ (with F) | 15 |
| Mixture D | 85 |

Using each of the mixtures (8) and D, a liquid crystal device was assembled in the same manner as in Example 1.

Then, with the liquid crystal device, a response time was measured in the same manner as in Example 2.

The response times were as follows:

Mixture (8): 167 μsec.

Mixture D: 240 μsec.

As seen from these response times, the mixture (8) of the present invention had the shorter response time than the mixture D.

With the above ferroelectric liquid crystal device, a dependency of the response time on the electric field (τ-V characteristic) was measured by the same method as in Example 1 to evaluate its performance as a liquid crystal for the τ-$V_{min}$ mode.

Figure 15:
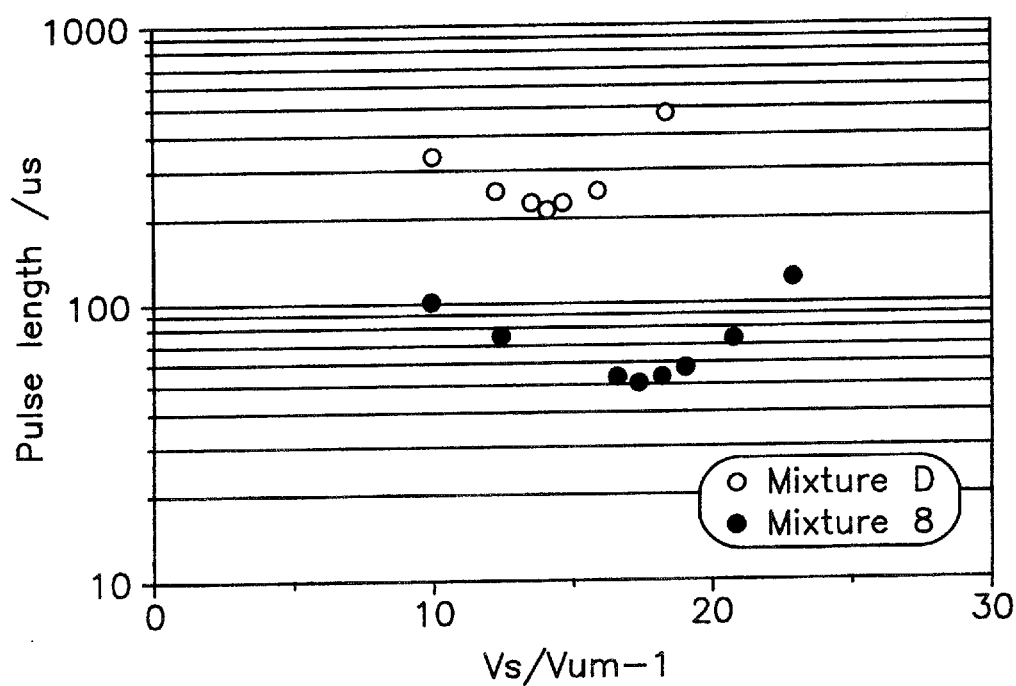
FIG. 15 is a τ-V curve of the liquid crystal mixture of Example 8.

The τ-V characteristics of the liquid crystal mixtures (8) and D are shown in FIG. 15.

As seen from FIG. 15, the compound (2-1), which is one of the compounds of the formula (II) could increase the response speed without increasing the $V_{min}$ considerably.

To compare the dependency of the τ-V characteristics on temperature, the τ-V characteristic of the liquid crystal mixture was measured at 40° C., and a difference between the $V_{min}$ at 40° C. and $V_{min}$ at 25° C. ($V_{min}$ at 40° C.−$V_{min}$ at 25° C.) was compared.

This difference of $V_{min}$ was 0 V/μm for the mixture (8), and 2 V/μm for the comparative mixture D.

As understood from these differences of $V_{min}$, the addition of the compound (2-1) which is one of the compounds of the formula (II) reduced the dependency of $V_{min}$ on the temperature, and the mixture (8) had zero dependency of $V_{min}$ on the temperature and was better than the comparative mixture D.

With the liquid crystal mixtures (8) and D, the τ-V characteristics were measured by applying the opposite polarity pulse and the same polarity pulse in the same manner as in Example 1. The liquid crystal mixture (8) achieved the same result as that achieved by the mixture (1), and had a wider driving temperature margin than the liquid crystal mixture D.

What is claimed is:

1. A ferroelectric chiral smectic liquid crystal mixture comprising at least one compound of the formula (I):

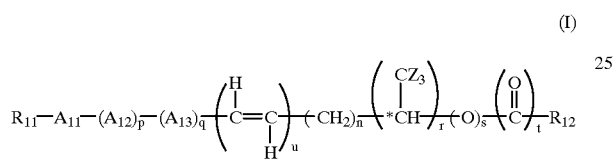

(I)

wherein $R_{11}$ and $R_{12}$ represent, independently each other, a $C_1$–$C_{20}$ alkyl, alkoxy or alkoxyalkyl group which may be substituted by at least one halogen atom and may have an unsaturated bond; $A_{11}$, $A_{12}$ and $A_{13}$ represent, independently each other, a condensed ring or monocyclic group of the formula:

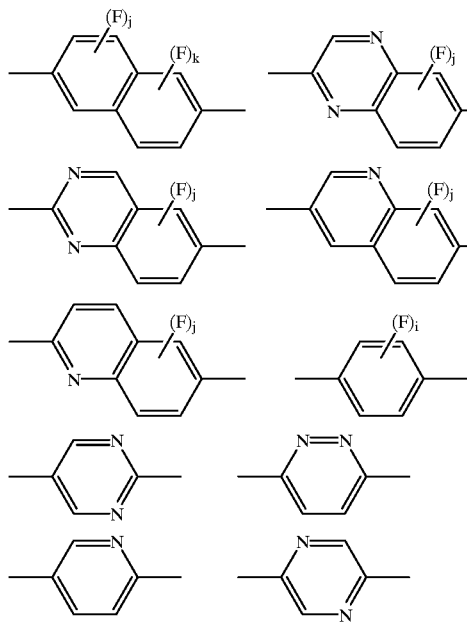

in which i is an integer of 0 to 4 and j and k are each an integer of 0 to 3; p and q are each 0 or 1, provided that when $A_{11}$ is a condensed ring group, a sum of p and q is 0 or 1 and $A_{12}$ and $A_{13}$ are monocyclic groups, or when $A_{11}$ is a monocyclic group, a sum of p and q is 1 or 2, with the proviso that when the sum of p and q is 2, $A_{12}$ and $A_{13}$ are both monocyclic groups; * indicates an asymmetric carbon atom; Z is a hydrogen atom or a fluorine atom; n is an integer of 0 to 10; r, s, t and u are each 0 or 1, provided that when u is 1, the compound (I) is a trans-olefin, and at least one compound of the formula (II):

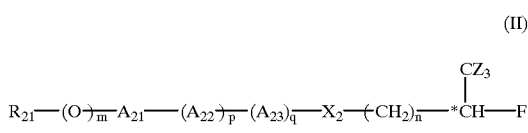

(II)

wherein $R_{21}$ is a saturated or unsaturated $C_3$–$C_{20}$ alkyl group or a saturated or unsaturated $C_3$–$C_{20}$ alkoxyalkyl group; $A_{21}$, $A_{22}$ and $A_{23}$ represent, independently each other, a group of the formula:

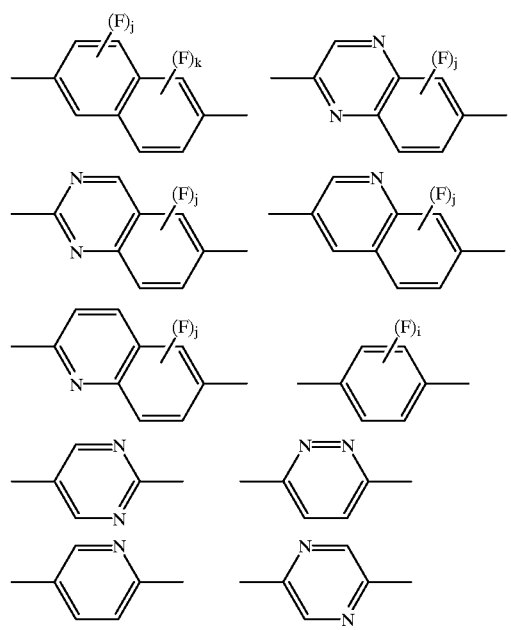

in which i, j and k are the same as defined above; p and q are each 0 or 1, provided that when $A_{21}$ is a condensed ring group, a sum of p and q is 0 or 1 and $A_{21}$ and $A_{23}$ are monocyclic groups, or when $A_{21}$ is a monocyclic group, the sum of p and q is 1 or 2, with the proviso that when the sum of p and q is 2, $A_{22}$ and $A_{23}$ are both monocyclic groups; $X_2$ is —C≡C—, —HC=CH— or —CH$_2$—CH$_2$—; Z is a hydrogen atom or a fluorine atom; n is an integer of 1 to 10; m is 0 or 1; and * indicates an asymmetric carbon atom.

2. A ferroelectric chiral liquid crystal mixture comprising at least one compound of the formula (I) in claim 1, at least one compound of the formula (II) in claim 1, and at least one compound selected from the group consisting of a compound of the formula (V):

(V)

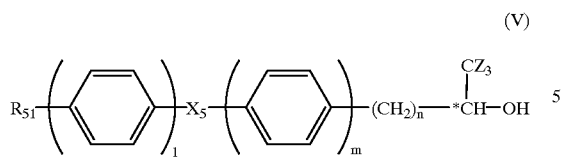

wherein $R_{51}$ is a $C_2$–$C_{20}$ alkyl or alkoxy group; $X_5$ is —COO— or —CH$_2$O— which may be bonded to a benzene ring at an arbitrary position; l and m are each 1 or 2; n is an integer of 0 to 5; Z is a hydrogen atom or a fluorine atom; and * indicates an asymmetric carbon atom, a compound of the formula (VI):

(VI)

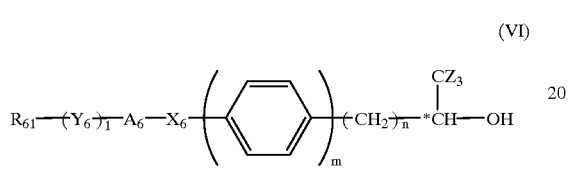

wherein $R_{61}$ is a $C_1$–$C_{20}$ alkyl group; $X_6$ is —COO— or —CH$_2$O— which may be bonded to a benzene ring at an arbitrary position; $Y_6$ is —O— or —COO— which may be bonded to a ring of $A_6$ at an arbitrary position; $A_6$ is a group of the formula:

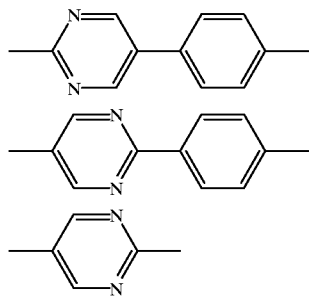

n is an integer of 0 to 5; m is 0 or 1; Z is a hydrogen atom or a fluorine atom; and * indicates an asymmetric carbon atom, a compound of the formula (VII):

(VII)

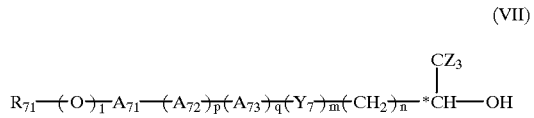

wherein $R_{71}$ a saturated or unsaturated $C_1$–$C_{20}$ alkyl group or a saturated or unsaturated $C_2$–$C_{20}$ alkoxyalkyl group; l, m, p and q are each 0 or 1; n is an integer of 0 to 8; $Y_7$ is —C≡C—, —HC═CH— or —CH$_2$—CH$_2$—; and $A_{71}$, $A_{72}$ and $A_{73}$ represent, independently each other,

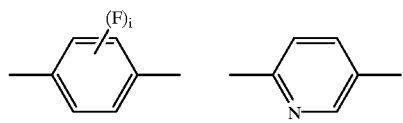

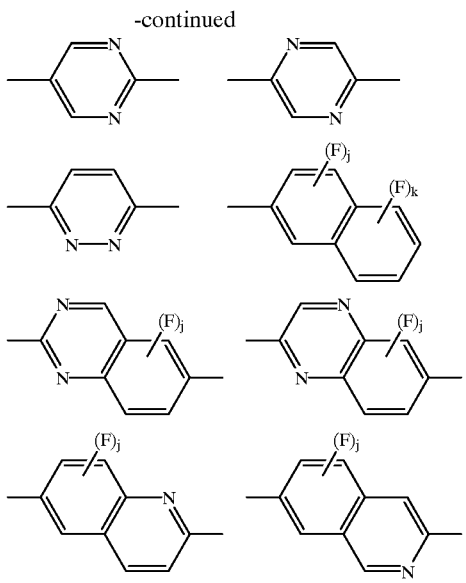

in which i is an integer of 0 to 4 and j and k are each an integer of 0 to 3; p and q are each 0 or 1, provided that when $A_{71}$ is a condensed ring group, a sum of p and q is 0 or 1 and $A_{72}$ and $A_{73}$ are monocyclic groups, or when $A_{71}$ is a monocyclic group, a sum of p and q is 1 or 2, with the proviso that when the sum of p and q is 2, $A_{72}$ and $A_{73}$ are both monocyclic groups; and * indicates an asymmetric carbon atom, and a compound of the formula (VIII):

(VIII)

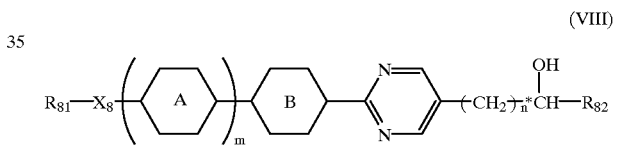

wherein $R_{81}$ and $R_{82}$ are each a $C_1$–$C_{18}$ alkyl group; $X_8$ is a single bond or —O—; m is 0 or 1; a ring A is a phenylene or cyclohexyl group which may be substituted by at least one fluorine atom; a ring B is a phenylene group which may be substituted by at least one fluorine atom; n is an integer of 0 to 5; and * indicates an asymmetric carbon atom, provided that the compound of the formula (VIII) is not the same as the compound of the formula (V), (VI) or (VII).

3. A ferroelectric chiral smectic liquid crystal mixture comprising at least one compound of the formula (I):

(I)

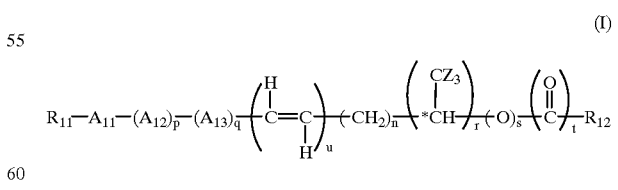

wherein $R_{11}$ and $R_{12}$ represent, independently each other, a $C_1$–$C_{20}$ alkyl, alkoxy or alkoxyalkyl group which may be substituted by at least one halogen atom and may have an unsaturated bond; $A_{11}$, $A_{12}$ and $A_{13}$ represent, independently each other, a condensed ring or monocyclic group of the formula:

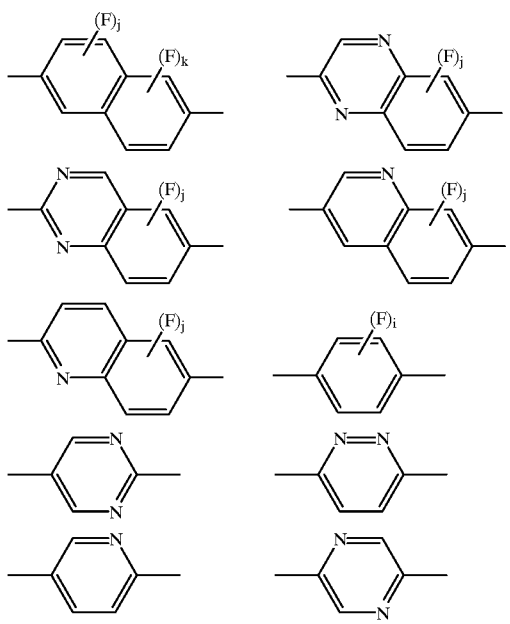

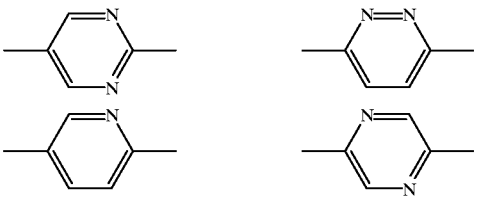

in which i is an integer of 0 to 4 and j and k are each an integer of 0 to 3; p and q are each 0 or 1, provided that when $A_{11}$ is a condensed ring group, a sum of p and q is 0 or 1 and $A_{12}$ and $A_{13}$ are monocyclic groups, or when $A_{11}$ is a monocyclic group, a sum of p and q is 1 or 2, with the proviso that when the sum of p and q is 2, $A_{12}$ and $A_{13}$ are both monocyclic groups; * indicates an asymmetric carbon atom; Z is a hydrogen atom or a fluorine atom; n is an integer of 0 to 10; r, s, t and u are each 0 or 1, provided that when u is 1, the compound (I) is a trans-olefin, at least one compound of the formula (III):

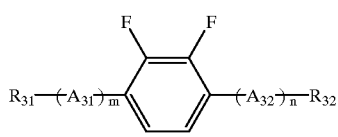

(III)

wherein $A_{31}$ and $A_{32}$ are each a group of the formula:

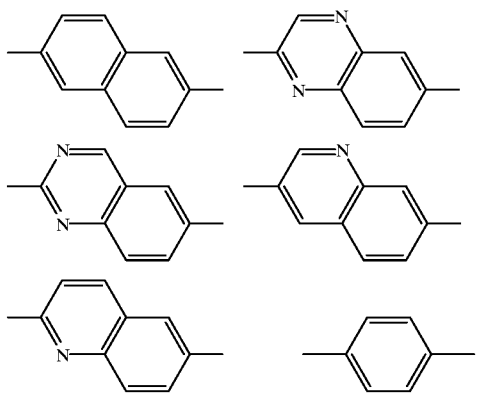

m and n are each 0 or 1, provided that when $A_{31}$ or $A_{32}$ is a condensed ring group, a sum of m and n is 1, or when $A_{31}$ or $A_{32}$ is a monocyclic group, the sum of m and n is 1 or 2; $R_{31}$ and $R_{32}$ are each a $C_3$–$C_{15}$ alkyl, alkoxy or alkoxyalkyl group which may be substituted by at least one halogen atom, and at least one compound of the formula (IV):

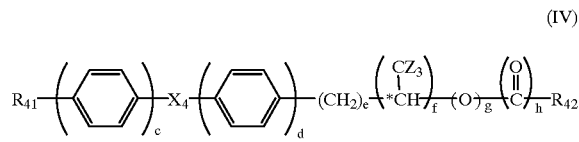

(IV)

wherein c and d are each 1 or 2 provided that a sum of c and d is 3; e is an integer of 0 to 10; f is 0 or 1; g and h are each 0 or 1; $X_4$ is —COO— or —OCO—; at least one of hydrogen atoms of benzene rings is substituted by a fluorine atom; $R_{41}$ is a $C_5$–$C_{15}$ alkyl, alkoxy or alkoxyalkyl group; $R_{42}$ is a $C_1$–$C_{10}$ alkyl or alkoxy group which may be substituted by at least one fluorine atom or a $C_2$–$C_{10}$ alkoxyalkyl group which may be substitiited by at least one fluorine atom; continuing methylene groups in $R_{41}$ and $R_{42}$ may be replaced by a double or triple bond; Z is a hydrogen atom or a fluorine atom; and * indicates an asymmetric carbon atom.

4. A ferroelectric chiral smectic liquid crystal mixture comprising at least one compound of the formula (I) in claim 1 in which u is 1 (one), at least one compound of the formula (II) in claim 1, and at least one compound of the formula (IV) in claim 3.

5. The liquid crystal mixture according to claim 1, wherein a trans olefin compound of the formula (I) in which at least one of $A_{11}$, $A_{12}$ and $A_{13}$ is a group of the formula:

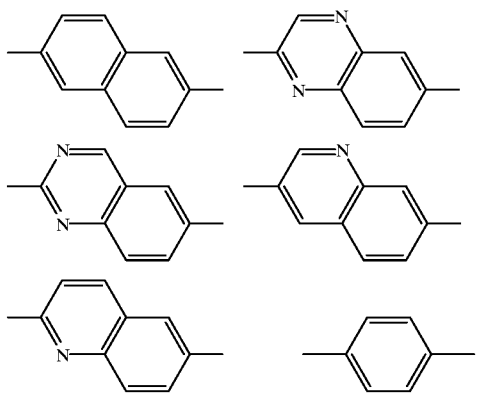

and $R_{11}$, $R_{12}$, n, p, q, r, s and t are the same as defined in the formula (I), preferably, r, s and t are 0 (zero), is used as the compound (I).

6. The liquid crystal mixture according to claim 1, wherein a molar ratio of the compound of the formula (I) to the compound of the formula (II) is preferably (98–50):(2–50).

7. The liquid crystal mixture according to claim 3, wherein a molar ratio of the compound of the formula (III) to the compound of the formula (IV) to the compound of the formula (II) is preferably (10–90):(87–7):(3–50).

8. The liquid crystal mixture according to claim 4, wherein, a molar ratio of the compound of the formula (I) to the compound of the formula (IV) to the compound of the formula (II) is preferably (87–7):(3–50):(10–90).

9. A ferroelectric chiral smectic liquid crystal mixture comprising one of the ferroelectric chiral smectic liquid crystal mixture as claimed in claim 1 and at least one compound selected from the group consisting of the compounds of the formulas (V), (VI), (VII) and (VIII) in claim 2.

10. The ferroelectric chiral smectic liquid crystal mixture according to claim 9, wherein a content of at least one compound selected from the group consisting of the compounds of the formulas (V), (VI), (VII) and (VIII) is from 1 to 20 mole %.

11. A liquid crystal device comprising a pair of electrode substrates, and a layer of the liquid crystal mixture as claimed in any one of claims 1–10 between said pair of the electrode substrates.

12. A ferroelectric liquid crystal for a $\tau$-$V_{min}$ mode which has a zero or negative temperature dependency of a minimum driving voltage $V_{min}$, wherein $V_{min}$ does not change with the change of temperature or $V_{min}$ increases as the temperature lowers.

13. The ferroelectric liquid crystal according to claim 12, in which minimum values ($V_{min}$, $\tau_{min}$) of a $\tau$-$V_{min}$ curve obtained when the liquid crystal is driven by a monopolar pulse at a temperature $T_1$ are in a range surrounded by two $\tau$-V curves which are obtained when the liquid crystal is driven at a temperature $T_2$ which is higher than $T_1$ by a same polarity pulse and an opposite polarity pulse, respectively, where $T_1$ and $T_2$ are arbitrary temperatures in the temperature range of the ferroelectric smectic C phase, the same polarity pulse being a pulse having a wave form which has the same polarity as that of a switching pulse just before the switching pulse is applied and generating a pulse with a voltage smaller than the monopolar pulse, and the opposite polarity pulse being a pulse which has the reverse polarity to that of a switching pulse just before the switching pulse is applied and generating a pulse with a voltage larger than the monopolar pulse.

14. The liquid crystal according to claim 12, which is a ferroelectric chiral smectic liquid crystal.

15. A liquid crystal device comprising a pair of electrode substrates, and a layer of the liquid crystal mixture as claimed in claim 12 between said pair of the electrode substrates.

16. A ferroelectric chiral smectic liquid crystal mixture comprising one of the ferroelectric chiral smectic liquid crystal mixture as claimed in claim 3, and at least one compound selected from the group consisting of the compounds of the formulas (V), (VI), (VII) and (VIII) in claim 2.

17. A ferroelectric chiral smectic liquid crystal mixture comprising one of the ferroelectric chiral smectic liquid crystal mixture as claimed in claim 5, and at least one compound selected from the group consisting of the compounds of the formulas (V), (VI), (VII) and (VIII) in claim 2.

18. The liquid crystal according to claim 13, which is a ferroelectric chiral smectic liquid crystal.

19. A liquid crystal device comprising a pair of electrode substrates, and a layer of the liquid crystal mixture as claimed in claim 13 between said pair of the electrode substrates.

20. A liquid crystal device comprising a pair of electrode substrates, and a layer of the liquid crystal mixture as claimed in claim 14 between said pair of the electrode substrates.

\* \* \* \* \*